(12) United States Patent
Gottlob et al.

(10) Patent No.: US 12,242,433 B2
(45) Date of Patent: Mar. 4, 2025

(54) AUTOMATIC DATABASE ENRICHMENT AND CURATION USING LARGE LANGUAGE MODELS

(71) Applicant: Ratiolytics Limited, Nicosia (CY)

(72) Inventors: Georg Gottlob, Nicosia (CY); Jinsong Guo, London (GB)

(73) Assignee: Ratiolytics Limited, Nicosia (CY)

( * ) Notice: Subject to any disclaimer, the term of this patent is extended or adjusted under 35 U.S.C. 154(b) by 0 days.

(21) Appl. No.: 18/792,699

(22) Filed: Aug. 2, 2024

(65) Prior Publication Data

US 2025/0045256 A1  Feb. 6, 2025

Related U.S. Application Data

(60) Provisional application No. 63/530,795, filed on Aug. 4, 2023.

(51) Int. Cl.
| | |
|---|---|
| *G06F 16/00* | (2019.01) |
| *G06F 16/21* | (2019.01) |
| *G06F 16/215* | (2019.01) |
| *G06F 16/23* | (2019.01) |
| *G06F 16/2455* | (2019.01) |

(52) U.S. Cl.
CPC .......... *G06F 16/211* (2019.01); *G06F 16/215* (2019.01); *G06F 16/2365* (2019.01); *G06F 16/24564* (2019.01)

(58) Field of Classification Search
CPC .. G06F 16/211; G06F 16/215; G06F 16/2365; G06F 16/24564
See application file for complete search history.

(56) References Cited

U.S. PATENT DOCUMENTS 8,577,849 B2   11/2013  Yakout et al.
11,681,689 B2   6/2023  Seth et al.
(Continued)

OTHER PUBLICATIONS

Sundaram, Sowmya S., et al. "Use of a Structured Knowledge Base Enhances Metadata Curation by Large Language Models." arXiv preprint arXiv:2404.05893 (2024).*
(Continued)

*Primary Examiner* — Nan Hutton
(74) *Attorney, Agent, or Firm* — Fresh IP PLC; Clifford D. Hyra; Aubrey Y. Chen

(57) ABSTRACT

A method to be executed on a computing device comprising (i) accessing and/or modifying a database to be automatically curated, (ii) optionally accessing additional data or information sources for further useful data or information, (iii) using one or more pre-trained large language models (LLMs) accessed via API or other connections, issuing prompts and retrieving prompt-answers and executing database curation requests that specify database curation tasks to be performed on at least one sub-structure of the database, the tasks comprising (a) a database enrichment task to compute new data records to be inserted into the database sub-structure, (b) a database verification task to verify, using the one or more LLMs, data contained in the sub-structure, and identify incorrect data, (c) a database update, and (d) a null-value or a missing value replacement task. The requested tasks are automatically performed via a computation comprising an adaptively generated prompt sequence.

30 Claims, 11 Drawing Sheets

(56) References Cited

U.S. PATENT DOCUMENTS

| | | | |
|---|---|---|---|
| 11,769,017 B1* | 9/2023 | Gray | G06N 3/0455 |
| | | | 704/9 |
| 11,966,371 B1 | 4/2024 | Jennings | |
| 2016/0092557 A1 | 3/2016 | Stojanovic et al. | |
| 2017/0169090 A1 | 6/2017 | Jose et al. | |
| 2019/0005118 A1 | 1/2019 | Tripathi et al. | |
| 2021/0173817 A1 | 6/2021 | Bates-Haus et al. | |
| 2021/0248136 A1* | 8/2021 | Panuganty | G06F 16/972 |
| 2021/0248206 A1 | 8/2021 | Dube-Cousineau | |
| 2022/0050838 A1 | 2/2022 | Piatetsky et al. | |
| 2022/0092041 A1 | 3/2022 | Raack et al. | |
| 2024/0248963 A1* | 7/2024 | Parham | G06F 18/2415 |

OTHER PUBLICATIONS

Amer-Yahia, Sihem, et al. "From large language models to databases and back: A discussion on research and education." ACM SIGMOD Record 52.3 (2023): 49-56.*
Fang, X. et al., Large Language Models (LLMs) on Tabular Data: Prediction, Generation, and Understanding—A Survey, Transactions on Machine Learning Research, 2024, 46 pages.
Zhu, Y. et al., LLMs for knowledge graph construction and reasoning: recent capabilities and future opportunities, Neuro-Symbolic Intelligence: Large Language Model Enabled Knowledge Engineering, Aug. 21, 2024, 23 pages.
Feuer, B. et al., ArcheType: A Novel Framework for Open-Source Column Type Annotation using Large Language Models, ACM Digital Library, Aug. 6, 2024, 14 pages.
Remadi, A. et al., To prompt or not to prompt: Navigating the use of Large Language Models for integrating and modeling heterogeneous data, Data and Knowledge Engineering, Jul. 2024, 17 pages.
Wang, T. et al., Match, Compare, or Select? An Investigation of Large Language Models for Entity Matching, arXiv, Jun. 23, 2024, 13 pages.
Wang, S. et al., Can LLMs Reason with Rules? Logic Scaffolding for Stress-Testing and Improving LLMs, arXiv, Jun. 21, 2024, 22 pages.
Sun, K. et al., Head-to-Tail: How Knowledgeable are Large Language Models (LLMs)? A.K.A. Will LLMs Replace Knowledge Graphs?, Proceedings of the 2024 Conference of the North American Chapter of the Association for Computational Linguistics: Human Language Technologies (vol. 1: Long Papers), Jun. 16-21, 2024, 15 pages.
Akella, A. et al., An Automatic Prompt Generation System for Tabular Data Tasks, Proceedings of the 2024 Conference of the North American Chapter of the Association for Computational Linguistics: Human Language Technologies (vol. 6: Industry Track), Jun. 16-21, 2024, 10 pages.
Li, X. et al., Towards Efficient Data Wrangling with LLMs using Code Generation, Workshop on Data Management for End-to-End Machine Learning, Jun. 9, 2024, 5 pages.
Zezhou, Huang, Disambiguate Entity Matching using Large Language Models through Relation Discovery, Governance, Understanding and Integration of Data for Effective and Responsible AI, Jun. 9, 2024, 4 pages.
Kayali, M. et al., Chorus: Foundation Models for Unified Data Discovery and Exploration, arXiv, May 31, 2024, 11 pages.
Döhmen, T. et al., SchemaPile: A Large Collection of Relational Database Schemas, Proceedings of the ACM on Management of Data, Jun. 2024, 25 pages.
Sheetrit, E. et al., ReMatch: Retrieval Enhanced Schema Matching with LLMs, arXiv, May 30, 2024, 5 pages.
Qian, Y. et al., UNIDM: A Unified Framework for Data Manipulation With Large Language Models, Proceedings of the 5th MLSys Conference, May 13, 2024, 18 pages.
Zhang, Z. et al., Directions Towards Efficient and Automated Data Wrangling with Large Language Models, 2024 IEEE 40th International Conference on Data Engineering Workshops, May 13, 2024, 4 pages.
Fan, M. et al., Cost-Effective In-Context Learning for Entity Resolution: A Design Space Exploration, 2024 IEEE 40th International Conference on Data Engineering, May 13, 2024, 14 pages.
Li, H. et al., BoostER: Leveraging Large Language Models for Enhancing Entity Resolution, Companion Proceedings of the ACM Web Conference 2024, May 13, 2024, 4 pages.
Xia, Y. et al., APrompt4EM: Augmented Prompt Tuning for Generalized Entity Matching, arXiv, May 8, 2024, 14 pages.
Sufi, Fahim., Addressing Data Scarcity in the Medical Domain: A GPT-Based Approach for Synthetic Data Generation and Feature Extraction, Information, May 6, 2024, 31 pages.
Wornow, M. et al., Automating the Enterprise with Foundation Models, arXiv, May 3, 2024, 9 pages.
Gao, D. et al., Text-to-SQL Empowered by Large Language Models: A Benchmark Evaluation, Proceedings of the VLDB Endowment, vol. 17, No. 5, May 2, 2024, 14 pages.
Khalid, H. et al., Repairing raw metadata for metadata management, Information Systems, May 2024, 18 pages.
Biester, F. et al., LLMClean: Context-Aware Tabular Data Cleaning via LLM-Generated OFDs, arXiv, Apr. 29, 2024, 13 pages.
Chen, Z. et al., Seed: Domain-Specific Data Curation With Large Language Models, arXiv, Apr. 24, 2024, 20 pages.
Abdelaal, M. et al., Saged: Few-Shot Meta Learning for Tabular Data Error Detection, Proceedings of the 27th International Conference on Extending Database Technology, Mar. 28, 2024, 13 pages.
Saeed, M. et al., Querying Large Language Models with SQL, Proceedings of the 27th International Conference on Extending Database Technology, Mar. 28, 2024, 8 pages.
Pereira, J. L. M. et al., Cleenex: Support for User Involvement during an Iterative Data Cleaning Process, ACM J. Data Inform. Quality, vol. 16, No. 1, Mar. 18, 2024, 26 pages.
Liu, J. et al., Query Rewriting via Large Language Models, arXiv, Mar. 14, 2024, 13 pages.
Bordt, S. et al., Elephants Never Forget: Testing Language Models for Memorization of Tabular Data, arXiv, Mar. 11, 2024, 24 pages.
Cong, T. et al., Observatory: Characterizing Embeddings of Relational Tables, VDLB Endowment, Mar. 5, 2024, 14 pages.
Luo, L. et al., Reasoning on Graphs: Faithful and Inter-Pretable Large Language Model Reasoning, arXiv, Feb. 24, 2024, 24 pages.
Caufield, J. H. et al., Structured Prompt Interrogation and Recursive Extraction of Semantics (SPIRES): a method for populating knowledge bases using zero-shot learning, Bioinformatics, Feb. 21, 2024, 10 pages.
Sufi, Fahim, Generative Pre-Trained Transformer (GPT) in Research: A Systematic Review on Data Augmentation, Information, Feb. 8, 2024, 27 pages.
Lin, Y. et al., Smartfeat: Efficient Feature Construction through Feature-Level Foundation Model Interactions, 14th Annual Conference on Innovative Data Systems Research, Jan. 14, 2024, 7 pages.
Pan, S. et al., Unifying Large Language Models and Knowledge Graphs: A Roadmap, 3580 IEEE Transactions on Knowledge and Data Engineering, vol. 36, No. 7, Jan. 10, 2024, 20 pages.
Yu, Y. et al., Large Language Model as Attributed Training Data Generator: A Tale of Diversity and Bias, 37th Conference on Neural Information Processing Systems, Dec. 16, 2023, 51 pages.
Jiang, Z. et al., Pre-trained Tabular Transformer for Real-time, Efficient, Stable Radiomics Data Processing: A Comprehensive Study, 2023 IEEE International Conference on E-health Networking, Application & Services, Dec. 15, 2024, 6 pages.
Huang, Y. et al., Interactive Table Synthesis With Natural Language, IEEE Transactions on Visualization and Computer Graphics, vol. 30, No. 9, Nov. 1, 2023, 15 pages.
Singh, M. et al., FormaT5: Abstention and Examples for Conditional Table Formatting with Natural Language, Proceedings of the VLDB Endowment, vol. 17, No. 3, Nov. 1, 2023, 14 pages.
Wu, S. et al., Blocker and Matcher Can Mutually Benefit: A Co-Learning Framework for Low-Resource Entity Resolution, Proceedings of the VLDB Endowment, vol. 17, No. 3, Nov. 1, 2023, 13 pages.

(56) References Cited

OTHER PUBLICATIONS

Shin, C. et al., Pool-Search-Demonstrate: Improving Data-wrangling LLMs via better in-context examples, Table Representation Learning Workshop at NeurIPS 2023, Oct. 28, 2023, 14 pages.
Naeim Abadi, A. et al., Product Entity Matching via Tabular Data, Proceedings of the 32nd ACM International Conference on Information and Knowledge Management, Oct. 21, 2023, 5 pages.
Li, P. et al., Table-GPT: Table-tuned GPT for Diverse Table Tasks, arXiv, Oct. 13, 2023, 47 pages.
Luo, L. et al., ChatRule: Mining Logical Rules with Large Language Models for Knowledge Graph Reasoning, arXiv, Sep. 4, 2023, 11 pages.
Trummer, Immanuel, Demonstrating NaturalMiner: Searching Large Data Sets for Abstract Patterns Described in Natural Language, SIGMOD '23: Companion of the 2023 International Conference on Management of Data, Jun. 15, 2023, 4 pages.
Jo, S. et al., Demonstration of ThalamusDB: Answering Complex SQL Queries with Natural Language Predicates on Multi-Modal Data, SIGMOD '23: Companion of the 2023 International Conference on Management of Data, Jun. 5, 2023, 4 pages.
Arora, S. et al., Language Models Enable Simple Systems for Generating Structured Views of Heterogeneous Data Lakes, Proceedings of the VLDB Endowment, Apr. 19, 2023, 14 pages.
Chen, Z. et al., Lingua Manga : A Generic Large Language Model Centric System for Data Curation, arXiv, Sep. 1, 2023, 4 pages.
Zhang, H. et al., Large Language Models as Data Preprocessors, arXiv, Aug. 30, 2023, 5 pages.
Korini, K. et al., Column Type Annotation using ChatGPT, CEUR Workshop Proceedings, Aug. 28, 2023, 10 pages.
Xu, X. et al., How to Unleash the Power of Large Language Models for Few-shot Relation Extraction, Proceedings of The Fourth Workshop on Simple and Efficient Natural Language Processing, Jul. 13, 2023, 11 pages.
Fernandez, R. C. et al., How Large Language Models Will Disrupt Data Management, Proceedings of the VLDB Endowment, vol. 16, No. 11, Jul. 1, 2023, 8 pages.
Brinkmann, A. et al., Product Information Extraction using ChatGPT, arXiv, Jun. 23, 2023, 5 pages.
Peeters, R. et al., Using ChatGPT for Entity Matching, arXiv, Jul. 22, 2023, 10 pages.
Urban, M. et al., OmniscientDB: A Large Language Model-Augmented DBMS That Knows What Other DBMSs Do Not Know, Sixth International Workshop on Exploiting Artifi-cial Intelligence Techniques for Data Management, Jun. 20, 2023, 7 pages.
Ilyas, I. F. et al., Growing and Serving Large Open-domain Knowledge Graphs, SIGMOD '23: Companion of the 2023 International Conference on Management of Data, Jun. 5, 2023, 7 pages.
Dong, Y. et al., DeepJoin: Joinable Table Discovery with Pre-trained Language Models, Proceedings of the VLDB Endowment, vol. 16, No. 10, Jun. 1, 2023, 13 pages.
Naeem, Z. A. et al., RetClean: Retrieval-Based Data Cleaning Using Foundation Models and Data Lakes, arXiv, Mar. 29, 2023, 5 pages.
Fang, L. et al., Kaer: A Knowledge Augmented Pre-Trained Language Model for Entity Resolution, arXiv, Jan. 12, 2023, 6 pages.
Chen, Z. et al., Symphony: Towards Natural Language Query Answering over Multi-modal Data Lakes, 13th Annual Conference on Innovative Data Systems Research, Jan. 8, 2023, 7 pages.
Narayan, A. et al., Can Foundation Models Wrangle Your Data?, arXiv, Dec. 24, 2022, 12 pages.
Vos, D. et al., Towards Parameter-Efficient Automation of Data Wrangling Tasks with Prefix-Tuning, Table Representation Learning Workshop at NeurIPS 2022, Oct. 21, 2022, 9 pages.
Trummer, Immanuel, From BERT to GPT-3 Codex: Harnessing the Potential of Very Large Language Models for Data Management, Proceedings of the VLDB Endowment, vol. 15, No. 12, Aug. 1, 2022, 4 pages.
Negreanu, C. et al., Rows from Many Sources: Enriching row completions from Wikidata with a pre-trained Language Model, Companion Proceedings of the Web Conference 2022 , Aug. 16, 2022, 9 pages.
Xie, X. et al., From Discrimination to Generation: Knowledge Graph Completion with Generative Transformer, Companion Proceedings of the Web Conference 2022, Aug. 16, 2022, 4 pages.
Fan, W. et al., Parallel Rule Discovery from Large Datasets by Sampling, SIGMOD '22: Companion of the 2022 International Conference on Management of Data, Jun. 11, 2022, 15 pages.
Chen, X, et al., KnowPrompt: Knowledge-aware Prompt-tuning with Synergistic Optimization for Relation Extraction, arXiv, Apr. 25, 2022, 11 pages.
Al Khamissi, B. et al., A Review on Language Models as Knowledge Bases, arXiv, Apr. 12, 2022, 21 pages.
Qin, G. et al., Learning How to Ask: Querying LMs with Mixtures of Soft Prompts, Proceedings of the 2021 Conference of the North American Chapter of the Association for Computational Linguistics: Human Language Technologies, Jun. 6, 2021, 10 pages.
Shin, T. et al., Autoprompt: Eliciting Knowledge from Language Models with Automatically Generated Prompts, Proceedings of the 2020 Conference on Empirical Methods in Natural Language Processing, Nov. 16, 2020, 14 pages.
Petroni, F. et al., Language Models as Knowledge Bases?, Proceedings of the 2019 Conference on Empirical Methods in Natural Language Processing and the 9th International Joint Conference on Natural Language Processing, Nov. 3, 2019, 11 pages.
Pena, E. H. M. et al., Discovery of Approximate (and Exact) Denial Constraints, Proceedings of the VLDB Endowment, vol. 13, No. 3, Nov. 1, 2019, 13 pages.

\* cited by examiner

| Input Data (R) | | GPT-4 | | Bing Chat | | Mini-Chat2Data |
|---|---|---|---|---|---|---|
| A | B | new B (zero-shot) | new B (few-shot) | new B (zero-shot) | new B (few-shot) | new B |
| Doctolib | Jameda | Zocdoc, Practo, KRY / LIVI, RDV Médicaux, Credihealth | Zocdoc, Healthgrades, Practo, Bookimed, Doctor On Demand | DocPlanner, Doctena, Jameda, Keldoc, Oare | Solutionreach, WebPT, OCenda, Axxess Home Health, Mend | DocPlanner, Mondocteur, Arzttermine.de [!], Docturalia, Doxter |
| FoodCheri | Nestor | Frichti, Deliveroo, Uber Eats, Just Eat, Sloya | Frichti, Deliveroo, Uber Eats, Just Eat, Sloya | Frichti, PopChef, Foodette, Deliveroo, City Pantry | Frichti, Foodette, PopChef | Frichti, PopChef, Seazon [!], La Belle Assiette [!], Foodette |
| Oxford Brookes Univ. | Coventry University | Univ. of Oxford, Univ. of Reading, Univ. of Bath, Univ. of Southampton, UWE Bristol | Univ. of Oxford, Univ. of Reading, Univ. of Hertfordshire, Univ. of Northampton, Univ of Southampton | Mastercard, Reading International, Southampton Solent | University of Oxford, University of Cambridge, University of Warwick | Univ. of Surrey [!], Bournemouth Univ., Univ. of Reading, Univ. of Kent [!], Univ of Southampton |
| Tracktor.fr | MachineryZone | La Poste, DHL, UPS, FedEx, 17track | Eu-Construction-Equip, Agriaffaires, RentalYard, Mascus, IronPlanet | Villas et Maisons de France | Villas et Maisons de France | Loxam [!], Kiloutou [!], Mateos, Raminent, Riwal |
| Zenjob | jobmensa.de | Instawork, Coople, Wonolo, Rota, Gig | StudentJob, JobTeaser, Fiverr, LinkedIn, Indeed | clickworker, Streetspotr, Syft, WorkGenius, jooble | clickworker, Streetspotr, Syft, WorkGenius, jooble | Coople, Jobandtalent [!], Syft, JobToday [!], Linda |
| Nightjet | Ryanair | DB, Thello, Trenitalia, BZD, SNCF | Eurostar, FlixBus, DB, EasyJet, TGV Lyria | Oebb, DB, SBB, Nsinternational, Thalys | Oebb, DB, SBB, trainline.eu, Thalys | Euronight [!], SNCF, SBB, Thello, DB |
| Blender | null | Maya, 3ds Max, Cinema 4D, ZBrush, Houdini | Maya, 3ds Max, Cinema 4D, Houdini, ZBrush | Canva, Glorify, SketchUp, Cinema 4D, Modo | Maya, Cinema 4D, 3ds Max, Wings 3D, Revit | Bforartists [!], Fusion 340 [!], Godot Engine [!], FreeCAD [!], SketchUp |
| Zwilling | null | Wüsthof, Victorinox, Global, Shun, MAC | Wüsthof, Victorinox, Henckels International, Global, Shun | Wüsthof, Victorinox, Henckels | zwillingonline.com, Henkels, Wüsthof, wer-zu-wem.de, Kai | Henkels, Wüsthof, WMF [!], Calphalon [!], Cuisinart [!] |
| Kamps Bakery | null | BackWerk, Le Crobag, Ditsch, Starbucks, Dunkin' Donuts | Bäcker Wiedemann, Hofpfisterei, BackWerk, Dunkin' Donuts, Starbucks | Wback, von Allwörden, Backer Gortz, Kamps, Kamps GmbH | BackWerk, Ditsch, Kamps, Kamps Backstube, Kamps GmbH | Müller [!], Mälzer [!], Steinecke [!], Göing [!], Le Crobag |
| LC Waikiki | null | Zara, H&M, Mango, Uniqlo, Primark | Zara, H&M, Mango, Uniqlo, Primark | Defacto, Koton, H&M, Morhipo, Slami.com.tr | Defacto, Trendyol, Koton, Boyner, Morhipo | Koton, H&M, DeFacto, C&A [!], Bershka [!] |

Underlined: incorrect results
*Italic*: mediocre results
[!]: results overlooked by both GPT-4 and Bing Chat but successfully recognized by Mini-Chat2Data

FIG.2

MCI: More Criteria
MCA: More Candidates
TM: Terminate

910 Products

| ID | name | manufacturer | price | ... |
|---|---|---|---|---|
| 101 | X100F | 307 | $1399 | ... |
| 102 | GRIIIx | 308 | $969 | ... |
| ... | ... | ... | ... | ... |

930 Similar Products

| PID1 | PID2 |
|---|---|
| 101 | 102 |
| 102 | 320 |
| ... | ... |

920 Companies

| ID | name | industry | HQ | ... |
|---|---|---|---|---|
| 307 | Fujifilm | electronics | Japan | ... |
| 308 | Ricoh | electronics | Japan | ... |
| ... | ... | ... | ... | ... |

940 Competitors

| CID1 | CID2 |
|---|---|
| 307 | 308 |
| 307 | 421 |
| ... | ... |

FIG.9

AUTOMATIC DATABASE ENRICHMENT AND CURATION USING LARGE LANGUAGE MODELS

CROSS REFERENCE TO RELATED APPLICATION

This application claims priority from U.S. Application No. 63/530,795 filed on Aug. 4, 2023, entitled "AUTOMATIC DATABASE ENRICHMENT AND CURATION USING LARGE LANGUAGE MODELS," which is hereby incorporated by reference in its entirety.

FIELD

This disclosure teaches methods, techniques, and systems related in general to the field of information processing. More specifically, the disclosure relates to the automatic curation of databases using large language models, where each database curation task is one of a list comprising:
- a database enrichment task to compute new data records comprising tuples or other associations of data items and insert the records into the sub-structure of the database,
- a database initialization task (as a special type of data enrichment task) to construct the database from scratch, or to construct specific data relations, tables, sub-structures, or parts of a database from scratch, (this initialization task may be a separate task in its own right in some examples, or, in other examples, it may be an explicitly available special version of a database enrichment task. In yet other examples, it may correspond to the application of the enrichment task to an empty database or an empty data relation, table, sub-structure, or database part, provided that sufficient meta-information about the data to be inserted is available and can be used),
- a database verification task (a.k.a. database checking task) to verify, with help of the one or more LLMs, data contained in the sub-structure, and, when incorrect data is identified, return the incorrect data as output for further processing or correction,
- a database update task to automatically recognize and update erroneous or outdated data within the sub-structure of the database, and
- a null-value or a missing value replacement task to replace null-values contained in the sub-structure of the database by concrete data values.

Each database curation request comprises at least one of:
(i) a request type specifying whether the database curation request is a database enrichment request, a database initialization request, a database verification request, a database update request, or a null-value replacement request,
(ii) a name of a relation of the database, on which the requested task is to be carried-out, or which, in case of a database initialization request, is to be created from scratch, and, in case of an enrichment request, an update request, a null-value replacement request, or a verification request, the designation of a set of target attributes of the relation to be curated, and other attributes of the relation being fixed attributes, where
  (a) in case of an enrichment request, the target attributes are enriched with new values or new combinations of values, giving rise to new tuples that extend the projections of existing tuples over the fixed attributes, and
  (b) in case of an update request, only attribute-values in target attribute columns are updated, and
  (c) in case of a null-value replacement request, only null-values occurring in target attribute columns are replaced by concrete values, and
  (d) in case of a verification request, all attributes are fixed, and no attribute is a target attribute, and correctness of the entire tuple is checked,
(iii) in case of a database initialization request, sufficient metadata for defining the structure and intended semantics of a relation to be created from scratch, the metadata comprising one or more of:
  (i) a designation and/or a description of the set of attributes of a relation to be created from scratch, and
  (ii) a description of the intended semantics of the relation to be created from scratch.

The present disclosure pertains to a novel method (and system), referred to as CHAT2DATA, for automatically enriching and curating databases by obtaining reliable data. This data is sourced from pre-trained large language models (LLMs) or, with the assistance of one or more LLMs, from the Web, local document repositories, or other information/data sources, leveraging the capabilities of pre-trained LLMs.

In the subsequent descriptions, the phrase "the CHAT2DATA system" refers to some implementation embodying the CHAT2DATA method. However, under certain circumstances, when clear from the context, the term CHAT2DATA may be used independently to denote a CHAT2DATA system. The described method in this disclosure involves the utilization of a system that is seamlessly integrated with a database and capable of direct interaction with large language models (LLMs). Where available, the system will also be connected to a knowledge base. The system will properly utilize one or more LLMs to obtain highly reliable data for enriching, correcting, updating the database, or constructing a database or its sub-parts such as tables from scratch. Note that although some examples in this disclosure use a particular LLM, such as GPT4, the disclosure itself is not limited to any particular LLM. The principles and methodologies outlined can be implemented using any LLM(s). this disclosure is not exclusive to any LLM, and can be applied using any LLMs. In the subsequent subsections of the current section, we provide essential background information to enhance comprehension of the present disclosure.

BACKGROUND

Decision Making in modern enterprises and institutions requires reliable data. Most companies, NGOs, and governmental entities, have access to large amounts of data stored in structured databases (DBs) or knowledge graphs (KGs). For example, according to https://www.superoffice.com/blog/crm-software-statistics, 91% of all companies with more than 10 employees maintain a Customer Relationship Management (CRM) system with data about their respective customers. Other examples include databases with rich information about current and alternative suppliers, pricing data for competitive intelligence, event data, job market data, and social network data. More examples will be given further below. Some of these data exist within an enterprise's internal environment, such as in various documents stored in the enterprise's internal document repository. Examples of data extracted or inferred from these documents include billing information and payment details from invoices, patient history and treatment information from medical records, case details and outcomes from legal documents, purchase orders and supplier details from procurement documents, project timelines and resource allocation from construction documents, and agreement terms and parties involved from business contracts, among many others. Some of the data in enterprise DBs is not publicly available inside information, but a growing part is useful outside information carefully selected and appropriately structured in form of data items that are put into relation with attributes and other items. Example applications that uses outside data include, among many others, the following: 1. Supply Chain Optimization 2. Market Analysis and Competitive Intelligence 3. Risk Assessment and Fraud Detection 4. Talent Acquisition and Workforce Planning 5. Social Media Analytics 6. Financial Analysis and Investment Decisions 7. Historical Dataset Construction for Machine Learning Analysis 8. Event Data Analysis 9. Crime Prevention and Identification based on Criminal Data Analysis 10. Biodiversity Management using Wildlife Sighting Data 11. Weather Data Integration for Operation Optimization and Demand Prediction 12. Health Data Analytics, 13. Discovery of drug side effects (e.g., stemming from data in disparate blogs), 14. Academic Data Integration and Analytics, 15. Customer Relationship Management, 16. UFO Sighting based UFO Analysis, and many others.

Structured data from internal or outside data sources can be used by application software and, in particular, as basic input data to statistics and machine learning software and to various algorithms for better decision making.

Massive data from various sources is traditionally accessed in one of several ways: (i) by automatically extracting the relevant data directly from the source, such as the Web or some internal document repository and structuring it appropriately, which requires tools such as text-mining and information extraction software, and is error prone; (ii) by acquiring pre-extracted structured data either in bulk form or via APIs from professional business data providers. Such professional data providers extract large amounts of data from the Web or from other sources; and (iii) by human input, including manual entry of data, such as manually filling in Excel sheets, or crowdsourcing from various experts who contribute data via a crowdsourcing platform. One typical example is the Owler database which contains various company information crowdsourced from a community of users; (iv) by inference from existing data or information, such as linkage prediction of missing links based on existing links in a knowledge graph, rule-based data generation based on existing facts, and derivation of new attributes (also known as new features) based on existing attributes, among others. The data are then maintained and curated in very large databases.

Data derived from these methods often exhibits variable reliability, such as manual input through digital forms, crowd sourcing (e.g., the Owler database), or data extraction programs, do not consistently ensure correctness and completeness. These shortcomings are typically due to inherent flaws in the collection processes or the data sources. As a result, data engineers are frequently tasked with a broad spectrum of database curation responsibilities. These tasks encompass, for example, data verification, i.e., detection of data errors (typically followed by subsequent cleaning of detected errors), data enrichment, i.e., adding missing data into an incomplete database, and others.

It is with these issues in mind, among others, that various aspects of the disclosure were conceived.

Large Language Models (LLMs)

To reduce human effort in database curation, researchers and data practitioners have developed a broad array of automated methods to streamline database curation tasks. Certain systems have demonstrated notable success in fully automating some database curation tasks in specific scenarios. However, these existing works were proposed before the emergence of Large Language Models (LLMs). This disclosure distinguishes itself from existing work by focusing particularly on the utilization of Large Language Models (LLMs) to facilitate various database curation tasks. The methods and systems described in this disclosure can potentially replace humans in database curation tasks, such as those performed by crowd-sourcing experts.

Opportunities Brought by LLMs LLMs such as GPT4 lead to a tremendous opportunity for generating and curating data for all types of business applications. LLMs are trained on large text corpora including huge parts of the Web, and can handle complex natural language prompts flexibly. Advanced LLMs such as Bing Chat, and GPT-4 (with the web-browsing feature enabled, or when paired with a web access plug-in), have the capability to directly interact with the internet. They can autonomously conduct a web search and incorporate relevant, current web information into their operational context. By their nature, LLMs can modify their responses based on feedback without the need of changing their foundational code, a property that the disclosed solution heavily exploits for producing accurate data through various methods of LLM-interrogation. Moreover, they possess the unique capability of creating new data derived from existing ones. Depending on the used model, different forms of prompts (NL-queries) have been used to extract data from LLMs. Google's BERT Model can be prompted by phrases such as "A competitor of ACME is [mask]", where "[mask]" is a result variable to be instantiated with the desired company names. Models from the ChatGPT family can be prompted in the same way, but can also directly process and answer prompts of the form "list the 10 most important competitors of ACME".

Data quality problems. The answers LLMs produce, while often highly impressive to humans, are, in their truthfulness and appropriateness, significantly below the data quality standard expected of manually curated databases. For example, GPT-4, when asked (on 7 May 2023) about "Competitors to Oxford Brookes University regarding reputability", answers "Oxford University", "Univ. of Cambridge", and 5 other universities that are all ranked way above Brookes, even though GPT-4 seems to be well-aware of the league tables. When asked (on 19 Apr. 2023) to list 10 papers by Georg Gottlob about query processing, it got three papers wrong, and, embarrassingly, listed Georg Gottlob as author of other colleagues' work. Bing-Chat, which is connected to the Web, didn't make the same mistake, but when asked (on 4 May 2023) to list competitors to Oxford Brookes, the answer included "Mastercard" as well as other financial service providers, which Bing-Chat had gathered from incorrect Web data. This shows that, notwithstanding some claims that Web access "solves" factual errors/hallucinations in GPT, Web access without further steps of verification does not solve the correctness problem, and may even introduce further mistakes due to incorrect Web data.

That LLMs may provide inaccurate or even "hallucinated" factual information is well known When it comes to Web search, human users are fault tolerant and indulgent, and often recognize and simply disregard incorrect or inappropriate search results. However, human users are generally quite disappointed when they find incorrect data in a database. Moreover, application programs cannot spot incorrect inputs easily and may make catastrophic errors when fed with incorrect data.

Key Innovations of CHAT2DATA and Limitations of Previous Work

CHAT2DATA goes beyond existing database curation methods, including traditional methods and recent LLM-based methods, in several ways:

- The core of CHAT2DATA is not based on prompting, but more importantly on a dynamic methodology that decomposes a complex process into smaller sub-processes. It usually dynamically determines how and what to query the LLMs for each sub-process, and how to integrate their results to produce a final result. The automatically constructed workflow generated by CHAT2DATA based on an input database and a chosen database curation process, and, in particular the form, number and sequence of prompts issued, and the depth of nesting or of recursion of the various performed processes is not necessarily pre-determined by the database to be curated, or by other inputs, but may heavily depend on the obtained prompt-answers, as well as on outputs of other other data or information gathering sub-processes (e.g., complementary programs).
- CHAT2DATA does not blindly trust the LLMs' responses. Instead, it uses sophisticated processes to interrogate the LLMs, such as utilizing their own knowledge to question their answers.
- CHAT2DATA effectively utilizes data or information from various sources to facilitate various processes in the database curation tasks it performs, such as enhancing the quality of LLM-based processes or directly generating data for data enrichment.
- CHAT2DATA employs a diverse set of prompting techniques. These include, for example, problem decomposition prompts for breaking down a task into smaller sub-problems, dig-in prompts for further discovering candidate data, and many other novel techniques introduced in this disclosure.
- CHAT2DATA utilizes various complementary programs as additions to or replacements for its LLM-based processes in different sub-tasks to better accomplish these sub-tasks. For example, CHAT2DATA assesses the uncertainty of the LLM's answers, and whenever an LLM fails or strong uncertainty is reflected in the LLM's response, CHAT2DATA triggers complementary programs as additions or replacements.

None of these key innovations, let alone the combination of some or all of these features, are exhibited by previous database curation work. As noted below, the example of data enrichment is used to illustrate this point.

Traditional methods for enriching a database typically rely on data/information extraction techniques and data integration methods that combine data from different sources. These approaches aim to find additional or missing data from external sources. However, when such sources do not exist or are not accessible, data generation methods come into play. For instance, reasoning-based methods can infer missing data tuples from existing ones, linkage prediction techniques can help identify missing links in a graph database, while data imputation methods can be employed to estimate missing values or incomplete data in a dataset. CHAT2DATA sets itself apart from traditional methods by innovatively utilizing LLMs as the main data source. However, when necessary, CHAT2DATA can also be combined with said traditional approaches to achieve optimal results in enriching databases. Some existing work aims to extract knowledge from LLMs, using the LLMs as a knowledge base. However, these approaches are not suitable for practical use in database enrichment, as they often lack the ability to convert LLMs' potentially inaccurate responses into accurate data. These methods typically involve fine-tuning techniques or prompting techniques to access the desired knowledge. Due to the high cost and storage requirements of fine-tuning, researchers have shifted to prompting, a more effective alternative. For example, given a user-defined knowledge schema consisting of a collection of classes, the SPIRES system performs promptings to GPT to acquire attribute values of class instances in the schema. Direct prompting is used for attributes with primitive-type values, whereas recursive prompting is initiated for "nested" attributes whose values are in-line instances of other classes. The number, structure, and sequence of prompts, in such approaches, is pre-determined by the input (database or knowledge graph). Existing work has studied how to enrich a knowledge graph, a particular paradigm of database, by using prompts to query an LLM about missing data, such as links, in the graph. However, existing methods merely focus on the prompting process, employing various advanced techniques like few-shot prompting or Chain-of-Thought prompting with a single prompt or a fixed and limited workflow of prompts for each sub-task. These methods lack the flexibility and ability to tackle complex tasks through dynamic and adaptive workflows. Moreover, they do not include necessary processes for checking the precision and recall of the generated data, let alone further improving the quality of the generated data. As a result, these methods cannot guarantee the quality of produced data and are insufficient for production purposes. Additionally, they have limited capability to utilize data or information sources beyond the knowledge of the LLM, which restricts their application scenarios.

The Colossal Potential of LLMs

LLMs are deep learning models that have revolutionized the field of natural language processing (NLP). They are based on the transformer architecture which allows them to process sequential data much more effectively than previous models. LLMs can understand human input and generate responses in natural language, making them useful in a variety of NLP tasks, including Question Answering, Machine Translation, Text Summarization, and Language Modeling.

Recent advancements in LLMs have led to the development of several state-of-the-art systems such as those of OpenAI's GPT family, Facebook's ROBERTa and more recently, GPT4, Google's Bard, and Llama. These models have demonstrated remarkable abilities in generating coherent and contextually relevant text, leading to significant improvements in various NLP and information gathering tasks. Two non-commercial models are Llama and Alpaca. Alpaca (based on Llama) analyzes multiple topics or viewpoints within a single text and performs well on tasks such as sentiment analysis and topic modeling. LLMs are currently disrupting the field of information search by allowing for more advanced natural language queries and providing more accurate search results than previous models. Moreover, LLMs can generate high-quality content with minimal human intervention, making them a valuable tool in content creation and digital marketing.

The primary objective of this disclosure is to describe new methods of utilizing LLMs to automatically enrich and curate databases. As illustrated in FIG. 2, even when used in a straightforward manner, i.e., with zero-shot or few-shot prompts, GPT-4 and Bing Chat can already identify new competitors for some companies in R. For example, Bing Chat with zero-shot prompts found four close competitors to Doctolib, as shown in the first row. However, they also generated numerous incorrect results, which we will discuss next.

Problems and Caveats of LLMs

The reliability of results from LLMs, including the GPT series, has been a point of concern and criticism. Users have discovered that these models can sometimes generate answers that exhibit biasinaccuracies hallucinations (e.g., generating incorrect statements), or even fabrications incompleteness outdated information in their responses. LLMs connected to the Internet, such as Bing Chat, are somewhat less susceptible to these issue, but may be biased or misled by Web content. Also, LLMs have been found to lack consistency in their responses, for instance, when faced with different quasi-paraphrases. FIG. 2 shows that both GPT-4 and Bing Chat made numerous errors, including returning completely incorrect (highlighted by underlines) and mediocre (highlighted by italic fonts) results in the top five, and missing top competitors in the results. For example, we queried GPT-4 and Bing Chat for the top five competitors to FoodCheri, a company in France delivering its own chef-prepared meals. GPT-4 and Bing Chat proposed companies such as Deliveroo, Uber Eats, and Just Eat, which are not top competitors to FoodCheri, as their business models are different. They also erroneously included some mistakes, such as Glovo, which does not operate in France. However, they failed to mention Seazon, another provider of chef-prepared meals, which is a very close competitor to FoodCheri. Such types of mistakes are usually difficult to detect for a human with limited knowledge about these companies. Consequently, a database enrichment and curation system relying solely on these LLMs is impractical for production, as it still demands substantial human effort to verify the correctness of new data generated by LLMs, essentially shifting the focus from data discovery to data quality control.

Another challenge with using commercial LLMs is the cost and interaction limitations with commercial LLMs like ChatGPT, potentially problematic for the disclosed approach of using multiple prompts for a single task, leading to substantial server use and increased internet traffic. However, we do not consider this to be a significant issue. Some pre-trained models like Llama can be deployed and used offline. We expect even more powerful LLMs will soon be available for free and local use. Moreover, using multiple prompts for verifying or detecting a data item may still be significantly less expensive than using human resources via crowdsourcing.

Advanced Prompting Techniques

Prompting is the act of providing a carefully crafted query, such as a question or statement to an LLM, in the query format supported by the LLM, guiding it to generate a desired response. The most basic type of prompts are zero-shot prompts, which are queries without any examples. Although these prompts are quite popular among users, they often do not yield the desired precise outcomes. Therefore, researchers have developed more advanced prompts. For example, few-shot prompts give the LLM a handful of input-output examples to help shape the response; chain-of-thought prompts contain explanations (usually provided by a human Prompt Engineer) of intermediate solution steps so that the LLM can learn how to solve a complex problem step-by-step.

Database

The term database may be interpreted to its broadest extent throughout the descriptions herein. In various embodiments, it may refer to one or more of the following types of databases: ■ Relational databases, which organize and store data in a tabular format with predefined schemas; ■ Non-relational databases, also known as NoSQL databases, which are flexible and scalable data storage solutions that depart from the rigid structure of relational databases, allowing for efficient handling of large volumes of unstructured or semi-structured data. Examples of NoSQL databases include, such as, Document Databases, Key-Value Stores, Columnar Databases, Graph Databases, RDF stores, as well as non-relational triple or tuple-stores; ■ File-Based Databases, which utilize files as a means of storing and organizing structured data, providing data persistence and query capabilities, and thus are conceptually similar to databases; ■ Vector databases, which are designed to efficiently store and search vector data, such as embeddings from text, images, or other types of data, allowing for high-dimensional similarity searches; and ■ some other types.

Data/Information Source

The term "data/information source" may be interpreted in its broadest sense throughout the descriptions herein. Generally, it refers to any origin from which specific data or information useful to a database curation process can be obtained in a suitable manner. This includes the direct extraction of data or information explicitly existing in the source, as well as those implicitly contained or indicated by contents within the source. In various embodiments, a data/information source may refer to different concrete places, including:

1. a local or remote document repository, such as an enterprise's local document repository or the Web,
2. a device that collects or produces data, such as a weather monitoring device,
3. a database system,
4. an API endpoint providing access to real-time or static data,
5. a crowdsourcing platform, and
6. any other source capable of supplying relevant data, Document Repository The term "document repository" may be interpreted to its broadest extent throughout the descriptions herein. In various embodiments, it may consist of one system or a combination or an integration of systems from a group of systems comprising:

1. the World Wide Web,
2. an intranet or a federation of intranets,
3. a document management system,
4. a set of documents stored in a file system,
5. an electronically searchable document or library catalog with links to online documents or to electronically stored documents,
6. a full-text database,
7. a database that stores text fields and that can retrieve texts via a suitable query language,
8. a searchable content management system,
9. a social network, where user posts are regarded as documents,
10. an image repository retrievable by an image search facility retrieving images from documents, and
11. a log management system of Web search queries.

In the present description, the phrase 'internal document repository' refers to a document repository that is accessible only within an organization, as opposed to being available to the public or external tools.

The Term "Different LLMs"

In the present description, the term "different LLMs" refers to a group of Large Language Models (LLMs) that vary in one or more of aspects including:

(1) LLM Family: This includes models that belong to different families of LLMs, such as GPT and Llama. These families are often developed by different organizations and may have distinct architectures and training methodologies.

(2) Version of the LLM: Different versions of the same LLM family, for example, GPT-2, GPT-3, and GPT-4, which represent successive improvements and updates to the model.

(3) Parameter Configuration: Variations in the parameter configuration of the LLM, including the number of parameters (e.g., small, medium, and large models within the same family) and specific settings used during training and fine-tuning. This also encompasses runtime settings such as temperature (which controls the randomness of the output), top-p (nucleus) sampling, frequency sampling, presence penalty, and others.

(4) Training Data: The datasets used to train the LLM, which can significantly affect the model's performance and behavior. Different LLMs may be trained on varied corpora, such as general web data, domain-specific texts, or multilingual datasets.

(5) Use Case Specialization: Some LLMs may be fine-tuned or adapted for specific use cases or industries, such as medical text analysis, legal document processing, or customer service interactions.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description. In certain embodiments, the disclosed embodiments may include one or more of the features described herein.

Generating reliable data for databases automatically from LLMs is a pressing and a most relevant research problem that has not been resolved so far. According to OpenAI co-founder John Schulman, truthfulness is "one of the biggest technical problems around language models". Truthfulness could be improved by using reinforcement learning (RL) to assess how sure a system is about its answer and by adjusting the reward structure based on the accuracy and confidence of the generated responses. LLMs compress large corpora into drastically smaller neural networks under loss of information. Therefore, as Schulman also noted, LLMs will often have to make choices and guesses, which may turn out to be be incorrect. CHAT2DATA addresses this problem by a new approach of intelligent interrogation and instruction via prompts, complementary to (and compatible with) the the above-mentioned possible RL improvements Shulman argued for. By using intelligent interrogation, the power and embedded knowledge of the LLMs is used to assess, correct, or improve their own answers. This solves the above-mentioned problems.

More concretely, the CHAT2DATA approach fully automatically issues prompts that gather information from one or more LLMs about the database objects in question and the relevant application domain, and use this information augmented by local data to:

Instruct ("teach") an LLM using examples of correct answers and automatically constructed "chain-of-thought" that explain to the LLM how to arrive to a desired answer.

Query the LLM for an initial answer.

Query the LLM for knowledge about the relation in question, which will be further used in the interrogations.

Interrogate the LLM by a sequence of prompts about its own answers to assess the answers' truthfulness and reliability. The interrogation is adaptive: each prompt generated by CHAT2DATA may depend on previous prompts and answers. Some prompts may resemble catch questions in a police interview to check if the LLM can be tricked into a contradiction. Other prompts will assess the resilience of an answer by modifying a previous prompt, or by scrutinizing the LLM about various whereabouts and attributes of response items.

Assess whether, at a certain stage of the prompting, improvements are possible. Where result improvements appear possible, CHAT2DATA will issue special prompts for triggering such improvements, and will continue to do so until no further improvement is possible.

Where appropriate, novel techniques are employed for using the LLM to identify relevant available Web sources and to produce code (executed by the CHAT2DATA System) that accesses, and fully exploits them.

A CHAT2DATA system produces structured data tuples as results. In some examples, each such tuple is associated with a confidence value (or "score") in the interval [0,1]. This value will be computed by CHAT2DATA.

As an example, assume an input database D includes a single relation PRODUCTS with schema PRODUCTS (CompanyName:string, Product:string). In addition to the input DB, task specifications will be given to CHAT2DATA, for example:

@enrich (PRODUCTS, CompanyName, *Product), telling CHAT2DATA that for each already present company name in the PRODUCTS relation (which is called the input relation of this @enrich command), it should try to find new products. Instead, the task specification such as @enrich (PRODUCTS, *CompanyName, *Product) would tell CHAT2DATA that it should try to find new tuples <x,y>, where a is a (possibly new) company name, and y a product. In both cases, the new tuples shall be inserted into the database (here into relation PRODUCTS). The user may also specify a minimum confidence value c, for example, via a command @minconf(c), which means that only new results with at least confidence c should be inserted into the database. In addition, parameters for the maximum number of new tuples to insert and for similar constraints may be added. In a similar way, a user may specify check requests asking CHAT2DATA to check the tuples of a relation for correctness, null-replacement requests asking CHAT2DATA to replace, where possible, null values by real values. To solve such requests using LLMs, CHAT2DATA will automatically generate an adaptive sequence of prompts to the LLM with the major goals of:

(a) instructing an LLM (within a running prompting session) about certain intended relationships (e.g. the competitor relationship) by prompting it with well-chosen example-instances from the database, optionally, together with the name and description of the input relation, attribute or column names, and their descriptions, if this information is available. In the case of dealing with a database initialization task, i.e., creating a relation from scratch, only these descriptions are used in the instruction to the LLM, since no example instances are available.

(b) obtaining from the LLM further information about the type and properties of attributes, relations and entities, for example, interrogating the LLM about the type of entities, or the major criteria (and their respective weights) for two entities being in a certain relationship (e.g., in a competitor relationship), (c) instructing the LLM (within a running prompting session) of how answers may be generated via automatically generated "chains-of-thought" that instruct the LLM about the logical steps to perform for generating an answer, and thus guide the LLM towards high-quality answers.

(d) using knowledge acquired in previous prompts for generating preliminary answers in a specified desired format that can be automatically parsed and interpreted by CHAT2DATA.

(e) by smart interrogation, checking LLM-answers for consistency and resilience, and generating or updating confidence scores, allowing CHAT2DATA to eliminate dubious results, and/or to resolve conflicts, (f) organizing the remaining results in a best-fit ranked list, (g) checking and refining best-fit ranked list for completeness by "digging" in between consecutively ranked items in order to possibly discover new items, (h) where possible, acquiring knowledge about useful Web-accessible external sources. For each such source, obtaining from the LLM its URL, as well as information on, and examples of, it usage.

(i) where possible, letting the LLM generate a program (e.g. a Python program or an SQL query) to be executed by CHAT2DATA for extracting useful data from external Web-accessible sources, and (j) assisting in checking whether the answer data delivered by an LLM are personal data that may violate GDPR, and possibly detecting biases in data returned by the LLM.

A prompt issued by CHAT2DATA may combine two or more of the above (and possibly other) goals.

The above goals correlate with various prompt types, which, among others, will be standardized for being issued in a parameterized form. Further examples and details are provided in the following descriptions.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 2 presents a table of examples illustrating an exemplary input relation and the results of GPT-4, Bing Chat, and Mini-Chat2Data, the latter being an example implementation of the distinct disclosure. The first two columns, 'A' and 'B', together depict an exemplary binary input relation 'R', comprised of six known pairs and four incomplete pairs representing company competitors. The following columns, namely 'GPT-4', 'Bing Chat', and 'Mini-Chat2Data', showcase the enrichment of the database, i.e., the competitors as identified by each respective model or system. For both GPT-4 and Bing Chat (in Balanced mode), we present their results based on zero-shot and few-shot prompts, with the existing competitor pairs in 'R' serving as examples in the few-shot prompts. During this comparative experiment, we explicitly tasked each method to deliver the top five competitors discovered for each company 'A' in 'R'. Notably, Bing Chat occasionally returned less than five results. Each competitor generated for every company 'A' was subjected to manual validation. Company names underlined are indicative of incorrect results. Italicized names represent mediocre competitors that, while they may compete with company 'A' to some degree, are not considered close competitors and hence, should not be listed in the top five results. Correctly identified competitors are displayed in black text. Any competitor marked with a "[!]" symbol was overlooked by both GPT-4 and Bing Chat but successfully recognized by Mini-Chat2Data.

FIG. 9 displays an example input database according to an example of the instant disclosure.

DETAILED DESCRIPTION

Figure 1:
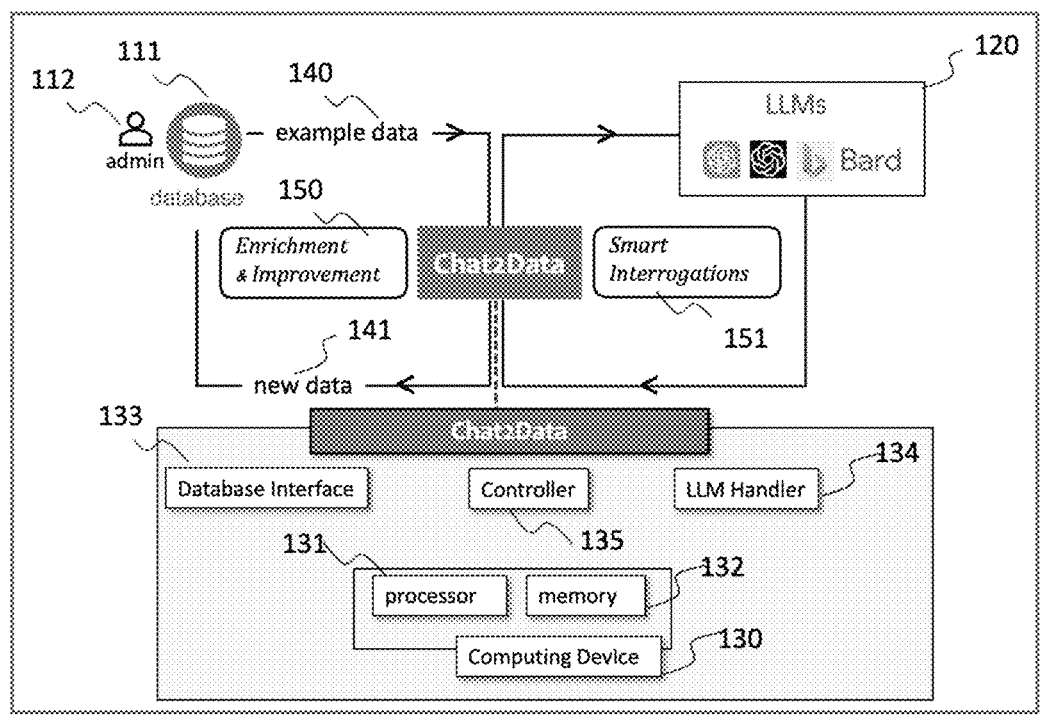
FIG. 1 provides an illustrative schematic diagram consistent with the instant disclosure. This figure exemplifies the system's interaction with Language Learning Machines (LLMs) through smart interrogations. This mechanism facilitates the generation of new data, which is consequently employed to enrich and curate the database. It also displays the components used in an embodiment of the disclosure, described in the section titled "An Example of CHAT2DATA".

The present invention is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms first, second, etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Ranges are used herein shorthand so as to avoid having to list and describe each and every value within the range. Any appropriate value within the range can be selected, where appropriate, as the upper value, lower value, or the terminus of the range.

Unless indicated to the contrary, numerical parameters set forth herein are approximations that can vary depending upon the desired properties sought to be obtained. At the very least, and not as an attempt to limit the application of the doctrine of equivalents to the scope of any claims, each numerical parameter should be construed in light of the number of significant digits and ordinary rounding approaches.

The words "comprise", "comprises", and "comprising" are to be interpreted inclusively rather than exclusively. Likewise the terms "include", "including" and "or" should all be construed to be inclusive, unless such a construction is clearly prohibited from the context. The terms "comprising" or "including" are intended to include embodiments encompassed by the terms "consisting essentially of" and "consisting of". Similarly, the term "consisting essentially of" is intended to include embodiments encompassed by the term "consisting of". Although having distinct meanings, the terms "comprising", "having", "containing' and "consisting of" may be replaced with one another throughout the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

"Typically" or "optionally" means that the subsequently described event or circumstance may or may not occur, and that the description includes instances where said event or circumstance occurs and instances where it does not.

Wherever the phrase "for example," "such as," "including," and the like are used herein, the phrase "and without limitation" is understood to follow unless explicitly stated otherwise.

Generally, embodiments of the present disclosure are directed towards thermally conductive materials, including, as non-limiting examples.

In the context of this description, the term 'entity' refers to a conceptual representation of a distinct and identifiable object, concept, or entity. Unlike primitive types such as integers, floats, or strings, entities typically involve multiple primitive or complex data types, serving as their properties or attributes. Furthermore, when we refer to a value as an entity, it implies that the value represents or identifies a corresponding real-world entity. For instance, when we mention that 'Google' is an entity of the company entity type, we mean that 'Google' represents the specific real-world company with the name 'Google'.

An Example of C$_{HAT}$2D$_{ATA}$

In this section, we describe an exemplary embodiment of the present disclosure, herein referred to as Mini-C$_{HAT}$2D$_{ATA}$. The fundamental configuration of Mini-C$_{HAT}$2D$_{ATA}$ includes the setup of pertinent information which includes: (1) the database connection string, and (2) the selection of LLMs to be utilized. In this example, Mini-C$_{HAT}$2D$_{ATA}$ utilizes a single LLM. Nevertheless, in some other embodiment, the system effectively harnesses multiple LLMs. Detailed insights into this flexibility in orchestrating multiple LLMs will be offered in the section titled "Harnessing Multiple LLMs".

Scenario

For the illustration of this example, we assume an example input database D, which contains a single relation R with schema R(A:string, B:string). Every A is in the relationship ℛ with B. We call this relationship ℛ the "considered relationship". Suppose an administrator connects D to Mini-CHAT2DATA and specifies @enrich(R,A,*B), which specifies that A is the fixed attribute, while B is the target attribute, and directs the system to find up to k new target attribute values for each fixed tuple-part, i.e., for each distinct A value in this example. Here k is a number predefined by the user. For simplicity, we assume the input relation R is symmetric. As a running example throughout the present example, we will explain how this example prototype can enrich and fill in null values in the relation of competitor pairs displayed in the two "Input Data" columns of the table in FIG. 2. It should be noted that the task in this example involves two main aspects: Enrichment: the target attributes may be enriched with new values or new combinations of values, giving rise to new tuples that extend the projections of existing tuples over the fixed attribute. In this example, the enrichment task entails finding additional competitors for companies that already have known competitors saved in the database. Filling in null values, i.e., replacing, where possible, null values, which, depending on the data model, are unknowns represented by some null symbol, or that are left empty. Note that, only null-values occurring in target attribute columns may be replaced by concrete values. In this example, this involves identifying competitors for companies that currently have no known competitors in the database.

In various embodiments of the current disclosure, a database curation request comprises:
(i) a request type specifying whether the request is a database enrichment request, a database initialization request, a database verification request, a database update request, or a null-value replacement request,
(ii) the name of a relation of the database, on which the requested task is to be carried-out,
(iii) in cases of an enrichment request, a update request, a null-value replacement request, or a verification request, the designation of a set of target attributes of the relation to be curated, the other attributes of this relation being called fixed attributes, where
  in case of an enrichment request, the target attributes may be enriched with new values or new combinations of values, giving rise to new tuples that extend the projections of existing tuples over the fixed attributes, and
  in case of an update request, only attribute-values in target attribute columns may be updated, and
  in case of a null-value replacement request, only null-values occurring in target attribute columns may be replaced by concrete values, and
  in case of a verification request (also referred to as a "checking request"), all attributes are fixed, and hence no attribute is a target attribute, and the correctness of the entire tuple will be checked.
(iv) in case of a database initialization request, the designation of a set of target attributes of the relation to be constructed, the target attributes define the structure and content of the relation to be created from scratch.

Figure 3:
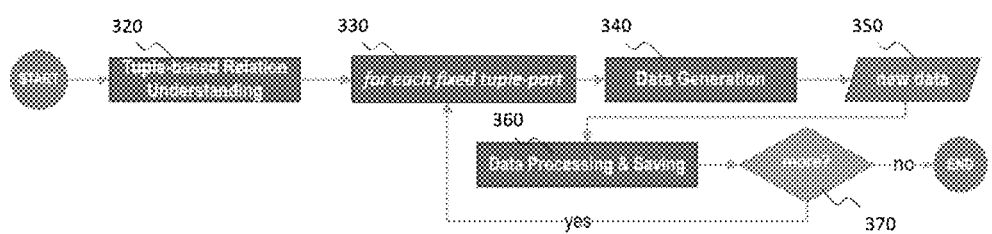
FIG. 3 showcases a streamlined flowchart of an example embodiment described in the section titled "An Example of CHAT2DATA".

The solution outlined in this example already covers enrichment requests and and null-value replacement requests, and can also be easily adapted to address update requests and database verification (a.k.a. checking) requests. In fact, an update request, say @update (R,A,*B), applied to a tuple <a,b> of a relation R can be achieved by first considering the enrichment-tuples <a,$b_1$>, . . . , <a,$b'_k$> (with k'≤k) that would be produced for the value "a" by the command @enrich (R,A,*B), and then, in the database, replacing <a,b> by the enrichment-tuple that is a best match. Regarding database verification requests, recall that when carrying out an enrichment request, after generating new competitor candidates, these have to be checked for plausibility via smart LLM interrogations. The same checking phase may be applied to competitors that are already listed in the database. More generally, the disclosed data enrichment methods contain a checking phase for generated solution candidates, and this checking phase can also be used for checking the correctness or plausibility of data (tuples, records, data items, associations between data items, . . . ) already existing in the database. In this sense, part of the code for solving an enrichment request can also be used for solving database verification request. GPT4 (accessed on 10 May 2023) is used as the LLM in this running example. FIG. 3 outlines the high-level workflow of Mini-CHAT2DATA, which is illustrated in the present example.

Components

As shown in FIG. 1, Mini-CHAT2DATA may include:
1. At least one computing device 130 comprising at least one processor 131, and a non-transitory memory 132, the computer being able to execute programs stored in the memory.
2. Database Interface 133, which provides connections and read/write interactions with various databases. To achieve this functionality, a suitable library in the chosen programming language can be utilized, such as SQLAlchemy in the Python programming language.
3. LLM Handler 134, which can transmit prompts to LLMs and receive responses. The implementation of this component can be achieved by utilizing various techniques, such as: leveraging API calls to interact with a pre-existing LLM service or platform, developing a custom interface that establishes communication with the LLMs through appropriate protocols or libraries, utilizing language model frameworks or libraries that provide built-in functionality for prompt handling and response retrieval. The specific implementation approach may vary depending on the chosen LLM and the programming language used in the system.
4. Controller 135, which serves as the central orchestrator responsible for making step-to-step transitions according to a predefined workflow, as described in the subsequent section. In this particular example, the controller is implemented according to the flowchart displayed in FIG. 3 and FIG. 4. However, it is important to note that other embodiments may adopt more sophisticated implementations of the controller to enable more dynamic decision making of step-to-step transitions during runtime. These alternative implementations will be further elaborated in the sections titled "Knowledge-based Dynamic Decision Making at Runtime" and "Other Implementations of Dynamic Decision Making at Runtime". In some examples, zero or more constraints are accessible to the controller, each constraint being either a database constraint expressing a property to be fulfilled and maintained by the dataset, or a process constraint that restricts the control flow to be generated by the controller.

Example Workflow

This section presents an example workflow generated by the controller of Mini-CHAT2DATA as shown in FIG. 3.

S1 Tuple-based Relation Understanding 320 Initially, the system conducts a preparation step to comprehend the input relation. The outputs, stored as constants, convey various aspects of the input relation, such as rel_name, a term describing the relationship of entities within the input tuples. To generate these constants, the system utilizes the Tuple-based Relation Understanding Prompts (TRUPs), which are prompts that include some tuples from R as examples and request the LLM to produce the values for the mentioned constants. An example TRUP, as illustrated in Ex1, asks the LLM to identify the entity types of entities in a relation, define their relationship, and store this information in the relevant constants. For example, the constant rel_name is assigned the value "competitors" based on the LLM's response to the TRUP.

Ex1. Example of TRUP: Here are four tuples of a data relation R: (Zenjob, jobmensa.de), (FoodCheri, Nestor), (Doctolib, jameda), (Oxford Brookes Univ., Coventry Univ.) Assume (x,y) is a tuple of R then, please fill the following ellipses: A) x is a . . . B) y is a . . . , C) x is in the . . . relationship with y. in a way that it best describes what x is, what y is, and what the relationship between x and y is. Just fill the ellipses, one per line, and do not output other text.

Answer: A) x is a company or institution. B) y is a competitor or counterpart. C) x is in the competitors relationship with y.

Main Steps For each distinct fixed tuple-part 330, a, the system first executes the S2 Data Generation process 340 (explained in detail below) to produce a list of k: new B values 350, [$b_1$, . . . , $b_k$.], leading to k: new tuples [(a,$b_1$), . . . , (a,$b_k$)]. Additional processing processes S3 360, such as conflict resolution, entity name disambiguation, duplicate detection, etc., are performed on these new tuples before saving them into the database. The main steps S2 and S3 are carried out for every distinct input fixed tuple-part. Such loops are controlled by 330 and 370. In various embodiments, for a database curation request different from a database initialization request, one or more of the following methods can be adopted for carrying out the request iteratively: (i) in case of a relational database, a task requested by the database curation request is carried out via a loop over each tuple of a relation to be curated according to the request, whereby the request is carried out separately for each such tuple, (ii) in case of a relational database, a task corresponding to a database curation request is carried out via a loop over each distinct fixed tuple-part relative to the request, where each fixed tuple-part relative to the request is a projection of a tuple from the relation associated with the request over its fixed attributes, whereby the request is carried out separately for each fixed tuple-part relative to the request, and (iii) a loop over elements of the sub-structure corresponding to the request is performed, and a task corresponding to the request is carried out for each element separately.

In some embodiments, in the Relation Understanding step, the system may also present the LLM with the title and description of the input relation, along with the names and descriptions of columns or attributes, if such information is available, as an addition or alternative to the tuple examples. The system may also present the LLM with other textual information that can help the LLM to understand the input relation. For instance, in the case of a database initialization request, the system may provide the LLM with the user's specification regarding the desired relation to create and its structure.

In more complex embodiments, the Relation Understanding step may be performed multiple times, each time showing the LLM different sample tuples. The results from these various Relation Understanding steps can then be aggregated and further processed to produce a final answer. Different sampling strategies may be adopted for generating the sample tuples used in this step.

The Relation Understanding step in different embodiments may aim to generate comprehensive understandings of the input relation, including the following elements, presented in a clear and unambiguous manner. While some elements may already be available, they may not be sufficiently clear or may be ambiguous; this step aims to improve clarity. These elements include, for example:
- the name of the input relation,
- the description of the input relation,
- the name of each column or attribute,
- the description of each column or attribute,
- the type of the input relation based on a predefined relation type category. Different embodiments may adopt various categorization methods of defining this relation-type category. For example, some embodiments may classify a relation based on whether the relation is linkage-focused (where each tuple represents relationships between entities, such as company competitors) or entity-centric tables (where each tuple represents an entity with columns representing the entity's attributes, such as a table containing products' basic information). Some embodiments may classify a relation based on whether the relation is 'complicated data' that is derived from a complicated analysis process, or 'simple data' that is about a simple fact whose generation does not require any complicated analysis.
- the different types of keys of the relation, such as primary keys or candidate keys,
- Data dependencies such as functional dependencies, conditional functional dependencies, and/or other equality generating dependencies (EGDs), inclusion dependencies, multi-valued dependencies, and/or other tuple-generating dependencies (TGDs).

In some embodiments, the Relation Understanding step is pre-conducted by the CHAT2DATA system before any concrete database curation task is initiated. In other embodiments, this process is included as a key step in the execution of a particular database curation task and is properly reused by other database curation processes.

Figure 4:
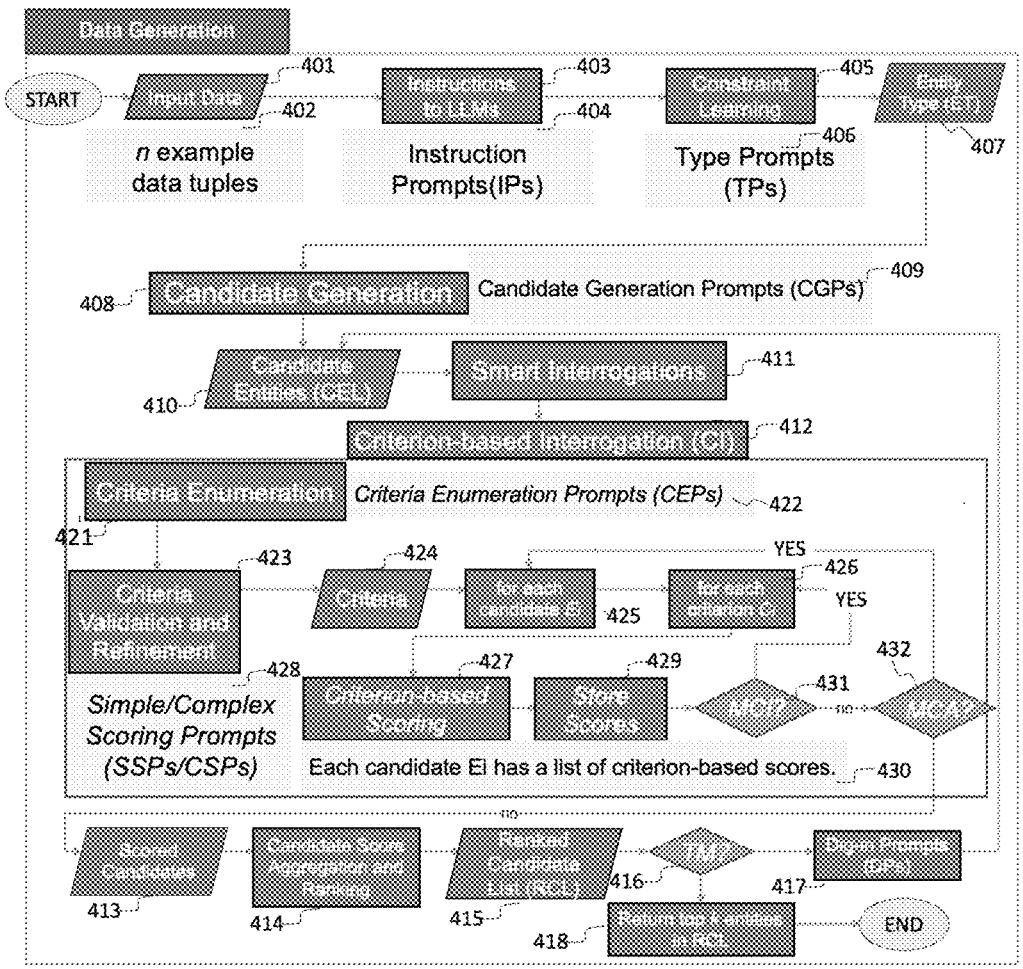
FIG. 4 displays a workflow of the data generation step in the example embodiment described in the section titled "An Example of CHAT2DATA".

S2 Data Generation. As illustrated in FIG. 4, the Data Generation process for each task that corresponds to a distinct input fixed tuple-part 401, may include six main steps: I Give Instructions to LLMs 403, II Constraint Learning 405, III Candidate Generation 408, IV Smart Interrogations 411, V Candidate Score Aggregation and Ranking 414, VI Dig-in Prompting 417, where III 408-VI 417 are repeated until no further improvement is achieved or some other termination criterion is met (as controlled by 416). In FIG. 4, angle brackets are used to display placeholders for the values of certain variables or constants. For example, <rel_name> is a placeholder of the value of rel_name. In the figure, processes are illustrated using rectangles, while parallelograms are used to represent the input data or data generated by certain processes. The example prompts presented below (Ex2-Ex6) are parameterized prompts that are instantiated at runtime using the corresponding templates displayed in FIG. 4. More details about parameterized prompts will be given in the section of "Other Methods of Generating Prompts."

Input to the Data Generation process. The Data Generation process is triggered for each distinct fixed tuple-part, i.e., each distinct A-value in R. Each such A-value is a "focal entity", while the k: new B values to be found are the corresponding "target entities". The aim is to identify, for each focal entity, k: new target entities, e.g., k: competitors of a focal entity like FoodCheri. The input to each data generation process include: (1) m (a predefined number) example tuples, comprising one tuple with the focal entity and others randomly selected from R, all without null values, (2) rel_name generated in the Tuple-based Relation Understanding process, and (3) a formal target tuple representation, e.g., (FE:FoodCheri, ?) where FE denotes that FoodCheri is the Focal Entity, and the question mark ? signifies the required target entities.

I Give Instructions to LLMs 403 The Data Generation process starts with giving the LLM some instructions using "Instruction Prompts (IPs)" 404. A simple IP may show the m example tuples to the LLM, as in Ex2:

Ex2. Example of IP: Here are some examples of the competitors relationship: FoodCheri is the competitors relationship with Nestor. Doctolib is in the competitors relationship with Jameda. [ . . . more examples are omitted]

Note that while Ex2 does not strictly adhere to the regular few-shot prompt format, where each example in the prompt explicitly indicates the input to the LLM and the expected output from the LLM, it still serves the purpose of providing a few "shots" or examples regarding the considered relationship.

In certain embodiments, this particular step of "Give Instructions to LLMs" 403 may be considered optional as the LLM already possesses an understanding of the input relation through the Tuple-based Relation Understanding prompt 320. Alternatively, in some embodiments, this step displays tuples, such as $(a,b_1)$, that include the focal entity a, optionally together with some other tuples.

II Constraint Learning 405 Subsequently, Mini-CHAT2DATA generates constraints for target entities. For instance, it initiates "Type Prompts (TPs)" 406 for the LLM to identify the entity type of all suitable target entities. For example, the LLM answers "food delivery service" in response to the TP in Ex3. This entity type is saved in the ET variable for future use. In some other embodiment, apart from learning this particular type of constraint, i.e., entity type, other constraints, such as (i) functional dependencies, (ii) conditional functional dependencies, (iii) multi-valued dependencies, (iv) join dependencies, (v) inclusion dependencies, (vi) geographical constraints, and (vii) attribute-value constraints from a set of different types of constraints comprising range constraint, length constraint, data format constraint, enumerated constraint (requiring a data item to belong to a predefined set of values), and regular expression constraint (requiring a data item to belong to match the pattern defined by a regular expression), range-restriction and other syntactic constraints, are also automatically learned, and maintained, and/or enforced when solving a data enrichment, database update, or null-value replacement tasks, optionally utilizing the relation names and the data dictionary (if available).

The maintenance of various constraints is achieved by checking, and, where appropriate, enforcing these constraints either periodically or as soon as the database is updated. For constraints that can be expressed by SQL, this can be achieved, for example via SQL triggers. Various constraint maintenance strategies are known and have been reported in the standard literature, and specific constraint checking and maintenance methods can be constructed ad hoc and used for disparate types of constraints. Similarly, if a constraint fails, various conflict resolution strategies may be adopted.

Ex3. Example of TP: What is the entity type of entities in the competitors relationship with FoodCheri? Please only give the name of the entity type.

III Candidate Generation 408 Next, Mini-CHAT2DATA creates candidate target entities (in short, candidates). In this example, candidates are generated via "Candidate Generation Prompts (CGPs)" 409. CGPs explicitly specify the constraints that candidates must satisfy, such as possessing the entity type ET, and asks the LLM to generate candidates. An example CGP is in Ex4. All the generated candidate entities $[E_1, E_2, \ldots]$ are stored in a list CEL for future use. In some other embodiment, other candidate generation methods are used as additions or alternatives, such as the combination with rule-based reasoning processes to generate candidates, as will be introduced in the Section of "Example of using rule-based reasoning for candidate generation".

Ex4. Example of CGP: List ten food delivery service entities that are in the competitors relationship with Food-Cheri.

GPT4: 1. Frichti, 2. Nestor, 3. Deliveroo, 4. Uber Eats, 5. Just Eat, 6. Glovo, 7. PopChef, 8. Stuart, 9. Grubhub, 10. DoorDash IV Smart Interrogations 411 To evaluate the correctness of each candidate, Mini-CHAT2DATA employs an innovative method, Smart Interrogations, to generate scores for all candidates in CEL. These interrogations leverage the LLM's knowledge of the considered relationship R to further question the LLM. In this example, Mini-CHAT2DATA only employs Criteria-based Interrogation (CI) 412, one particular type of smart interrogation. In another embodiment, more complex smart interrogations process is adopted, as will be detailed in the section of "Complex Smart Interrogations". CI initiates with 1, the Criteria Enumeration process 421, which retrieves the n most relevant criteria (with n being a predetermined number) to verify the relationship $\mathcal{R}$ between two entities, using "Criteria Enumeration Prompts (CEPs)" 422.

Ex5. Example of CEP: What are the three most relevant criteria for determining whether a food delivery service A is in the competitors relationship with B? Assign a weight (0 to 1) to each criterion to reflect its importance. All weights should sum to 1.

GPT4: Business Model Similarity (0.5), Market Segment (0.3), and Geographic Coverage (0.2)

In this example, prompting the LLM using a CEP displayed in Ex5 leads to the top three criteria for determining the competitor relationship, each criterion associated with a weight to signify its importance, and with the sum of all weights equal to 1.

Then, at step 2 423, these criteria and their weights are further validated and refined using existing data (if any are available) of the tuples in R. All criteria and their corresponding weights are saved in a list 424 C: $[(c_1,w_1), (c_2,w_2), \ldots, (c_n,w_n)]$, where $c_i$ and $w_i$ ($1 \leq i \leq n$) represent a criterion and its weight. Additionally, the sum of all weights is equal to 1, i.e., $$\sum_{i=1}^{n} w_i = 1.$$

At step 3, as controlled by 425, 426, 431 and 432, each criterion is employed to examine every candidate in order to conduct the criterion-based scoring 427 (sub-process i of 3) for the candidate. In this example, these criteria are assumed to be independent of each other. However, in some other embodiment, the underlying relationships or dependencies among different criteria is appropriately utilized. In this example, criterion-based scores are generated via Simple Scoring Prompts (SSPs) 428 which directly request the LLM to generate such scores, like the one in Ex6.

Ex6. Example of SSP: Can you give a score based on the Business Model Similarity criterion to reflect how likely that Frichti is in the competitors relationship with FoodCheri ? GPT4: 0.9

In some other embodiment, more sophisticated solutions, i.e., Complex Scoring Methods, will be adopted.

For each candidate entity $E_i$, criterion-based scores will be stored 429 (sub-process ii of 3) in a list 430 associated with $E_i$: [CI, $(c_1,w_1,s_{i1})$, $(c_2,w_2,s_{i2})$, . . . , $(c_n,w_i,s_{in})$], where CI signifies that these scores are produced by the Criteria-based Interrogation process, $c_j$ and $w_j$ ($1 \leq j \leq n$) represents a criterion and the weight that reflects its importance, and $s_{ij}$ denotes the corresponding criterion-based score of $E_i$.

Ex7. Example of criterion-based scores: Frichti: [CI, (c1, 0.5, 0.9), (c2, 0.3, 0.8), (c3, 0.2, 0.8)], Nestor: [CI, (c1, 0.5, 0.9), (c2, 0.3, 0.8), (c3, 0.2, 0.8)], PopChef: [CI, (c1, 0.5, 0.9), (c2, 0.3, 0.8), (c3, 0.2, 0.8)], Deliveroo: [CI, (c1, 0.5, 0.5), (c2, 0.3, 0.9), (c3, 0.2, 0.5)], where c1: Business Model Similarity, c2: Market Segment and c3: Geographic Coverage V Candidate Score Aggregation and Ranking 414 All the scores generated in the interrogations process will be stored appropriately 413. In this example, the following formula is applied to aggregate scores:

$$f(E_i) = \sum_{j=1}^{n} w_j * s_{ij},$$

where $E_i$, $w_j$, $s_{ij}$ have the same meaning as defined before. Once the aggregated scores are computed, all the candidate entities are stored in a list 615 ranked by their score in descending order, as displayed in Ex8.

Ex8. Scored Candidates: Frichti (0.85), Nestor (0.85), PopChef (0.85), Deliveroo (0.62), Uber Eats (0.62), Just Eat (0.62), Glovo (0.52), Grubhub (0.51), DoorDash (0.51), Stuart (0.39)

In some embodiments, solutions deemed invalid or having a too low confidence score are eliminated from the set of candidates.

VI List refinement using "Dig-in" prompts (DPs) 417 As shown in FIG. 2, it is not unusual for an LLM to overlook some answers that are superior to the ones they provide. To address this issue, Mini-CHAT2DATA adopts Dig-in Prompts (DPs) 417, a novel type of prompts to refine the ranked list of candidates. Given an ordered list of candidates that are likely to have the considered relationship with the focal entity, Dig-in Prompts first aim to identify entities that share a similar or closer relationship with the focal entity concerning the considered relationship, as compared to the current top candidate on the list. This prompt can then be utilized to 'dig' between the top candidate and the second candidate in the list, and so on. By an example DP in Ex9, the LLM returned two new candidates: Seazon, and La Belle Assiette, which did not exist in the current candidate list, but are two close competitors to FoodCheri.

Ex9. Example of DP: Find more candidates that are in a closer competitors relationship with FoodCheri, as compared to Frichti, Nestor and PopChef.

As controlled by 432, if new candidates are discovered in Step VI, Steps IV and V are triggered to evaluate them and re-rank all candidates, followed by reactivating Step VI. This process repeats until no new candidates are found in Step VI or other termination criteria are met, as controlled by 416.

The outcomes of utilizing Mini-CHAT2DATA on the input relation are showcased in the "Mini-Chat2Data" column in FIG. 2. Mini-CHAT2DATA has outperformed both GPT-4 and Bing Chat. It has successfully eliminated many of the mistakes made by GPT-4 and Bing Chat. More significantly, it has identified closer competitors to the focus entities, thereby delivering superior results.

As demonstrated in the above illustration, Mini-CHAT2DATA and other examples of CHAT2DATA make adaptive use of previous prompt-answers to determine one or more prompts to be issued, and where neither the sequence of LLM-prompts nor the number of prompts is solely determined by the input. For example, Mini-CHAT2DATA flexibly determines the use of dig-in prompts based on the results already found. More details of this feature will be discussed in the Section "Knowledge Driven Dynamic Decision Making at Runtime".

Note that this example workflow illustrated above serves only for illustrative purposes. Different embodiments may employ different workflows. For example, in some embodiments, certain steps mentioned in the example workflow might be merged. For instance, the steps "Give Instructions to LLMs" and "Constraint Learning" could be combined into a single step, wherein a prompt derived from concatenating Ex2 and Ex3 is sent to the LLM; the sub-steps controlled by 425, 426, 431, 432 in step 3 of the Smart Interrogations process 411, which involve asking the LLM to generate criterion-based scores for each candidate, can be consolidated into a single prompt as follows: Please use each criterion you mentioned to assess the candidate competitors you have generated. Provide a score for each criterion that reflects reflect how likely a candidate is in the competitors relationship with FoodCheri. Alternatively, in another embodiment, the entire workflow could be summarized as an instruction within a prompt.

Extensions, Refinements, Variations, and Alternatives

Prompt Descriptions In the next section promps are presented as follows: For complex prompts, a self-explained example template is provided with placeholders enclosed in angle brackets or square brackets (e.g., [Table Name]). The text within these brackets indicates what should replace the placeholder in the actual prompt. For simpler prompts with straightforward constructions, it is possible to describe their functionality without a detailed template. Note that the prompts illustrated in this section serve only for demonstration and may not reflect the actual prompts used in the system.

Knowledge Driven Dynamic Decision Making at Runtime

In the embodiment described in the section "An Example of CHAT2DATA", sequential decisions are determined by the controller as per a designated flowchart. In other embodiments, CHAT2DATA empowers an automatic process regarding step-to-step transitions during runtime. The controller is a computational method, or computer program that accesses a knowledge base that can be extended and adapted, the knowledge base containing (a) a rule base, where the rule may be expressed using a proper language, and (b) a base of parameterized prompts, and where the control flow and the prompts to be issued are dynamically determined with help of the rule base. An example of such dynamic decision making at runtime is as follows. Given an input relation, CHAT2DATA automatically generates an initial execution starting plan. This plan consists of a set of main steps that can be selectively triggered during runtime, including an initial step to execute, while leaving the specific execution workflow consisting of main steps undecided at this stage. CHAT2DATA executes the initial step as specified in the starting plan and then dynamically determines the subsequent main step to execute after completing each step. Therefore, CHAT2DATA provides numerous potential pathways and flexible adaptability across diverse use cases. However, in other embodiments, the entire execution plan of CHAT2DATA can be predetermined. For example, the execution workflow may be pre-defined as a fixed sequence of steps, where each step has a predetermined internal process. In other embodiments, only some main steps have pre-defined execution processes.

Some embodiments facilitate this automated decision-making process for step-to-step transitions during runtime via the use of knowledge-driven methods, elaborated in this section. Alternative strategies may also be utilized for the same purpose, which will be illustrated in the subsequent section. In some of the more complex embodiments, these techniques are integrated.

In the embodiments employing knowledge-driven methods, all the dynamic decision-making processes are primarily driven by the corresponding knowledge stored in the knowledge base of CHAT2DATA. This stored knowledge can be updated, and these updates may influence the actual operational workflow of CHAT2DATA. To better clarify the subsequent explanation, we will utilize a specific example:

Example Scenario Consider an input data relation R={C1, C2, City}, where each record in R represents two companies, C1 and C2, in competition with each other within a particular city. The user invokes the command @enrich (R, C1, City, *C2) (see the section "Task Specifications for Non-Binary Input Relations") to set a task. For each record $(c_1, c_2, ct)$, the objective is to identify additional competitors of company $c_1$ that are in competition with $c_1$ in the city ct. An example of R is displayed in Table 1.

TABLE 1

An example input relation.

| C1 | C2 | City |
|---|---|---|
| Apple | Samsung | U.S. |
| Apple | Microsoft | U.S. |
| Apple | Google | U.S. |
| ... | ... | ... |
| KFC | McDonald's | U.S. |
| KFC | Burger King | U.S. |
| ... | ... | ... |

In the knowledge base of CHAT2DATA, the knowledge related to step-by-step transitions encompasses a relationship taxonomy, initial execution plans, and guidance for dynamic step-to-step transitions. Each of these components is detailed further as follows.

The Relationship Taxonomy details the various types of relationships that the input data relation could represent. For instance, the relationship taxonomy may cover a coarse-grained categorization of general relationship types, which includes:

1. Entity-Entity relationship, optionally linked with supplemental attributes that are associated with this relationship or the entities engaged in it. For instance, the input relation R=C1, C2, City discussed in the example scenario demonstrates a competitive relationship between two companies, C1 and C2, within a certain city. Here, City is an attribute relevant to the competitive relationship.

2. Entity-Attribute relationship. For example, an input relation R'={Product, Manufacturer, ReleaseDate} illustrates the relationship between a product and its attributes—the manufacturer and release date.

Different embodiments may employ varying strategies to build the taxonomy. For example, a more intricate and detailed taxonomy of relationship types can be formulated, specifically tailored to a particular domain. This domain-specific taxonomy would cover a broad range of relationship types, encapsulating the full breadth of potential categories. For instance, within the scope of enriching a database on companies, the taxonomy of relationship types may include categories such as competitors, collaborators, subsidiaries, among various others.

Initial Execution Plans: In the knowledge base, each relationship type within the taxonomy is associated with an initial execution plan, designed for enriching a relation specific to that relationship type. This initial execution plan comprises a collection of potential main steps and the sub-steps of these main steps that can be activated during runtime, including a first step to execute. It's important to note that this initial execution plan does not outline the execution sequence of the main steps, while leaving such decision be made during runtime.

(Example of Initial Execution Plan) For example, the Entity-Entity relationship defined in the taxonomy is associated with the following initial execution plan:
Initial Execution Plan:
First Step: Tuple-Based Relation Understanding
Candidate Main Steps:
    Give Instruction to LLMs
    Data Generation
        Give instruction to LLMs
        Constraint Learning
        Candidate Generation
        Smart Interrogations
        Candidate Score Aggregation and Ranking
        Dig-in Prompts
    Data Processing and Saving Guidance for Step-to-Step Transitions: This refers to the information specifying the following step(s) or sub-step(s) to be executed, based on varying execution results derived from the current step or sub-step. This knowledge equips the system with the ability to dynamically ascertain the appropriate sequence of steps or sub-steps during runtime, contingent on the specific results of each step or sub-step.

(Example of Guidance for Step-to-Step Transitions) For instance, the following information guides the transitions to the subsequent steps of a Tuple-based Relation Understanding step, based on the execution outcomes of this step. (Remember that the Tuple-based Relation Understanding (TRU) step yields an understanding of the input relation, like a relationship name, and stores it in rel_name.)
if only one value is generated for rel_name by the TRU step:
    then proceed to the step of "Give instructions to LLM";
    else if a user is available:
        then ask the user to choose a value for rel_name;
        else if multiple LLMs are available:
            then run TRU using multiple LLMs, aggregate results,
            and decide a value for rel_name;
            else use more data from the input data relation as examples
                to prompt the LLM to decide the most likely value for rel_name;

if multiple possible values for rel_name persist:
  then exit the current process with an error message of "the Tuple-based
    Relation Understanding step failed.";
  else proceed to the step of "Give instructions to LLM".

Given the input data relation presented in Table 1, let's assume that the example tuples employed in the Tuple-based Relation Understanding prompt TRUP (as illustrated by Example Ex1) are (Apple, Samsung, U.S.), (Apple, Microsoft, U.S.), (Apple, Google, U.S.). The Large Language Model (LLM) might yield several different answers indicating varied values for the relationship name rel_name, such as "collaborators", "competitors", "collaborators in U.S.", "competitors in U.S.". Following the receipt of these responses, several potential subsequent steps are outlined by the above-mentioned knowledge. In a situation where a user is available, they would be presented with these possible values of rel_name and asked to select the accurate one. Alternatively, if multiple LLMs are available, the same example tuples might be used to prompt these LLMs and conclude an answer based on the principle of majority agreement. In this example, we assume that there's no user involved, and only a single LLM is used. Therefore, following the knowledge, more tuples such as (KFC, McDonald's, U.S.) and (KFC, Burger King, U.S.) are added to the TRUP to prompt the LLM again. The LLM may then gain a better understanding of the input relation, and output "competitors in U.S.". Then, according to the knowledge, the subsequent step would be "Give instructions to LLM".

Another example pertains to the knowledge that guides the sub-steps and subsequent steps of the Criterion-based Scoring process. Recall that each of these processes generates a score for a candidate concerning a specific criterion. Given that the LLM has comprehended that the input relation is about competitors in the U.S., it should have created a set of criteria that contains at least one criterion related to business location, such as "have business in the U.S.". For instance, assume that a candidate, OnePlus, is generated as a potential competitor to Apple. The knowledge that directs the Criterion-based Scoring process in this context is as follows:
  if the candidate's information related to the criterion is present in the database:
    then advance to the sub-step of scoring based on the located information pertaining to the criterion;
  else dispatch a prompt to the LLM to request the candidate's information relating to the criterion from the database;
    if unsuccessful:
      then proceed to the step of data extraction from external sources;
      if unsuccessful:
        then return a special value indicating that this criterion-based scoring process has failed;
    advance to the sub-step of scoring based on the located information pertaining to the criterion;

As per this knowledge, the scoring process for OnePlus in relation to its business location starts from checking if OnePlus's business location information is present in the database (where the input data relation originates from). If such information is discovered, then the subsequent sub-step is to generate a score based on this information. Otherwise, the LLM is prompted to retrieve such information. If this attempt is unsuccessful, the step of extracting data from external sources (as explained in the section "Data Extraction from External Sources") is triggered. If all these procedures fail, a special value, such as negative infinity, is returned to indicate the failure of this process.

The examples given above have demonstrated how transitions from one step to the next are made according to the corresponding knowledge. In some embodiments that incorporate this knowledge, CHAT2DATA initiates the first step and dynamically identifies the next step to execute based on the knowledge of dynamic step-to-step transitions. In this scenario, the result of the current step serves as the input for deciding each subsequent step. However, in other embodiments, additional information such as historical execution records, hardware usage status, execution time, etc., may also be considered when deciding next steps.

Please note that the examples given above serve merely illustrative purposes, while the actual implementation of such knowledge is determined by the human experts who apply the CHAT2DATA approach. This knowledge-based dynamic decision-making during runtime enables the flexible generation of various execution workflows that can cater to the requirements of diverse problems.

While the above examples of knowledge are expressed in pseudocode combined with natural language, different embodiments may choose different programming or formalization languages to represent this knowledge. In some embodiments, this knowledge is directly integrated into the underlying code of CHAT2DATA, rather than being stored in the knowledge base.

In other embodiments, such dynamic decision-making at runtime is achieved in different ways, as will be introduced in the following section.

In some embodiments, CHAT2DATA comprises a rule-based knowledge base and a reasoning engine, where decision-making processes by the controller are supported by automated reasoning tasks performed by the reasoning engine, whereby the reasoning engine evaluates rules over facts stored in the knowledge base and/or data in the database and/or data obtained from prompt-answers, and generates new facts which are used by the controller for decision making.

Other Implementations of Dynamic Decision Making at Runtime

In various embodiments, the system can utilize multiple methodologies to support dynamic decision-making for step-to-step transitions during runtime, beyond the knowledge-driven methods delineated in the preceding section.

As an illustrative case, certain embodiments incorporate an intelligent component within CHAT2DATA, such as a controller that possesses the requisite knowledge to execute dynamic decision-making during step-to-step transitions. This intelligent component could be realized as a pre-trained machine learning model. For instance, it could be a machine learning model trained through reinforcement learning techniques, thus enabling it to determine the optimal subsequent step based on the previous step's outcome. It might also be a Large Language Model (LLM), such as GPT-4, which is already equipped with the necessary knowledge. The LLM used in CHAT2DATA for dynamic decision-making could either be the same LLM employed for data enrichment within the system or a separate LLM specifically dedicated to dynamic decision-making. In some embodiments, a well-established LLM, like GPT-4, can be directly prompted in a zero-shot fashion. This implies that no explicit examples of data enrichment problem-solving processes are provided within the prompt to the LLM. In alternative embodiments, the LLM used for this purpose is prompted in a few-shot fashion. This involves presenting examples within the prompt that demonstrate how to solve the data enrichment problem for a relation that is similar to or shares the same relationship type as the input relation. Furthermore, the prompt may optionally incorporate examples that elucidate how to tackle the sub-problems that constitute the entirety of the data enrichment problem. Each of these examples is represented in a generalized chain-of-thought format that combines few-shot and chain-of-thought, $(T_i, A_i, S_i)$ ($i \in [1, N]$), where N is the total number of all examples provided to the LLM. This triple comprises a task description $T_i$, a final answer $A_i$, and $S_i=[(q_{ij}, a_{ij}), j \in [1, M_i]]$, which is a list of $M_i$ intermediate steps. Each intermediate step consists of a question $q_{ij}$ and, optionally, a corresponding answer $a_{ij}$. In some embodiments, these examples are manually pre-generated by humans. Conversely, in other embodiments, the examples are produced by executing the method described in the "An Example of CHAT2DATA" section on multiple example tasks, thus generating a diverse set of examples.

In the following illustration, we present an exemplary embodiment employing an LLM to accomplish dynamic decision making during runtime. We will refer to the LLM utilized for decision-making as the decision-making LLM, while the LLM employed for data enrichment purposes will be referred to as the data-enrichment LLM. In this particular example, both the decision-making LLM and the data-enrichment LLM are instances of GPT-4, accessed on Jun. 14, 2023.

In this example, the main difference from the example outlined in the "An Example of CHAT2DATA" section lies in the Data Generation step, while the other steps remain the same. In other embodiments, the LLM may also be employed for decision-making purposes in various steps throughout the whole process of CHAT2DATA, presenting different implementation possibilities. The following description illustrates the utilization of an LLM to dynamically generate a sequence of steps aimed at identifying competitors of a company named FoodCheri. All prompts used in this example are solely for illustrative purposes, and different implementations may utilize various other prompts tailored to their specific requirements.

During the data generation process to identify competitors of FoodCheri, CHAT2DATA initiates by instructing the decision-making LLM and requesting it to generate the initial step, as illustrated below.

Prompt: Assume you are an experienced prompt engineer. You want to solve a problem of finding competitors to FoodCheri using GPT, each found competitor should be assigned a score that reflects how likely it is a competitor of FoodCheri. You want to prompt GPT to break this problem into a sequence of steps. Each step is determined based on the result of the former step. Now assume that you start to interact with GPT to solve this problem, list the first question you will ask.

Answer: To break this problem down, the first question I would ask GPT would be: "Can you provide a detailed overview of FoodCheri's business model, their key product and service offerings, and the market in which they operate?"

Subsequently, the suggested prompt (enclosed in quotation marks) extracted from the LLM's answer is submitted to the data-enrichment LLM. The data-enrichment LLM then generates a response based on the provided prompt, as outlined below.

Prompt: Can you provide a detailed overview of FoodCheri's business model, their key product and service offerings, and the market in which they operate?

Answer: [ . . . ] Business Model: Unlike the aggregator model of platforms like UberEats or Deliveroo, FoodCheri's business model involves preparing their own meals. [ . . . ]

Key Product and Service Offerings: FoodCheri's main offerings are its various meal options. Customers can choose from a range of dishes prepared by chefs, including vegetarian and vegan options. [ . . . ]

Market: FoodCheri operates in the meal delivery market. [ . . . ]

In an iterative manner, CHAT2DATA carries out the following steps after receiving the LLM's response to the initial prompt:

1. CHAT2DATA prompts the decision-making LLM to to assess the outcomes of the recent step and determine the subsequent step, i.e., determining the next prompt in this example;
2. CHAT2DATA executes the next step, i.e., submitting the generated prompt to the data generation LLM;

Steps 1 and 2 are repeated iteratively until specific termination criteria are met. In this example, the termination criteria consist of: (1) obtaining a list of competitors to FoodCheri within the most recent LLM response; and (2) each competitor being accompanied by a score representing its likelihood of being a competitor of FoodCheri.

As an example, once CHAT2DATA receives the response from the data-enrichment LLM to the initial prompt mentioned earlier, it proceeds to prompt the decision-making LLM, as shown below, to consider what the subsequent prompt should be used.

Prompt: According to the previous answer, what is the next question to be asked to GPT-4?

Answer: Based on the previous information about FoodCheri, the next logical question to ask would be: "Can you list some companies that operate with a similar business model as FoodCheri, specifically in the cloud kitchen or virtual restaurant space, preferably within the same market or geographical location?"

The newly suggested prompt from the decision-making LLM is subsequently submitted to the data-enrichment LLM to obtain its response, as depicted below.

Prompt: Can you list some companies that operate with a similar business model as FoodCheri, specifically in the cloud kitchen or virtual restaurant space, preferably within the same market or geographical location?

Answer: As of my last update in September 2021, a few companies operating with a similar business model in the European market include:

1. Taster: This is a UK-based company that builds digital food brands and prepares meals for delivery in its kitchens.
2. PopChef: A Paris-based startup that also offers daily chef-prepared meals for delivery.
3. Frichti: This is another Paris-based company that offers a combination of prepared meals and grocery items for delivery.
4. Kitchen United: While it's U.S-based, Kitchen United has a cloud kitchen model that leases kitchen space to restaurants and food entrepreneurs primarily for food delivery.
5. Deliverect: This is a Belgian startup that connects businesses with delivery companies, streamlining the process of online food ordering for restaurants and virtual kitchens.
6. Rebel Foods: Although this company is based in India, it has a global presence and operates virtual kitchens around the world.

CHAT2DATA parses the response from the data-enrichment LLM and verifies whether or not the termination criteria have been satisfied. While the response provides a list of companies along with a brief description, it does not include the scores indicating the likelihood of each company being a competitor of FoodCheri. Consequently, CHAT2DATA proceeds to Step-1, as demonstrated below.

> Prompt: According to the previous answer, what is the next question to be asked to GPT-4?
> 
> Answer: Given the list of potential competitors provided, the next question we need to ask would be: "Can you analyze each of these potential competitors and assign them a score based on the similarity of their business model, product offerings, and target market to Food-Cheri? Please consider factors such as menu diversity, pricing, and geographical coverage in your analysis."

CHAT2DATA proceeds to submit this newly suggested prompt to the LLM to obtain a new response, as illustrated below:

> Prompt: Can you analyze each of these potential competitors and assign them a score based on the similarity of their business model, product offerings, and target market to FoodCheri? Please consider factors such as menu diversity, pricing, and geographical coverage in your analysis.
> 
> Answer: Please note that the scoring system I'm going to use is relative and should be considered an estimation, as I don't have real-time data or a precise scoring algorithm available. I'll use a 1-10 scale, with 10 indicating a very close competitor and 1 indicating little competition. Also, my data is up-to-date as of September 2021.
> 
> 1. Taster: Taster operates with a similar cloud kitchen model but it's based in the UK. It's not clear whether they have operations in Paris. In terms of the business model, it's fairly close, but geographical coverage may be a limitation. Score: 7
> 2. PopChef: As a Paris-based startup offering chef-prepared meals for delivery, they are a direct competitor to FoodCheri. They also share a similar commitment to quality, fresh ingredients. Score: 9
> 3. Frichti: While also based in Paris, Frichti offers not just prepared meals but also grocery items for delivery. This means they have a wider product range but also makes them less of a direct competitor since they are also somewhat of an online grocer. Score: 8
> 4. Kitchen United: While they share a cloud kitchen model, Kitchen United's primary business is leasing kitchen space to other restaurants and food businesses. They are U.S.-based with no clear indication of operating in Paris. The business model similarity is there, but geographical coverage and core operations make them less of a direct competitor. Score: 5
> 5. Deliverect: They are more of a tech platform that connects businesses with delivery companies. They operate in the food delivery space but their core business model is different from FoodCheri's. Score: 4
> 6. Rebel Foods: Although Rebel Foods has a global presence, it's not clear whether they have operations specifically in Paris. However, they do operate virtual kitchens, which makes their business model similar. Score: 6
> 
> Please note, the landscape of this industry can change rapidly, and this analysis might need to be updated with real-time data for the most accurate results.

Upon examining the response, CHAT2DATA recognizes that the termination criteria have been fulfilled, as each generated competitor is accompanied by a corresponding score. Consequently, CHAT2DATA concludes this data generation process and proceeds to the subsequent steps (350, 360, 370).

In alternative embodiments, the termination criteria may incorporate an additional criterion: (3) the data-enrichment LLM cannot identify any further competitors of FoodCheri. Consequently, in this particular embodiment, CHAT2DATA does not terminate upon encountering the last response mentioned earlier. Instead, CHAT2DATA proceeds to send an alternative prompt to the decision-making LLM, requesting it to determine if any competitors of FoodCheri might be missing. This prompt and the response to this prompt is presented below:

> Prompt: According to the previous answer, what is the next question to be asked to GPT-4 to check whether or not there are any direct or close competitors to Food-Cheri are missing in the previous answer?
> 
> Answer: Given the analysis of the previous companies, the next question to ask would be:
> 
> "Can you provide a secondary list of potential competitors that may have been missed in the previous analysis? These companies should also operate with similar business models as FoodCheri or operate within the same market space, specifically within the cloud kitchen or virtual restaurant industry."

The new prompt guides the data-enrichment LLM to identify potential competitors that might have been overlooked in the previous list. This prompt encourages the LLM to generate a new list of competitors, as shown below:

> Prompt: Can you provide a secondary list of potential competitors that may have been missed in the previous analysis? These companies should also operate with similar business models as FoodCheri or operate within the same market space, specifically within the cloud kitchen or virtual restaurant industry.
> 
> Answer: As of my knowledge cutoff in September 2021, here are some additional potential competitors that could be operating in the cloud kitchen or virtual restaurant industry:
> 
> 1. Ghost Kitchen Brands (GKB): This company partners with restaurants to open delivery and pickup only locations.
> 2. CloudKitchens: This is a US-based company that provides commercial kitchen space for delivery-only restaurants. It's backed by former Uber CEO Travis Kalanick.
> 3. Karma Kitchen: A UK-based company that provides kitchen space for food businesses, similar to Cloud-Kitchens.
> 4. Keatz: A Berlin-based cloud kitchen network focused on delivering their own in-house food brands.
> 5. Taster (formerly Mission Food): This company creates and operates digital-native food brands in the UK, France, and Spain.
> 6. Editions (Deliveroo): Deliveroo's 'Editions' are shared kitchen spaces created for partner restaurants to prepare food for delivery.

Next, CHAT2DATA executes a similar process of adding scores to the competitors in the list as described previously, which leads to a new list of competitors accompanied by scores. Then the prompt above is submitted to the data-enrichment LLM again. This iterative process continues until no further competitors are discovered, ensuring a comprehensive compilation of competitor data.

The description provided above serves as an illustrative example demonstrating how to utilize an LLM for dynamic decision-making within the context of CHAT2DATA. It is important to acknowledge that alternative embodiments may employ different approaches or methods for achieving the same objective of leveraging an LLM in dynamic decision-making processes. For instance, in embodiments where pre-generated example solutions are employed to supervise an LLM in data enrichment tasks, the LLM may generate a different sequence of steps compared to the example described above. The specific steps and decision-making process can vary based on the nature of the pre-generated examples and the training methodology utilized. These differences allow for flexibility in adapting the LLM's behavior to different scenarios and objectives within the data enrichment process.

In other embodiments, the decision-making LLM is prompted directly to provide a sequence of steps to solve the original problem, rather than being prompted after each individual step.

Other Implementations of Candidate Data Generation

In the example discussed in the section titled "An Example of CHAT2DATA," the process of generating candidate new data, such as competitor companies, is accomplished by prompting an LLM. However, in other embodiments, the generation of candidate data can involve combining LLM-based methods with complementary approaches. This section will describe two such methods: rule-based reasoning and Item Set Expansion (ISE), while various embodiments may adopt various other methods.

In certain embodiments, a rule-based reasoning process is employed to infer new candidate data from existing data. This approach utilizes predefined rules or logical deductions to derive additional candidate data based on the available information. The section titled "Rule-based Reasoning in CHAT2DATA" will further explain this process.

In some embodiments, Item Set Expansion (ISE) methods are integrated into the candidate generation process alongside LLM-based methods. For example, after the LLM outputs several candidate competitors for a given input company, the system invokes an ISE method. The currently discovered candidate competitors serve as seeds within the ISE process, which aims to identify additional companies that are similar to these seed candidates. By employing ISE as a supplementary approach to LLM, the system can discover more candidate data while mitigating the computational cost associated with using LLMs extensively.

Other Types of Prompts

Various embodiments of the current disclosure may adopt various types of prompts comprising few-shot prompts, chain-of-thought prompt, that can help CHAT2DATA or even the LLM itself to recognize and/or avoid and/or correct mistakes, and thus produce significantly more truthful and appropriate results. Prompts used in CHAT2DATA can be automatically generated by employing LLMs as prompt engineers. Additionally, examples used in few-shot prompts can be automatically generated by CHAT2DATA using existing data or knowledge stored in some knowledge base, or by leveraging an LLM.

The prompts used in CHAT2DATA are parameterized using placeholders for relation names, attribute names, data items or tuples, and/or objects from LLM answers or other objects obtained in the course of the computation. Here are examples of categories and sub-categories of prompts that may be employed by CHAT2DATA in diverse embodiments of the current disclosure.

Data Intelligence Prompts

These prompts let the LLM explore the relevant relation of the input database (and possibly connected relations, and a data dictionary if one exists) to obtain an understanding about its meaning, which can then be used in further prompting. Data intelligence prompts ask for one or more natural-language descriptions of database schema elements (in the relational case, data relations and/or attributes), the one or more descriptions to be used within subsequently generated prompts. Here are some examples:

Tuple-based Relation Understanding Prompts, which serves to gather information about a relation and its attributes. Essentially, on the basis of sample tuples of a relation (and possibly attribute names if they are meaningful), an LLM, when accurately prompted, can describe the attributes, and their relationships. An example was already given in the description of Mini-CHAT2DATA.

An LLM can generate a Natural Language Description (NLD) of a data relation and its attributes, provided it is prompted with a few characteristic sample tuples with meaningful content. The generated NLD will be stored and remembered by CHAT2DATA, and can be used in subsequent prompts for outlier detection, data correction and enrichment.

Metadata-Based Relation Understanding Prompts, which use available data dictionaries and other metadata to come to similar natural language descriptions as in the above example. Tuple-based and metadata-based relation understanding can be combined, and auxiliary prompts can be used to resolve possible discrepancies in the outcome of the two methods.

Data Item Classification Prompts, which are used to query the LLM about the (common) features (commonalities) of some given data items, and classify these data items either according to a given system-internal or external ontology, or simply ask the LLM to which class these set of items (or each entity) belong. CHAT2DATA can then retain and further use the result(s).

In data intelligence prompts, intelligence about a nature of the data and relationships in the database is obtained from database-information retrieved or otherwise obtained by one or more of:

(a) accessing the input database and retrieving data,
(b) accessing a data dictionary of the input database and retrieving meta-information or structural information from the data dictionary,
(c) accessing at least one document containing information about the input database, and
(d) conducting an interactive information-gathering dialog with a database administrator or user, where the database information comprises content information and/or structural information and/or other metadata about the input database, and where the database information, in case of a relational input database, comprises at least one of:

(i) one or more names of input relations belonging to the input database,
(ii) textual descriptions of one or more input relations,
(iii) names of one or more columns or attribute of one or more input relations,
(iv) textual descriptions of one or more columns or attributes of one or more input relations,
(v) for one or more input relations, related types according to a predefined list of database relation types or according to a classification scheme of database relations associating data relations with relation types,
(vi) for at least one attribute, a related attribute-type, (vii) for at least one attribute, an associated range constraint, (viii) at least one primary and/or candidate key for at least one input relation, (ix) at least one foreign key constraint, (x) at least one dependency from a set of dependency-types comprising data dependencies comprising:

(a) functional dependencies, (b) conditional functional or other equality generating dependencies (EGDs), and (c) multi-valued or join dependencies, and/or other tuple-generating dependencies (TGDs), and where the data intelligence prompts comprise prompts from one or more prompt types comprising:

(i) prompts containing sample data from the sub-structure or relation of the database to instruct one or more LLMs about the nature of the data and the relationships contained in the sub-structure, (ii) prompts that use one or more metadata items from the database to instruct one or more LLMs about the nature of the data and the relationships contained in the database, and (iii) prompts that ask for one or more natural-language descriptions of database and/or database schema elements, the elements, in case the database is relational, comprising data relations and attributes, the one or more descriptions to be used within subsequently generated prompts.

Problem Deconstruction Prompts

Criteria Detection Prompts, which ask an LLM about the main criteria according to which it could be decided whether two items are related by a given relationship (e.g. 'is a competitor of' or 'produces'), and possibly the weight of each criterion.

Relevant Aspect Discovery Prompts, which are associated to main prompts and ask for relevant internal or external aspects for answering a main prompt. For example, assume a database contains the relations CS(Comp #, Sector), CP(Comp #, Product), CF(Comp #,Founder), Competitor(Comp #1,Comp #2), then, the relevant internal aspects for company number n are company n's name, its products, and its existing competitors, but most likely not its founder. External aspects may be the company size and the places of operation, which may be found in external knowledge sources such as Wikidata. The prompt may also ask Prompt Generation Prompts: These are prompts that ask the LLM what it should be asked in order to answer a question best, For example: "Which three questions should one best ask you in order to understand whether for two entities x and y it holds that x <relationship> y. How should one weigh the answers on a scale from 0 to 100?"

LLM Instruction Prompts

Instruction-by-Example Prompts These prompts take sample tuples obtained from the database (either directly or through queries), where appropriate, formulate them, in natural language (using, e.g. natural language relation names previously issued Data Intelligence prompts, and teach the LLM these instances of the relationship. (See the Instruction Prompt in our above-described mini-prototype).

Automatically generated Chain-of-Thought prompts The already mentioned Chain-of-Thought (COT) prompts are explanations of how to solve a problem that are taught to the LLM, often based on examples. In some embodiments, CHAT2DATA automatically generates such COT prompts for particular tasks, possibly utilizing a pre-defined workflow. For instance, to automatically generate COT prompts that teach the LLM how to generate a competitorship score between two companies, the workflow of the criteria-based scoring process in Mini-CHAT2DATA can be used. To generate examples for the COT prompts, this pre-defined workflow is performed on a set of sample company pairs including both competitor pairs and non-competitor pairs. The execution processes for these sample pairs are recorded and then utilized as examples to generate COT prompts.

Food-for-Thought prompts are prompts that just ask the LLM a relevant question that would help solving a problem, whose answer is actually not used by CHAT2DATA, but will constitute "food for though" for the LLM and, similar to COT prompts, will induce the LLM to give better answers. A nice example is Prompt 2 in the "Pen and Marker" example below:

Pen and Marker Example

Prompt 1: What's the similarity score between "pen" and "marker", on a scale between 1 (lowest) and 10 (highest)?

Answer 1: [ . . . ] Based on a general semantic similarity between "pen" and "marker", I would assign a similarity score of 6 out of 10.

Prompt 2: Please explain which properties an object must have to have similarity score 9 with a pen Answer 2: [ . . . ] The object should be a writing instrument that uses ink or a similar fluid to make marks on paper or other surfaces.

It should have a slender, cylindrical shape that is easy to hold and manipulate.

It should have a pointed tip that can be used to make precise marks or lines.

It should be lightweight and portable, making it easy to carry around and use in various situations.

It should be available in various colors or types of ink, allowing users to create different types of marks or highlight important information.

Objects such as pencils, quills, fountain pens, ballpoint pens, highlighters, sharpies, gel pens, felt-tip pens, chalk, and crayons are all writing instruments that share many of these properties [ . . . ].

Prompt 3: Please list some examples of objects that have a similarity score of 9 out of 10 with a pen. Please do just make a comma-separated list of just the names of the objects, and do not use line-breaks in that list.

Answer 3: Sure, here's a comma-separated list of objects that have a similarity score of 9 out of 10 with a pen: Pencil, Highlighter, Marker, Fountain pen, Ballpoint pen, Gel pen, [ . . . ]

While it was known that such prompts, here referred to as "food for thought" prompts, are beneficial in case of manual prompting, in some embodiments of Chat2Data, they are generated fully automatically.

LLM-Response Formatting Prompts

These are auxiliary (partial) prompts added to a main prompt that ask an LLM to display its answer to the main prompt in a desired format. Examples:

Answer structuring prompts ask the LLM to format its answer in a specific format that is easy to parse for CHAT2DATA. An example is the text "Only return the score, without any explanations.".

Answer limitation prompts tell the LLM to display only the top (=best matching) answers or the top k answers.

Verbosity Suppression Prompts suppress lengthy explanations or disclaimers in an LLM answer, for example, the text "Please do just make a comma-separated list of just the names of the objects' in Prompt 3 of the "Pen and Marker" example.

Result Generating Prompts. What is meant here by "result" is the result (i.e., response) to the original request, either in intermediate steps to be possibly improved, or as a final step.

- Boolean answer generation is especially useful for correctness checking of tuples from the input relation. For example: "Is Fiat a competitor of Caterpillar?". Only if the answer is "no" as in this example, further action will be taken by CHAT2DATA on the presumably faulty tuple.
- List finding prompts: Generate lists of items or of data tuples (a) by example (b) based on item properties (c) based on previous instruction prompts.
- Explanation-Generating Prompts are prompts that together with the result generate, as part of the answer, an explanation on why the result holds and, if possible, where the information comes from.

Result Improvement Prompts

Where result improvements appear to be possible, CHAT2DATA will issue special prompts for triggering such improvements. This may be an iterative (or recursive) process that ends when no further improvements are possible.

- List Ordering Prompts: Order lists according to, say, a best-first order according to one criterion, or to a weighted set of criteria.
- Comparison Query Prompt: for example, "which is academically stronger, Birkbeck University of London or Oxford Brookes?" We observed that the LLM-answers to such prompts are often in contradiction with a best-first order output bt the LLLM, from where hints for further investigative prompting towards possible improvements can be obtained.
- List refinement Prompts: given an LLM-generated best-matching ordered list, relative to a 'query item' (for which matching items ought to be found), check for better matching intermediate items between the start item and the currently best matching item. This prompt can be repeated until no better matching is found, and can then be applied to the 'dig' between the best matching item and the second-best match in the list and so on. In various embodiments of the present disclosure, in case of enrichment, update, or null replacement requests, candidate solutions may be organized and maintained in a candidate list ordered in a best-fit to worst-fit fashion ordered according to one of a relevance and fitting criterion. These lists may be further refined by list refinements prompts or "dig-in" prompts, which ask for one or more new solutions according to a process of determining whether the one or more new solutions:
  - (i) are more relevant or better fits than a best solution in the candidate list, and are inserted before the best solution in the candidate list, or
  - (ii) are, with respect to the relevance or fitting criterion, situated between two consecutive elements of the candidate list, and are inserted between the two consecutive elements;
  where the process of determining whether the one or more new solutions is repeated until no new solution fulfilling (i) or (ii) is found or until a loop abortion criterion is satisfied.
- Answer Deconstruction Prompts: A query requiring to simplify or better format an earlier query-answer.

External Source Finding and Utilization Prompts

- Source Finding Prompts ask for external sources, in particular web pages or web services, from where trustworthy information about certain types of items or relationships can be retrieved. For instance, the prompt "Where can I retrieve a list of publications of a computer scientist-give the three most important web sources; just state those and their URLs but no further explanations" is answered by: "1. Google Scholar (scholar.google.com), 2. DBLP Computer Science Bibliography (dblp.org), 3. Microsoft Academic (academic.microsoft.com)."
- Source Access Understanding prompts try to figure out how an external source can be accessed. For example, "describe how all publications of an author with first name X and last name Y can be retrieved on DBLP keeping into account that the data may be spread over several pages." With this prompt GPT-4 gives exact instructions on how to use the DBLP portal. A prompt of this type automatically serves as Food-for-Thought prompt for a Data Access Program Generation Prompt, as described below.
- Data Access Program Generation Prompts These prompts ask an LLM with program generating capability (e.g. GPT-4) to synthesize a program that accesses a web source, interacts properly with it, and generates desired results. For example: "Write a program that accesses dblp.org, takes as input a first name X and a last name Y and outputs all publications of Person X Y in the following format . . . ". Before using the program productively, the generated program will be automatically launched with test data (usually stemming from the input DB), and tested (possibly also involving an LLM). Errors will be reported back to the LLM for program improvement. When the program is ready, CHAT2DATA will manage its usage. Its output data may be used for updating or enriching the input database (possibly after additional checks), or may be used for auxiliary purposes.
- Data Access Program Result Analysis Prompts analyze and possibly transform data obtained through an external source.
- Data Access Program Testing and Correction Prompts which test data access programs previously generated by the one or more LLMs via Data Access Program Generation Prompts, and in case one or more errors are found in a data access program, automatically correct the program,
- Evidence and Explanation Providing Prompts (EEPPs) These prompts (which could be, but are not necessarily based on results of previous prompts, such as already identified Web sources) provide concrete evidence for already computed answers or candidate results. This may serve two purposes: (i) to provide further factual evidence to data or assertions computed by use of LLMs, where this further evidence goes beyond statistical evidence, and (ii) to provide explanations for human users. The following is an example in the context of database enrichment. For example, such a prompt may ask for concrete evidence that a company C produces a product P. The prompt may be formulated as follows: "Provide the URLs of up to three Web pages from which it is evident that company C produces product P and for each of these web pages explain the reason of the evidence". However, EEPPs may not just ask for (URLs to or copies of) entire websites, but may directly request relevant parts of websites (or of other sources). For example, in case of specific similarity relations such as the competing companies, an EEPPs may ask not only for a Web page but also for a list of similar items on that Web page, for example, in case competitors for a company C are sought: "Find up to three Web pages each containing a list of mutually competing companies also including company C. For each such Web page output both the URL of the Web page and the respective list." EEPPs such as the last one, may also be handled by item set expansion systems (ISE-systems) if available. ISE-systems (aka "set expansion systems" or "entity set expansion systems") are highly specialised software systems that retrieve similar items (such as competing companies) from a document store or from the Web. In case an ISE-system is available, it may be used for answering a "similarity prompt" such as the above one either alone, or in combination with LLM prompting. Given that there may be different types of evidence for an LLM result, the broader class of EEPPs may have several sub-types, for example list finding EEPPs, as in the last example, or plain text finding EEPPs where textual descriptions such as "D is a competitor of C", which are even more explicit, are looked for. A dynamic control flow, when looking for at most k instances of evidence, may, for example, first issue a plain text finding EEPP for explicit textual evidence, and only if less than k textual evidence instances are found, may make a list finding EEPP for further instances of evidence.

LLM Certainty Assessment Prompts These prompts should return a certainty value in the interval [0,1] that expresses the degree of certainty about the LLM's answer to a prompt.

Criteria-Weighted Certainty Prompts derive a certainty factor from the aggregation degrees of fulfillment of various possibly weighted criteria, such as those answered to Criteria Detection Prompts, possibly modified by degrees obtained by Confidence Assessment Prompts as described next.

Confidence Assessment Prompts. These prompts ask questions such as "how sure are you about this answer on a scale from 0 to 100" to assess the degree of confidence an LLM has in its own answers. Aside from directly questioning the LLM itself, a separate model could be employed to assess the confidence levels provided by an LLM. This could be another LLM that has been specifically fine-tuned for this purpose. Utilizing a separate model in this way offers an independent means of validating and corroborating the initial LLM's confidence estimations.

Complex Smart Interrogations

Figure 5:
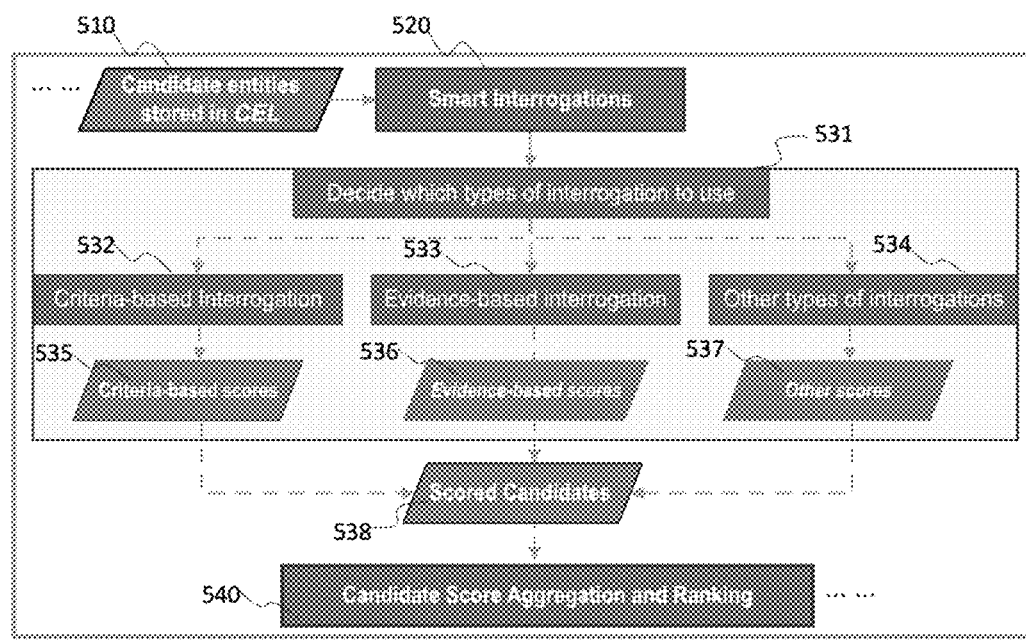
FIG. 5 illustrates the process of complex smart interrogations according to an example of the instant disclosure.

In certain embodiments aligned with the present disclosure, as shown in FIG. 5, more sophisticated smart interrogation procedures 520 are employed to examine the candidate entities 510, exceeding the complexity of the process delineated in the preceding elementary example. In such embodiment, as depicted in FIG. 5, the Smart Interrogations component offers various types of interrogation methods that examine the LLM's answers from different perspectives, and can dynamically determine which types of interrogations should be employed during the runtime. In addition to the previously introduced Criteria-based Interrogation 532, another example of such smart interrogations is the Evidence-based Interrogation 533, which produces evidence-based scores based on found evidence supporting the LLM's answers, including explicit evidence such as a Web page explicitly stating some facts that support the answer, and empirical evidence that indirectly supports the LLM's answers. This interrogation process utilizes those Evidence and Explanation Providing Prompts as described in the previous section. In such embodiments, a pool of various types of interrogations 534 that employ various innovative prompting techniques are used. As depicted in FIG. 5, when CHAT2DATA initiates the smart interrogation process, it automatically determines 531 which types of interrogations should be employed, and executes them concurrently. The various scores 535, 536, 537 generated by different interrogation processes will be associated with their corresponding candidates 538 and saved for future use, such as being aggregated and ranked 540.

Data/Information Extraction from External Sources

In some embodiments, the system accesses external sources to retrieve necessary information that is not captured by LLMs being utilized. This process of data/information extraction from external sources utilizes those External Source Finding and Utilization Prompts.

Figure 6:
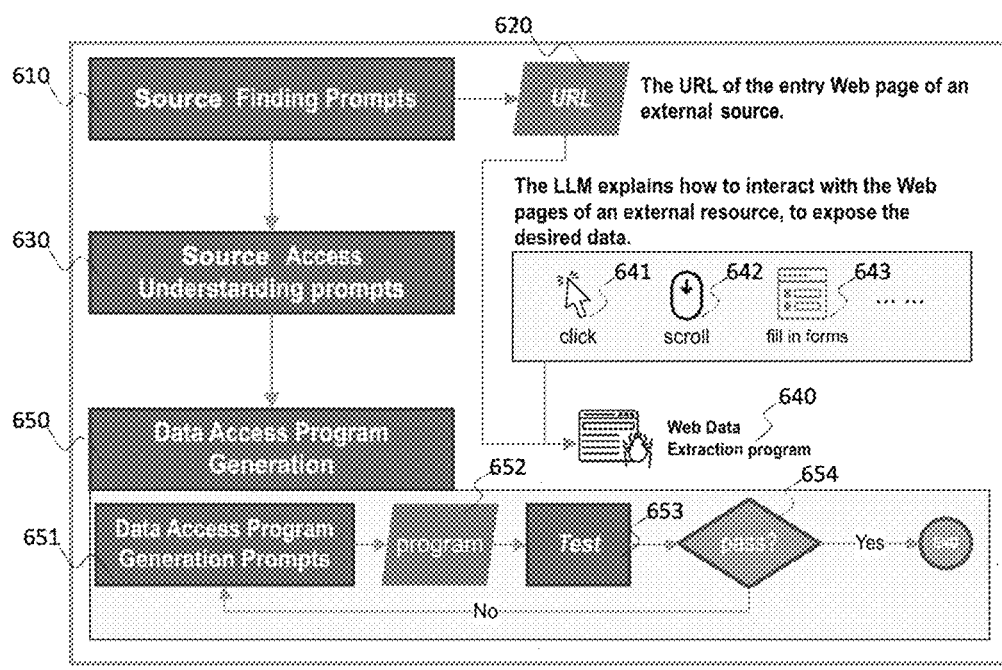
FIG. 6 illustrates the process of extracting information from external sources according to an example of the instant disclosure.

For instance, in the Criteria-based interrogation process as described in the illustration of Mini-CHAT2DATA, one criterion for determining whether two universities are competitors could be their course similarities. The LLM in use may not have a comprehensive list of courses for each university. Even with access to the Internet, the LLM cannot always locate the necessary data, as it might need to interact with Web page elements, such as filling forms, clicking somewhere on the page, scrolling down the page, etc., to reveal the desired information. In such cases, the system should automatically identify external sources, interacts with these sources, and extracts data from them. An exemplary design is demonstrated in FIG. 6. Initially, Source Finding Prompts 610 are used to locate data sources, such as, "Provide the URL of the Web page where I can discover courses offered by the University of Oxford." The LLM may only be capable of identifying the entry page that leads to these sources, while further interactions with the entry page are required to expose the desired data. For instance, in response to the previous question, GPT4 returns https://www.ox.ac.uk/admissions/undergraduate/courses—a URL 620 directing to a page where we must click on "A-Z of Courses" to reveal all the courses. Consequently, "Source Access Understanding prompts" 630, are automatically generated and submitted to the LLM to assist it in determining a sequence of interactions with the page, including clicking 641, scrolling down 642, filling in a form 643, etc., to uncover all the desired information, such as "Where should I click on the Web page to view all the courses?" or "What should I enter into the forms on the Web page to reveal the necessary data?" Following these prompts that guide the LLM to outline the appropriate steps for accessing the required data, the Data Access Program Generation 650 step directly utilizes the LLM to extract data or turns instructions given by the LLM into Web data extraction programs that can automatically extract the desired data. In some embodiments, the programs provided by the LLM will be automatically tested 653. These tests may encompass varying degrees of scrutiny, designed to evaluate the program from multiple angles, such as: 1. Efficiency Analysis: This evaluates the performance of the data extraction program developed by the LLM. It gauges how efficiently the software operates. 2. Extraction Correctness Verification: These tests verify the correctness of the data extraction program. For instance, the raw data extracted by the program should align with its presentation at the source. In certain implementations, this is accomplished by leveraging existing data originating from the same sources, using methods such as similarity checks between these data. 3. Truthfulness Validation: This extends beyond the extraction correctness verification tests, focusing on identifying potential errors introduced by the data sources themselves. In some embodiments, this is achieved by contrasting data extracted from multiple sources and spotting discrepancies that may hint at potential errors. In certain implementations, when necessary (as determined by control mechanism 654), any programs that fail the tests (whether evaluated by humans or automatic tests) are enhanced using automated correction methods or by instructing the LLM to self-correct the program. This is done by invoking the "Data Access Program Generation Prompts" again, but with additional instructions derived from the test results. For instance, if testing reveals that the program is operating too slowly, a prompt such as "Please rewrite the data extraction program to significantly improve its efficiency" will be submitted to the LLM. If the program makes an error when extracting data from some Web page, a prompt like "The correct data should be <correct_data>, but the program extracted <wrong_data>. Please amend the program", where <correct_data> and <wrong_data> are placeholders of the expected correct data and the actually extracted data, will be used to request the LLM to self-correct its program. In some even more complicated embodiments, some separate LLMs may be used for testing and program correction purposes.

Note that the above explanation is merely to illustrate how data extraction from external sources can be utilized within the context of the CHAT2DATA approach. However, different implementations of the CHAT2DATA approach might employ a variety of information/data extraction methods, depending on the specific application scenarios. Moreover, while the Web has been used as the external source repository in the provided example, other embodiments may leverage different external sources, i.e., any sources that are different from the input database and the LLMs (here seen as data sources) being used for the data enrichment purpose. For instance, an internal document repository accessible by the CHAT2DATA implementation could serve as an alternative external source.

More Details on the Data/Information Extraction in CHAT2DATA

This subsection, as an extended description of the previous section "Data/Information Extraction from External Sources", provides more detailed explanations and examples of the data/information extraction process in CHAT2DATA.

In particular, a more detailed description of how CHAT2DATA extracts required data or information from a source, such as a website on the Web, is presented in this section. Note that this method can also be applied to extracting data or information from other types of sources in different document repositories, such as documents in a local document repository. For simplicity, we refer to the component responsible for the extraction of external data as CHAT2EXTRACT throughout this section. CHAT2EXTRACT utilizes LLMs to facilitate various processes in its data extraction pipeline. Note that CHAT2EXTRACT can not only be used in the context of CHAT2DATA, but can be used as stand-alone method or system in its own right.

Two Main Task Scenarios The CHAT2EXTRACT component is activated when the main CHAT2DATA system requires information or data that is not readily available or previously known to the LLMs employed by CHAT2DATA. This component performs one or more extraction task scenarios from a list comprising:

1. Extraction of Information for Retrieval Augmented Generation (RAG): If contextual information necessary for an LLM to produce accurate responses is not pre-known to the LLM, CHAT2EXTRACT is triggered to retrieve essential information from relevant information sources, such as local or Web-accessible documents. This supports the LLM in generating informed, accurate outputs by providing it with the necessary contextual information or knowledge.
2. Extraction and Generation of Structured Data: When structured data is required (such as data required for enriching a table) but not known to the LLMs, or if the LLMs are unable to accurately regenerate such data despite having encountered it during training, CHAT2EXTRACT undertakes the extraction of explicit data or the generation of implicit data from external sources.

Example Scenario

Assume that in a database enrichment task, an input relation, as displayed in the Products table 910 in FIG. 9, needs to be enriched by CHAT2DATA. This data enrichment task requires CHAT2DATA to find new products and their attributes, such as official prices and other details (which are omitted in this example) for each distinct manufacturer whose ID is listed in the manufacturer column. In this case, CHAT2DATA triggers CHAT2EXTRACT to find the necessary data for this enrichment task.

CHAT2DATA generates a description of the data extraction requirement of this task by specifying the relation to be enriched, i.e., the Products table in this example scenario, the fixed attributes, such as the manufacturer attribute, and the target attributes, such as the name and the price, along with the relation understanding results. This data requirement is then used as input to trigger CHAT2EXTRACT. The data extraction requirement can be specified as one or a combination of forms form a form set comprising:

1. a natural language description that provides specifications of the required data or information,
2. structured presentation of the schema of the required data or information,
3. a command that specifies a relation into which the extracted data should be inserted, and optionally a set of target attributes which should be enriched with new values or new combinations of values, giving rise to new tuples that extend the projections of existing tuples over the fixed attributes, which if not specified, default to be all attributes, Before CHAT2EXTRACT is triggered, CHAT2DATA runs the relation understanding of the input relation. The result of this step includes the table name, a description of the table, and detailed explanations of each column. Additionally, CHAT2DATA classifies the target table into a predefined type. For example, the Products table 910 is recognized as entity-centric, where every row represents detailed information about a specific entity, i.e., a product. Furthermore, CHAT2DATA identifies a primary key consisting of a single column or multiple columns that are crucial for uniquely identifying each entity. For instance, the name and manufacturer columns together constitute a primary key and can be used to uniquely identify products. In some other embodiments, CHAT2DATA does not perform the relation understanding process itself but delegates this task to CHAT2EXTRACT, which independently carries out the relation understanding process.

In the following introduction of CHAT2EXTRACT, the table that will be enriched is referred to as the 'target table,' and the data that will be extracted and used to enrich this table is designated as the 'target data'.

Step 1: Task Decomposition

For performance considerations, CHAT2EXTRACT first attempts to decompose the whole data extraction task into smaller, independent sub-tasks. These sub-tasks can then be distributed across different machines or computational resources to run in parallel. CHAT2EXTRACT utilizes an LLM to determine whether and how to decompose the overall data extraction task into more manageable sub-tasks. This process is facilitated by generating a Task Decomposition Prompt (TDP) using the following template, for example:

> The data extraction task involves [Task Description]. Please suggest an effective method to decompose this task into smaller, independent extraction sub-tasks. Return None if decomposition of the task is not applicable.

For instance, the task of enriching the Product Table 910 can be decomposed into a series of sub-tasks, with each one focused on extracting product data of a distinct manufacturer.

In other embodiments, CHAT2EXTRACT may independently decide on the task decomposition without utilizing an LLM. For example, if the database enrichment task is specified as a command, such as @enrich (PRODUCTS, {manufacturer}, {name, price, . . . }) (further details of this command are described in the section "Task Specifications for Non-Binary Input Relations"), CHAT2EXTRACT may split the extraction task by creating sub-tasks, each corresponding to a unique value or unique value combination of the fixed attributes. In this example scenario, this would mean creating sub-tasks for each unique manufacturer, each focusing on extracting product information of each unique manufacturer.

In some embodiments, this task decomposition step is performed by the main CHAT2DATA system instead. CHAT2EXTRACT is then triggered with only the following steps for each extraction sub-task.

Following the decomposition, each sub-task—or the original task if decomposition is not applicable—is processed through the subsequent steps.

In the following introduction, an example sub-task of extracting data about products produced by the company Nikon is used to facilitate the illustration.

Step 2: Finding External Sources

In this step, CHAT2EXTRACT aims to find external sources, i.e., websites in this example scenario, that contain documents, like web pages, which include the target data. This is achieved by using a Source Finding Prompt 610, which specifies the data extraction requirement and asks the LLM to suggest trustworthy websites to extract data from.

For instance, consider the task of locating products manufactured by Nikon. CHAT2EXTRACT first uses a Source Finding Prompt 610 to query an LLM:

> From which websites can I find the products produced by Nikon and the official prices of these products? Please provide URLs of these websites if you know.

In response, the LLM may suggest that CHAT2EXTRACT access the official website of Nikon.

In cases where the LLM can only provide a description of the website but cannot specify a valid URL, CHAT2EXTRACT employs a search engine to find websites that best match the description given by the LLM. In some other embodiments, where appropriate, CHAT2EXTRACT queries a knowledge base to determine which sources should be used for finding the target data.

For each found website in the previous step, the next steps are performed by CHAT2EXTRACT to extract target data.

Step 3: Target-Data-Oriented Navigation of a Website

Web pages within a website are often structured hierarchically, with pages about similar topics grouped under the same parent page, providing navigational links to them. CHAT2EXTRACT executes a target-data-oriented navigation process to locate web pages that contain the target data. For example, it begins its search at relevant higher-level web pages that contain links to web pages of various topics, then progressively drills down into lower-level web pages corresponding to specific topics. This systematic navigation through the hierarchical structure ensures that CHAT2EXTRACT reaches the web pages most pertinent to the extraction task at hand.

In this navigation process, CHAT2EXTRACT adopts a target-data-oriented approach. It only accesses web pages that are either:

(a) likely to contain the target data, referred to as "target-data container" web pages or simply "container pages", or (b) likely to contain links leading to container pages or other pages leading to container pages, referred to as "intermediate pages".

Note that, starting from the main page of a website, CHAT2EXTRACT may need to access multiple intermediate pages to reach a container page. A web page can be both a container page and an intermediate page at the same time. For example, a web page that lists products of Nikon and also contains links to other pages listing different products.

For instance, CHAT2EXTRACT conducts this target-data-oriented navigation to navigate the official Nikon website to find web pages listing Nikon products. In this process, CHAT2EXTRACT starts from accessing the main page of the Nikon official website, and then uses the LLM to determine which pages to visit next. It systematically scans each web page for finding new links, avoiding those that lead to previously visited pages. CHAT2EXTRACT then employs the LLM to evaluate these newly discovered links, determining the relevance of the linked pages. Based on this analysis, the LLM guides CHAT2EXTRACT to the next pages that should be navigated to continue the navigation effectively.

In this navigation process, each newly discovered web page, is checked by CHAT2EXTRACT and classified as one of the following: (i) container page, (ii) intermediate page, (iii) both a container and intermediate page, or (iv) irrelevant to the target data.

This classification process is done by leveraging Source Access Understanding Prompts (SAUPs) 630 to determine the relevance of web pages in relation to the target data. These SAUPs are generated using a template, for example:

> To navigate to web pages that contain [Target Data Description], please classify the web page described below as one of these categories:
>   container page: a web page that is likely to contain the target data,
>   intermediate page: a web page likely to contain links leading to container pages or other pages leading to container pages,
>   both a container page and an intermediate page,
>   completely irrelevant to the target data
> The web page is described as: [representation of the web page]
> Return a proper category of this web page.

The [representation of the web page] is a placeholder for a proper presentation of the web page to be classified. The web page should be presented with a combination of the following elements, depending on their availability: 1. the URL of the web page, 2. the text node associated with the HTML tag from which the URL has been discovered, 3. the title of the Web page, typically extracted from the HTML <title> tag, 4. a summary of the Web page content, generated using a recognized content summarizing method.

In some other embodiments, instead of issuing a SAUP for each newly discovered web page, multiple web pages are grouped together into a single SAUP. In yet other embodiments, newly discovered web pages are clustered into different groups based on their similarity in various features (such as elements in the list above). Only representative web pages from each group are then checked using the SAUP, and the labels assigned to these representative web pages are used to generate the labels for other pages in the same group.

Web pages that are labeled as a "container page" or "both a container page and an intermediate page" are stored in a set $\mathcal{CP}$. Each page in $\mathcal{CP}$ is associated with a navigation path indicating how to reach this container page. This navigation path starts from the main page of the website, followed by a sequence of intermediate pages navigated sequentially, ultimately leading to the container page. Some pages in $\mathcal{CP}$ may be associated with multiple navigation paths.

This target-data-oriented navigation process continues until no new intermediate pages are discovered at any stage, which also indicates that no more container pages can be found, or until other predefined criteria are met.

In some embodiments, CHAT2EXTRACT also utilizes the sitemap file of a website, if available, to streamline this navigation process.

In some other embodiments, to increase the recall of discovering container pages or intermediate pages, additional methods are applied alongside the SAUP-based methods. For instance, if links to container pages are discovered on an intermediate page, then other links that are siblings of these container page links in the DOM tree of the intermediate page are also considered to be container pages.

Interactions with Web Pages

In this process of navigating a website, CHAT2EXTRACT can operate in two modes: browser-based mode or browser-less mode. In the browser-based mode, CHAT2EXTRACT utilizes a web browser to load each web page and perform interactions directly within the browser. These interactions include a wide range of possible actions such as: (i) click 641 (ii) scroll 642 (iii) fill in forms 643 In the browser-less mode, CHAT2EXTRACT operates without a browser but can still perform these actions by applying equivalent programs, if possible. For example, in many cases, the action of "click" on an element associated with a URL in browser-based mode can be equivalently achieved by parsing the content of the web page at that URL. Additionally, CHAT2EXTRACT can work in a hybrid mode, using a browser only when necessary, such as when the HTML content contains JavaScript that needs to be loaded and executed by a browser. Next, we give examples to illustrate how CHAT2EXTRACT determines the necessary interactions with a web page in the browser-based mode, while the introduced method can also be extended to the browser-less mode.

In this navigation process, whenever necessary, CHAT2EXTRACT automatically interacts with various interactive elements on a website, such as clicking 641, scrolling down 642, filling in forms 643, and other actions to access web pages and content hidden behind these interactive elements. This functionality is facilitated by Source Access Understanding Prompts (SAUPs) 630.

SAUPs are designed to guide the LLM by providing detailed context about the task at hand, the navigation performed so far, a comprehensive representation of the current web page, and a set of potential actions to execute on the web page. For example, a SAUP may include the following components:

1. Task Definition: Clearly outlines the objective of the data extraction task.
2. Current Navigation Status: Describes the navigation steps taken on the current website to reach the current web page.
3. Current Page Representation: Provides a detailed representation of the current web page. This can be the HTML code of the page, if it fits within the context limit of the LLM. If the HTML code is too lengthy, it can be divided into manageable parts, and multiple SAUPs can be issued.
4. Potential Actions: Lists possible interactions that CHAT2EXTRACT can perform, such as clicking 641, scrolling down 642, or filling in forms 643.
5. Next Action Query: Asks the LLM to determine the next action(s) based on the provided context, referring to web elements to interact using unique identifiers, such as XPath expressions.

Example SAUP

Task: Find the products produced by Nikon and their official prices on the Nikon website.

Current Navigation: Reached the main products page from the landing page of the Nikon website.

Current Page Representation: <representation of the current page>

Potential Actions: 1. Click 2. Scroll down 3. Fill in Web forms

Question: Based on the task and the current page representation, what should be the next action(s) to perform? Refer to the element to be interacted with as an XPath that can uniquely select this element.

In the example above, <representation of the current page> serves as a placeholder for the HTML or other representation of the current web page. This representation can be the complete HTML code, segmented into parts if necessary, to fit within the context limit of the LLM. When the HTML code of the current web page exceeds the context limit of the LLM, the code is divided into several parts. Each part is then incorporated into separate SAUPs, ensuring that the LLM processes the entire page in segments.

Various embodiments may use different representations of the current web page. For example, in some embodiments, a screenshot of the current web page is used together with the HTML. This provides a visual context that can enhance the LLM's understanding of the layout and structure of the web page, thereby improving its ability to determine the appropriate actions to take.

Various embodiments may employ different strategies for generating and utilizing SAUPs. For example, in some embodiments, a web page is first segmented into different parts using an appropriate web page segmentation method, such as one based on the underlying pattern of the HTML code or a segmentation method based on the visual features of different web elements. Only the HTML of selected segments is then passed to the LLM in the SAUP. After the SAUP receives a response with the next action to be performed on a particular element on the web page, CHAT2EXTRACT automatically performs this action and continues navigation.

Search-Engine Based Source Finding

In some other embodiments, CHAT2EXTRACT performs the search process of container pages by utilizing a search engine (via API if necessary) to execute various search queries. Search queries are crafted with the aid of an LLM using Query Generation Prompts (QGP). An example of a QGP is:

Suggest search queries for finding web pages that are relevant to [Task Description].

Among the retrieved search results, the first w web pages—where w is a predefined parameter—are selected for further analysis. Additionally, CHAT2EXTRACT may apply heuristic filters to refine these results further. For example, if the target data predominantly exists in HTML tables, a heuristic might be employed to retain only web pages that contain at least one HTML table (i.e., tables wrapped in an HTML <table> tag). In simpler embodiments, these filtering heuristics are predefined by system developers. In more complex configurations, CHAT2EXTRACT dynamically generates heuristics with the assistance of an LLM. An example prompt template for such purpose could be:

> For the data enrichment task of [Task Description], relevant Web pages that potentially contain data for the enrichment have been retrieved via a search engine. To eliminate clearly irrelevant pages, please suggest some filtering heuristics.

Step 3: Data Extraction from Container Pages

Next, CHAT2EXTRACT applies a Data Access Program Generation 650 process to retrieve relevant data or information from previously discovered relevant web pages. In some simple embodiments, this Data Access Program Generation process generates a Data/Information Retrieval Prompt (DIEP) for retrieving target data from each relevant web page. An example DIEP template is:

> Please retrieve the target data [description of target data] from this web page: [web page representation].

where [web page representation] is a placeholder for a proper representation of either a selected segment of the web page or the full web page. Various embodiments may adopt various formats for such representations such as HTML or Markdown.

In more complex embodiments, the Data Access Program Generation process 650 may be implemented in more sophisticated ways. An example of such an implementation is illustrated below.

Step 3.1 Clustering Web Pages by Their Underlying Structure Similarities Rather than individually processing each relevant Web page, CHAT2EXTRACT may initially cluster similar web pages into groups based on their underlying HTML structures and/or semantics. Within each group, a program such as a wrapper-a specialized program designed for data extraction-is developed using a few representative pages in this group. This wrapper is then employed to efficiently extract data from other pages within the same group.

Step 3.2: Program Generation for Representative Pages
The wrapper generation process for representative pages is described as follows. For simplicity, it is assumed that a single representative page is sufficient for generating a wrapper that applies to all web pages in a group. If one representative page is not sufficient, the same process described below can be repeated on multiple representative pages to derive the desired wrapper.

For each representative Web page, CHAT2EXTRACT employs established Web page segmentation methods to divide the page into distinct segments such as top menus, footer menus, advertisements, main content display areas, sidebars, etc. Subsequently, only those segments that are data centric, i.e., segments for displaying data, but not for other purposes such as navigation bars, are retained for further processing. However, not all identified data-centric regions may be relevant to the target data. To filter out irrelevant data regions, CHAT2EXTRACT leverages an LLM to assess the relevance of each region.

To ensure accurate assessment of relevance, each data region DR extracted from a Web page p is represented by contextual elements that aid in its evaluation. These elements include:
1. url: The URL of the Web page p.
2. page title: The title of the web page p, typically enclosed within the HTML <title> tag. This offers a concise summary of the page's content.
3. data region topic: The text surrounding DR that serves as a summary of the data region. An example of such text is the title of an HTML table, usually enclosed in an HTML <caption> tag.

Next, CHAT2EXTRACT utilizes an LLM to assess the relevance of each data region by analyzing its detailed representation. The relevance evaluation is conducted using the Table Relevance Checking Prompt (TRCP), structured with the following prompt template:

> A user wants to extract target data with the data requirements described as [textual descriptions of the data requirements]. Given a data region DR: [Representation of Data Region], determine if DR. is clearly irrelevant to the target data.

This prompt directs the LLM to critically analyze whether the presented data region's contents align with the information needs of the target data. If the LLM identifies that the data region T is clearly irrelevant, it suggests exclusion.

Subsequently, CHAT2EXTRACT utilizes an LLM to transform the data region, represented by its corresponding HTML snippet, into a structured format such as a table. This conversion process from semi-structured or unstructured information into structured data can use the Data/Information Retrieval Prompt (DIEP) previously introduced. The LLM analyzes the HTML content, extracting relevant data and organizing it into a table format.

After the target data is detected from a representative web page, referred to as sample data, a Data Access Program Generation Prompt (DAPGP) 651 is used to generate a program 652, such as a wrapper written in Python, for re-extracting the detected target data from the same page. This program can also be applied to other web pages in the same group containing the representative web page.

An example template for DAPGP is as follows:
> Generate a program in Python for extracting the following data: [sample data] from the web page [proper representation of the web page].
> Assume that the data may change in the future, but their surrounding context in the HTML may remain the same.

where [proper representation of the web page] is a placeholder for the HTML of the representative web page or a selected snippet, such as the HTML of the relevant data regions previously selected.

This program generation may also adopt other methods such as some wrapper induction methods, without using LLMs.

After this program 652 is generated, it is then tested 653 by CHAT2EXTRACT. This test process first runs the program on the page it originates from, and the extracted data is compared with the sample data. CHAT2EXTRACT checks whether or not the evaluation results pass 654 predefined criteria, such as the data extracted by this program is identical with the sample data. If the results are satisfactory, the program is returned to be applied to other web pages. Otherwise, a DAPGP is triggered again to regenerate a new version of the program or to fix the previously generated program. A DAPGP for this purpose can be generated using a template such as:

The following program: [previously generated extraction program] is supposed to extract the following data: [sample data] from the web page [proper representation of the web page].

However, its results are: [execution results of the program]

Please fix this program or regenerate a new one.

This generation, testing, and fixing process is repeated until the generated program passes the test or another criterion is met. If this process of generating a program from a representative web page fails, other representative pages may be selected. The successfully generated program is then applied to the other web pages in the same group as the representative page to extract target data from these web pages.

In this example, the extracted data from a web page is stored as a list of data records. Each record, such as product information, consists of target attributes and their corresponding attribute values. Each data record is also associated with the representation of the data region from which it was extracted, providing additional contextual information for the data record. This contextual information is useful to further data processing steps, such as the entity resolution process described further below.

To increase the recall of extracted data, CHAT2EXTRACT may apply an item set expansion process to broaden the data records. For example, after extracting product data from the official website of Nikon, CHAT2EXTRACT runs an Item Set Expansion process (as discussed in the section "Variations of CHAT2DATA for Item Set Expansion and Attribute Search") to detect additional Nikon products that are not listed on the official Nikon website but are mentioned on other web pages.

In some more complex embodiments, after all data have been extracted from container pages of some website, CHAT2EXTRACT also runs the Data Access Program Generation 650 process, as introduced earlier, to generate additional programs. These programs comprise navigational programs that automatically navigate through intermediate pages (saved in the navigation paths associated with each container page) and web page interaction programs that can automatically perform necessary interactions. These programs are then assembled with all page-level extraction programs generated by the previously introduced methods, forming a complete Web Data Extraction program 640 for further use in extracting data from the same website.

In some embodiments, the extracted raw data are returned to the user, leaving the post-processing work to be handled by the user or other programs. In this example embodiment, CHAT2EXTRACT further performs additional data processing on the extracted raw data, such as entity resolution, with proper utilization of LLMs, to combine duplicated data records.

Entity Resolution

CHAT2EXTRACT employs an LLM-based entity resolution process to accurately identify and group together data records that represent the same real-world entity. This is crucial when different web pages present the same entity in various formats or with slight variations in data representation. The process is facilitated by an Entity Resolution Prompt (ERP) designed to guide the LLM in determining the equivalence of entities across tables. The prompt template is as follows:

Data Record A: [Representation of Data Record A]
Contextual Information for A: [Representation of the data region from which A was extracted]
Data Record B: [Representation of Data Record B]
Contextual Information for B: [Representation of the data region from which B was extracted]
Determine if Data Record A and Data Record B represent the same entity.

The above is merely an example illustrating how CHAT2EXTRACT finds and properly navigates websites that contain the target data to extract it. In some other examples, CHAT2EXTRACT also leverages Retrieval Augmented Generation (RAG) techniques. For example, consider a data enrichment task aimed at discovering various share-holding relationships between companies from business contracts signed by construction companies in a specific country. This data is then used to enrich an existing knowledge graph about companies. An LLM that has not been exposed to relevant business regulations regarding the construction industry in this country, nor the introductions of the companies involved in these contracts, may not be able to perform this task directly. Thus, CHAT2EXTRACT is triggered to perform a Retrieval Augmented Generation (RAG) process to equip the employed LLM with the necessary background knowledge, such as the legal regulations that define different share-holding relationships and information about the companies mentioned in the contracts. This involves preparing documents by chunking them into manageable parts and storing them in a vector database for efficient retrieval. Relevant legal regulations and detailed profiles of the companies are then retrieved using vector database-based similarity searches. The LLM, now equipped with this context, processes the enhanced prompts to generate accurate and contextually relevant responses, which are then used to update and enrich the existing knowledge graph. This is just one example; various embodiments may adopt different RAG techniques, such as GraphRAG.

The examples provided above illustrate how CHAT2EXTRACT employs LLMs across various sub-processes of its data or information extraction pipeline. However, it is important to note that different embodiments of this disclosure may feature varying designs and implementations of the CHAT2EXTRACT component. Below are some additional explanations:

In some embodiments, each web page processed by CHAT2EXTRACT is first segmented into different segments based on various features, such as underlying HTML structure, semantic features, and visual features. Segments that are clearly irrelevant to the current task are then eliminated. For example, during the target-data-oriented navigation step, only links in relevant segments are checked by the SAUPs.

Although the examples above primarily focus on extracting data directly from container pages, CHAT2EXTRACT is also applicable in scenarios where the target data is not explicitly mentioned on the web page but can be generated using information on the web page.

CHAT2EXTRACT is also applicable for finding or generating information in an unstructured data format instead of a structured one.

CHAT2EXTRACT strictly adheres to the regulations governing website crawling according to relevant laws and guidelines.

CHAT2EXTRACT may suggest new attributes found during the data extraction process to be used for horizontally enriching the target relation, as discussed in the section "Variations of CHAT2DATA for Item Set Expansion and Attribute Search."

In addition, the data/information extraction methods as disclosed here, together with the methods and variants described in the Section 'Data/Information Extraction from External Sources', with their various variants, jointly and separately give rise to methods and systems in their own right. These methods and systems, in addition to their use in database curation, can also be used in various contexts that are totally unrelated to database curation. In some examples these methods will thus be executed by a controller whose main task is different from a database curation task. In some other examples, they will be executed by a dedicated controller.

Rule-Based Reasoning

In some embodiments, CHAT2DATA comprises a rule-based knowledge base and a reasoning engine. The decision-making processes, such as determining the candidate competitors of a company, are supported by automated reasoning tasks performed by the reasoning engine. The reasoning engine evaluates rules over a set of logical atoms belonging to one or more groups of atoms, the one or more groups comprising:
  (i) facts stored in the knowledge base, such as information about company sectors,
  (ii) atoms corresponding to data or data-records in the database, such as already known company competitor pairs, and
  (iii) atoms corresponding to data obtained from prompt-answers, such as companies' product offering data provided by an LLM.
and generates new logical atoms or facts to be used by the controller for decision making.

In some embodiments, as an addition to the LLMs, rule-based reasoning is adopted to facilitate some steps in CHAT2DATA, including, such as: ■ Candidate Generation: Answer candidates (e.g., competitor-pairs) that LLMs are not be able to directly generate may be generated by reasoning, and their appropriateness can be further checked by CHAT2DATA involving multiple checking prompts issued to LLMs. ■ Rule-based answers as benchmarks for assessing recall: The proportion of high-confidence rule-generated answers that an LLM-based method is able to prove by itself, may serve as an indicator of recall of the LLM-based method. ■ Generating instructive examples: Prolog or Datalog or Vadalog rules can be used to generate high-confidence example data tuples that can be used for instructing an LLM. ■ Teaching Datalog rules to an LLM: Datalog (or Vadalog) rules have a high expressive power, but are modular in nature. Moreover, Datalog or Vadalog rules can be translated into natural language, thus giving rise to chain-of-thought prompts.

In the subsequent description, we offer two example scenarios illustrating the application of rule-based reasoning within the CHAT2DATA system. It is important to clarify that these scenarios are presented solely to demonstrate the potential use of rule-based reasoning as either a substitute or a complement to LLM-based methods in tackling specific sub-tasks inherent to the data enrichment problem. The actual implementation of such reasoning processes can vary significantly across different embodiments of the current disclosure, adapting to the unique requirements and objectives of each particular situation.

Example of Using Rule-Based Reasoning for Candidate Generation

In some embodiment, rules can be used to generate new data tuples (or, equivalently, facts), such as new competitor pairs. A rule engine, such as Vadalog or Datalog engine can execute rules over data consisting of: the input database, data stemming from LLMs (items from parsed prompt answers), and, where available, imported or accessed factual knowledge. We illustrate rules and their use by a simplified example. Assume an input DB having relations displayed below, and consider two rules, R1 and R2, displayed further below.

CompanyName(CID,NAME), which associates a company ID (CID) with a company name (NAME).

CompanySector(CID,SEC), which associates one or more industrial sectors to each company.

NrEmpl(CID,NrEm; NrEmScore), storing the approx. number of employees of CID with a plausibility score.

Compatible(SEC1,SEC2; Score), indicating for each pair of sectors a compatibility score.

Competitor(CID1,CID2; PScore), storing known competitor company pairs with plausibility score PScore.

R1: Competitor(CID2,CID3; PNew):—Competitor (CID1, CID2; P), NrEmpl(CID1,N1; S1), NrEmpl (CID2,N2; S2), PNew=min(P,50×S1/S2), PNew>0.65.

R2: Competitor(CID1,CID3; PNew):—Competitor (CID1, CID2; P), Competitor(CID2,CID3; Q), CID1<>CID3, CompanySector(CID1,S1), CompanySector (CID3,S3), Compatible (S1,S3; R), PNew=min(1, $c_1$ max (0, $a_1$P+$a_2$Q+$a_3$R−2), PNew>0.5.

Rule R1 implements a restricted symmetry law for company competitorship which asserts full symmetry in case the companies are of the same size, and symmetry with lower confidence the more they differ in size. (A grocer may consider a nearby large supermarket as competitor, but usually not vice-versa.) Rule R2 is a restricted transitivity rule whose last line computes the resulting confidence score PNew and requires PNew to be greater than the cut-off constant 0.5 for firing the rule. The coefficients $c_1$, $a_1$, $a_2$, $a_3$ are fixed constants that can be set manually or can be machine-learned.

One example for determining by machine-learning suitable values for the coefficients $c_1$, $a_1$, $a_2$, $a_3$ in the above example-rule, and, more generally, the values of similar coefficients in other rules of other applications is to:
  (1) use a verified database D* with data relations corresponding to relevant predicates appearing in the rules,
  (2) define a quality score Q-score (in a similar vein as the well-known F-score) such that the Q-score reflects in some way the quality of the result of an execution of a Prolog or Datalog-like program with parameters (in our example, R1 and R2); the Q-score may be defined as an amalgamation of a correctness score (number of correct tuples generated/number of all tuples generated, assuming that at least one tuple is generated) and a "pseudo-completeness" score (for example: number of correct head-predicate tuples t re-generated by the rules when applied to D*\{t}/number of head-predicate tuples in D*), and
  (3) the determination of parameter values that maximize the Q-score according to some machine-learning and/or optimization method such as gradient descent, that performs an "argmax-approximation"; this usually involves an initialization of the parameters (for example, by random initial values, or by LLM-suggested initial values obtained via prompting, or by using fixed initial values such as, e.g. 0.5) and multiple executions of the program over D* and, for example, over D*\{t} for many tuples t, possibly with a number of restarts using different initial values for the parameters, until the final parameter values are determined. The number of restarts may be fixed or dynamically determined based on some termination criterion, or a combination thereof. An example for a termination criterion is that the Q-score was not be improved after the last k: restarts, where k: is some fixed constant (for example, k=5).

The notion of pseudo-completeness was introduced and used here, because an exact notion of completeness is very difficult to define, let alone to compute. There are many alternative ways of reasonably defining pseudo-completeness (for example, instead based on eliminating a set T of several tuples instead of a single tuple t). When pseudo-completeness is defined as in the above example, the pseudo-completeness value will hardly ever approach 1, because many irrelevant tuples t that will naturally and correctly not be re-generated ought to be tested (e.g., because these tuples are part of initial extensional data rather than having being produced by rules, which applies, in particular, if, such as in Prolog or in certain versions of Datalog, the difference between purely extensional database predicates and intentional predicates is blurred, because rule heads may correspond to predicates of an input database, and therefore the rule applications may modify input relations). However, notwithstanding these considerations, a higher degree of pseudo-completeness still corresponds to a "more complete" rule set. The maximization of the degree of pseudo-completeness (in combination with the degree of correctness, and thus of the Q-score) thus makes sense. There are several ways of amalgamating correctness with pseudo-completeness to obtain a Q-score. If we assume, as in the example(s) above, that both the correctness and the pseudo-completeness are given as decimals in the interval [0,1], then the Q-score can be obtained by the same amalgamation rule as the traditional F-score, namely, Q-score=(2×correctness×pseudo-completeness)/(correctness+pseudo-completeness), or variants thereof, that give more weight to either correctness or pseudo-completeness. Another example of defining the Q-score is to define it as a linear combination of the correctness and pseudo-completeness, namely, Q-score=($\alpha$×correctness)+($\beta$×pseudo-completeness), where $\alpha$ and $\beta$ are positive decimals that sum up to 1 that act as weighting factors. Their values may be pre-fixed depending on the requirements of an application. For example, if, as in many applications, more importance is given to correctness, and incompleteness is better tolerated, then $\alpha$=0.7 and $\beta$=0.3 would be a good choice. All these are examples, and in various embodiments, different amalgamations may be appropriately used.

In other examples, where an initial unverified database D is available, which is known or assumed to be highly or at least sufficiently (but not necessarily perfectly) correct and complete, this database D may be used directly with the above-described parameter-learning methods, rather than a verified database D*. In yet different examples, instead of pseudo-completeness, an effective more direct estimate of proper completeness may be achieved. For example, this is possible in some cases where either an input database D, or a suitable part thereof, or a verified database D*, offers a way to distinguish "basic" facts (or tuples) from "implied" facts (or tuples), that is, facts (or tuples) that are implied by other present tuples. In this case, the degree of completeness of a set R of rules may be estimated by the quotient A/B, where A is the number of implied facts generated by applying R to the set of basic facts, and B is the number of all implied facts.

Using the input database and R1 and R2, an inference engine can infer new competitors from existing ones and iterate this process.

In some embodiment, each result candidate generated via reasoning is double-checked by the controller using one or more prompts to the one or more LLMs.

Example of Using Rule-Based Reasoning for Inconsistency Detection and Conflict Resolution In some embodiments, a rule-based reasoning process is used to identify and resolve inconsistencies in the query answers.

As logical reasoning works with facts and rules (or, more generally formulas), in one example, CHAT2DATA is provided with pre-defined predicate-templates such as
 similar(<object1>,<object2>,<sim-degree>,<step>; <score>)
with the meaning that at step number <step> of a current prompting sequence (across one or more sessions) the objects <object1> and <object2> are recognized to be similar to each other by a degree <sim-degree>, and this fact has been assigned a plausibility score <score>.

In a similar way, a pre-defined predicate-template
 similar-list([<object-list>],<sim-degree>,<step>; <score>)
may be used to formally state that a list of objects [<object-list>] at step number <step> of a current prompting sequence was recognized to all have the same similarity-degree <sim-degree>, and this fact has been assigned a plausibility score <score>.

These and other pre-defined predicate-templates may be given textual explanations so that an LLM can understand their precise meaning. Note that plausibility scores are an advanced feature. They may not be used for consistency checking and do not need to be used by every embodiment that performs logical consistency checking. In various embodiments, predicate-templates and their textual description are put into the context of an LLM and thus made available to the LLM for a prompting session. An instantiation (a.k.a., ground instantiation) of a predicate-template is a fact obtained by replacing the placeholders in angular brackets by concrete values. Such instantiations are formal logical facts and may be extracted or "distilled" (or simply, obtained) from the textual prompt-answers and possibly also from the prompt texts themselves, as they may contain relevant assertions, and in some cases also from other context such as, for example, imported text or data stemming from external data or information sources, from user-supplied documents and descriptions, from web data extraction or other information gathering actions, and so forth. In some examples, one or more instruction prompts are issued to instruct an LLM via explanations and examples about how to distill predicate-templates from text or data.

Then, after each basic prompt (i.e., after each step of a CHAT2DATA prompting sequence as described before), an additional auxiliary logical fact gathering prompt (LFG-Prompt) is issued, that tries to extract new instantiations of the predicate-templates, by replacing the placeholders in angular brackets with appropriate constants, especially based on new knowledge conveyed by the latest prompt answer, but also taking into account previous prompt-answers and the LLM's background knowledge. Where plausibility scores are used, these can simultaneously be obtained from the LLM by asking the LLM about the confidence it has regarding the validity of the instantiation, or, in various other embodiments or examples, according to various other methods (e.g., by additional prompting for explanations). The LFG-prompt for extracting ground facts, in this example, is simply:

"Based on the previous prompt-answers, and especially considering the knowledge provided by the latest prompt-answer, combined with your general knowledge, please generate as many as possible new instantiations of the previously indicated and explained predicate templates; to determine the similarity and plausibility scores of each new instantiation i (that is, the values of the <sim-degree> and <score> parameters of i), replace each of these parameters by an appropriate integer value on a scale from 0 (extremely low) to 10 (extremely high)."

This is just an example of an LFG prompt. In various embodiments, a host of different LFG-prompts or even prompt-sequences, or other methods, for determining the similarity degrees and plausibility scores of generated new instantiations may be used.

Once instantiations have been extracted or generated, they can be considered as logical facts that can be used in a reasoning process together with other logical facts and rules.

As an example, consider the "Pen and Marker" example, where the answers to prompt 1 and prompt 3 give rise to the following facts (i) and (ii), respectively:

(i) similar("pen","marker",6,1;5), where the fourth argument (1) is the dialog step, and the fifth is the plausibility score for the entire fact.

(ii) similar-list("pen",["pencil", "highlighter", "marker", "fountain pen", . . . ],9,3;7), indicating a list of items similar to pen. Again, the last argument consists of the plausibility score.

To detect an inconsistency, a reasoning engine or logic-programming interpreter would need extra axioms that are, formalized general knowledge: two rules for translating a "similar-list" atom into a set of "similar" atoms, and one stating that an item-pair (X, Y) has only one similarity score. This is formalized, for example, by the following rules A1-A3:

A1: similar(X,Head,SScore,Step;PScore):—similar-list(X,[Head|Tail],SScore,Step;PScore);

A2: similar-list(X,Tail,SScore,Step;PScore):—similar-list(X,[Head|Tail],SScore,Step;PScore);

A3: inconsistent-similarity-scoring(X,Y):—similar(X,Y,S1,Step;P1), similar(X,Y,S2,Step;P2), S1< >S2.

These rules may be stored as general background knowledge in a knowledge base or knowledge graph, to which the generated instantiations of predicate templates are added as logical facts. In some examples, at least some rules are obtained based on constraints, such as functional dependencies, which stem from preceding data intelligence activity carried out by the controller and/or from data intelligence prompts.

In general the used logical (or other) rules can be divided into two classes: (a) rules for generating new atoms, and (b) rule-based constraints. The rules for generating new atoms can generate new database tuples or auxiliary facts; the rule-based constraints are similar to already mentioned data dependencies and related constraints. Actually, as seen, such classical constraints can be reformulated as rule-based constraints. Both rules for generating new atoms and rule-based constraints are continually or periodically checked for applicability by CHAT2DATA and are executed whenever they apply. Similarly, rule-based constraints are continually or periodically checked by CHAT2DATA and automated conflict resolution is applied or some emergency action is performed in case a conflict or constraint violation is detected.

From these facts and rules, example CHAT2DATA embodiments use a Datalog engine or another reasoner (for example, an automated theorem prover) to infer further facts, among which, in our example, the fact similar ("pen","marker",9,3;7) (obtained by multiple applications of Rule A2 followed by an application of Rule A1). By further rule application(s), inconsistencies can be detected. In our example, by applying Rule A3 to the two generated facts similar ("pen","marker",6,1;5) and similar ("pen","marker", 9,3;7). In particular, the fact inconsistent-similarity-scoring ("pen","marker"), is generated and returned to the control system with other relevant data, comprising, in this example, the two above facts as "inconsistency-culprits". The control system then performs conflict resolution according to some conflict resolution strategy.

In some CHAT2DATA examples, a possible simple conflict resolution strategy for the similar predicate could be as follows: Given two facts similar(x,y,sim-degree1,step-a;score1), and
similar(x,y,sim-degree2,step-b;score2), where sim-degree1≠sim-degree2, replace these two inconsistent facts by similar(x,y,sim-degree,step;score), where step:=if step-b>step-a then step-b else step-a.
sim-degree:=if score-2>score-1 and step-b>step-a then sim-degree2 else {if score-1>score-2 and step-a>step-b then sim-degree1
else (sim-degree1+sim-degree2)/2.}
score: =if score-2>score-1 and step-b>step-a then score2 else {if score-1>score-2 and step-a>step-b then sim-score1
else (score1+score2)/2}.

Essentially, the above conflict resolution strategy, for two conflicting instantiations of the similar predicate relative to the similarity of two entities x and y adopts the similarity degree (sim-degree) and the plausibility score (score) of the instantiation generated more recently in the prompting sequence, provided this instantiation has a higher plausibility score, otherwise takes the average between the two similarity degrees and plausibility scores, respectively. This heuristics is a "rule of thumb" that reflects the assumption that after a later prompting step, the underlying LLM has usually accumulated more knowledge (just as in the "pen and and marker" example) and can make better decisions; however, in case the plausibility-score was diminishing rather than augmenting (or remaining stable) after additional prompting, it is often not clear for what reason (e.g., whether the LLM was just "distracted" by some new prompting elements or whether there is some more objective reason that made it conclude that that it should no longer be so sure about the assigned similarity degree); in this latter case the conflict is heuristically resolved by simply taking the average of the two similarity degrees and plausibility scores, respectively. Clearly, in other embodiments, different, and even much more complex conflict resolution strategies may be employed (see also below).

In various embodiments, the above and other conflict resolution strategies can be implemented directly or by using a rule-based approach. In the latter case, the above example of conflict resolution could be encoded by the following set of Datalog or Prolog-like logical rules:

resolved_similar(X,Y,SD,STEPb;SCORE2):—
similar(X,Y,SD2,STEPb;SCORE2),
similar(X,Y,SD1,STEPa;SCORE1),
STEPb>STEPa,
SCORE2≥SCORE1.
resolved_similar(X,Y,(SD1+SD2)/2,STEPb;(SCORE1+SCORE2)/2):—
similar(X,Y,SD2,STEPb;SCORE2),
similar(X,Y,SD1,STEPa;SCORE1),
STEPb≥STEPa,
SCORE2<SCORE1.

This generates a new predicate-instantiation, namely a ground atom of the form resolved_similar(x,y,sd,step,score) which the control system, after having eliminated the two conflicting facts, replaces by similar(x,y,sd,step,score). In variant embodiments, the replacement of the conflicting predicate-instantiations (i.e., logical facts or ground atoms) by new facts can be directly executed by the rules as follows: (1) by using a Prolog-like retract predicate that retracts the conflicting facts, and (2) by replacing the resolved_similar predicate in the above two rule heads by the similar predicate, whereby the rules then directly generate the new (conflict-resolving) predicate-instantiation as the result of the conflict resolution.

There are many variants of the conflict (or contradiction) detection and resolution process, and, more generally of introducing formal logical reasoning into the natural-language based prompting process generated by CHAT2DATA. For the sake of illustration, an incomplete list of a few examples of features of different (usually more advanced) methods is given here below:

Automatic determination of predicates: Rather than providing a pre-determined list of relevant predicates, in some embodiments, the relevant predicates and predicate-templates are automatically generated. This requires additional prompting with the goal of identifying suitable predicates with their arguments based on both issued prompts and received prompt-answers. In some variants, the LLM is automatically pre-prompted (by the controller) with generic but detailed instructions of how to identify predicates and/or predicate-templates and how to define their arguments (with or without a plausibility score argument).

Automatic determination of relevant rules and constraints: In some embodiments, relevant rules may be generated automatically via specific automatic prompting. For example, after having determined relevant predicate-templates, relevant rules and/or constraints are automatically determined: (a) rules or constraints valid for single predicate-templates, for example the functional dependency expressing that every pair of entities X and Y can have at most one similarity score (see rule A3 above), but also conditional functional dependencies, multi-valued dependencies, attribute range-constraints, and others, and (b) dependencies and constraints between predicate-templates, such inclusion dependencies and other constraints such as, for example, the seemingly trivial rule that if S is a set or list of entities having all a certain relationship to a specific entity X (e.g. the same similarity-degree to X), then each individual element of S has this relationship to X (see the above rules A1 and A2.); as explained farther below (see e.g. the description of CHAT2RULES under the next heading), rules and constraints on can also be automatically discovered based on sample data either by statistical means or by LLM prompting or by a combination thereof.

Reasoning via LLM: As advanced LLMs have some logical reasoning capabilities, and LLMs in general, are getting better in this regard, certain embodiments just use the LLM for reasoning instead of using a dedicated reasoning engine (such as a logic programming inference engine or an automated theorem prover). Embodiments where an LLM's own reasoning power is used for deduction, will often use auxiliary prompting to guide the LLM in the process. For example the controller may issue after each basic prompt (and possibly after having issued other auxiliary prompts that follow this basic prompt) an auxiliary "reasoning triggering prompt", for example, of the form "Please check carefully whether new predicate-instantiations follow from the already known ones and from known rules, and if so, please retain them for further reasoning. Please also check if any inconsistency has arisen among the known predicate-instantiations and rules, and if so, issue an alert and point out mutually inconsistent predicate-instantiations", where the LLM was instructed before of the precise syntactical form of such an alert.

Automatic conflict resolution: In certain examples, the used LLM(s) are prompted to find conflict resolution strategies autonomously. This can be done at various levels of abstraction. In the most general case, the controller issues one or more instruction prompts about how to resolve conflicts as an initial part of the prompting sequence. For example, a prompt such as "If, at some point in this prompting session, you have generated predicate-instantiations that you have recognized to be mutually inconsistent (also taking into account all rules and constraints you are aware of), please resolve this conflict by replacing these mutually inconsistent instantiations with one or more new instantiations that are mutually consistent and do not create further inconsistencies. In addition to your own reasoning, you may be guided by the following principles: (a) older predicate-instantiations may have become obsolete in the light of knowledge obtained based on more recent prompt-answers, and may thus be eliminated, thus check carefully, which knowledge has led to which instantiation, and whether some instantiation has been overridden by new knowledge; (b) plausibility scores, if available, should be taken into account, but the plausibility scores predicate-instantiations obtained from older prompt-answers may have to be updated in the light of new insights that possibly arose based on more recent prompt-answers before resolving the conflict; (c) two or more conflicting instantiations of the same predicate that differ only in basic numerical values (such as some degrees) associated to the same object or combination of objects, may be amalgamated to a single instantiation of the predicate with appropriately aggregated numerical values; if the instantiations carry plausibility scores, then these scores may be aggregated, too, in an appropriate way so to yield a new plausibility for the amalgamated instantiation; (d) proceed according to the principle of minimal change so to keep as much of the previous information intact and change only what is necessary in order to re-establish consistency." In addition to this prompt, further prompts may show the LLM a number of suitable concrete examples of conflict resolution. Alternatively, in other examples, rather than performing automatic ad hoc conflict resolution, in cases where the predicates-templates and relevant rules and/or constraints are known, the controller issues one or more prompts to determine conflict-resolution strategies and instructs the LLM to apply those in the subsequent prompting sequence.

"Soft-language" facts and/or rules Rather than using a strictly logical syntax for facts (predicate-instantiations) and for rules or constraints, natural language can be used in some embodiments.

Combining basic prompts with auxiliary prompts Rather than separating basic prompts serving for the primary fulfilment of certain tasks (e.g., database curation), from auxiliary prompts (for consistency checks, fact inference etc), and thus issuing prompts corresponding to these two classes separately, these types of prompts may be combined. For example, to each basic prompt, a text corresponding to an inference-triggering prompt may be appended, followed by a text corresponding to a consistency-checking prompt, and then by a text corresponding to a conflict-resolution triggering prompt.

The logical reasoning methods and the conflict detection and conflict resolution methods as disclosed here, with their various variants, together with the methods and refinements described under the next heading, jointly and separately give rise to new independent methods and systems in their own right. These methods and systems, in addition to their use in database curation, can also be used in various contexts that are totally unrelated to database curation. For example, they can be used as main parts of a "prompting co-pilot", that is, in a system that observes and evaluates arbitrary LLM prompting sequences issued by a person or a machine to detect and/or and/or report and/or correct inconsistencies and thus to obtain better answers to supplied prompts. In some examples these methods will thus be executed by a controller whose main task is different from a database curation task. In some other examples, they will be executed by a dedicated controller. These methods may also be used inside advanced LLM systems or as part of extension thereof, for improving the answer quality. The methods may also be used for automatic re-training and fine-tuning purposes, for instance, by collecting instantiations recognized as wrong (or not adequate) and submitting them as negative training examples, and by submitting the correct (or improved) instantiations as positive training examples within an LLM re-training process. Moreover, various types of knowledge such as, for example, conflict resolution rules (whether handcrafted or automatically generated) re-formulated in natural language may be automatically added to the context of a prompting session in order to improve the results.

More on Automatic Rule Generation

This subsection provides various aspects and features, and other detailed explanations and examples of rule-generation as used in various Chat2Data embodiments.

Beyond performing rule-based reasoning, Chat2Rules can also automatically or semi-automatically generate the rule-based programs required by the reasoning process. It can transform the knowledge acquired from LLMs into executable rules, creating rule-based programs specifically tailored for application across diverse database curation processes. When rule-generation is used at all by or within Chat2Data, then, for simplicity, we refer to the part or component responsible for rule generation as Chat2Rules. Chat2Rules will be illustrated by two (partly overlapping) non-limiting example-scenarios. The two example scenarios of Chat2Rules introduced in this section serve merely as illustrative examples. In various other examples, the features introduced in these two scenarios may be combined and used together. Note that Chat2Rules can not only be used in the context of Chat2Data, but can be used as stand-alone method or system in its own right.

Orchestration of Various Processes Chat2Rules automatically orchestrates multiple steps according to a predefined workflow or dynamically determines the next step based on the results of previous steps and/or the current status of the Chat2Rules system. The dynamic orchestration can apply methods as discussed in the section "Knowledge-Driven Dynamic Decision Making at Runtime." The steps being orchestrated include relation understanding, generation of sample databases, initial rule generation, non-LLM-based rule generation, generation of various constraints, template-based rule generation with the help of LLMs, rule refinement and rule candidate selection, rule set testing, and final rule selection, among others.

Chat2Rules: First Example Scenario

We illustrate this example scenario for Chat2Rules by new example-relations jointly with other example relations (e.g. relations similar to those from the database depicted in FIG. 9). The new relations TAXTABLE (shown as Table 2 below) and TAX-EXEMPT (shown as Table 3 below) are from an imaginary Tax Office database.

TABLE 2

Data Relation "TAXTABLE"

| tuple-id | SSN | State | ZIP | Salary | TaxRate |
|---|---|---|---|---|---|
| t1 | 666-03-8452 | CA | 90001 | 85,000 | 0.22 |
| t2 | 666-21-9900 | NY | 10001 | 95,000 | 0.24 |
| t3 | 666-05-6251 | TX | 78701 | 90,000 | 0.2 |
| ... | ... | ... | ... | ... | ... |
| t5679 | 666-88-7551 | CA | 94304 | 120,000 | 0.30 |
| t5680 | 000-77-8888 | CA | 94305 | 121,000 | 0.30 |
| t5681 | 666-00-8903 | CA | 94304 | 120,000 | 0.0 |
| ... | ... | ... | ... | ... | ... |
| t9899 | 666-09-9999 | TX | 78652 | 90,000 | 0.2 |
| t9900 | 000-88-2213 | NY | 10016 | 100,000 | 0.28 |
| t9901 | 666-77-3333 | TX | 78652 | 90,000 | 0.17 |
| t9902 | 6665-77-222 | TX | 78652 | 90,000 | 0.17 |
| t9903 | 666-99-1234 | TX | 78652 | 90,000 | 0.17 |
| t9904 | 666-07-4231 | TX | 78701 | 89,000 | 0.16 |
| t9905 | 000-25-9900 | IL | 61802 | 40,000 | 0.0 |
| t9906 | 666-77-7654 | IL | 61802 | 25,000 | 0.0 |
| ... | ... | ... | ... | ... | ... |

TABLE 3

Data Relation "TAX-EXEMPT"
(data are fabricated for illustration
purpose only, SSNs are invented
and are not valid SSNs
corresponding to any person)

| TID | SSN | Tax-Res-Country |
|---|---|---|
| s1 | 666-66-6666 | France |
| s2 | 000-25-9900 | Mexico |
| s3 | 666-00-8903 | Switzerland |
| ... | ... | ... |

In each of these tables, only some data tuples are shown, and the data are fabricated for illustration purposes only. In particular, the SSNs are invented and do not correspond to any person. Moreover, these two relations are assumed to be part of a Tax Office database that contains further relations. Obviously, these imagined example relations are a dramatic simplification of the kind of relations to be effectively found in a Tax Office database. However, the example relations are used—and useful—for illustration purposes.

The TAXTABLE Relation shows taxpayers (identified by their social security number SSN), their current US state of tax residence (State) and the ZIP code (ZIP), their salary (Salary), and their tax rate (TaxRate).

The "TAX-EXEMPT" Relation shows the SSNs of tax-exempt individuals that are currently resident in the US, but are not tax-resident (for example because they were abroad for work for most of the tax year), and also shows their foreign country of tax residence (Tax-Res-Country).

The columns tuple-id and TID of TAXTABLE and TAX-EXEMPT, respectively, are not necessarily part of the original database, and could have been added by CHAT2RULES or some other module of CHAT2DATA. Such tuple identifiers are useful and simplify the presentation and, to a certain degree, the prompting, because they are guaranteed single-attribute keys for each relation. Therefore we assume their presence. However, they are not essential parts of the CHAT2RULES, and their use can be circumvented by using (possibly compound) primary keys instead.

For rule-learning, the well-known concepts of confidence and support of a rule are useful criteria (see, e.g. the Wikipedia article "Association Rule Learning").

With respect to a database D, these concepts can also be defined for Prolog or Datalog-like rules of the form $R(X,Z)$:—$R1(X1,Y1), \ldots, Rn(Xn,Yn)$, Condition where X, Z, and the Xi and Yj are possible empty lists of variables, each variable may occur in several lists, and the set of all variables in all Xi-lists in the rule body is precisely the set of all variables occurring in the list X, while each Yj is variable-disjoint from both X and Z, where, moreover, R and the Ri are predicate symbols that correspond to homonymous database relations where some Ri may coincide with R or with some Rj, where $j \neq i$, and where Condition is an optional (sometimes numerical or mathematical) condition on the body variables, for example "(X1<Y3 & X1+x2<5)". The Z variables are so-called existential variables. Rules with such existential variables in the rule head are called tuple-generating dependencies (TGDs), or also existential rules or Datalog$^+$ rules. They cannot be syntactically expressed in plain Datalog, but, for example in formalisms such as Datalog$^\pm$ or simulated in Prolog by use of Skolem functions.

The logical semantics (i.e., meaning) of an existential rule over a database D is the evaluation over D of the implication $\forall X1 \ldots \forall Xn \forall Y1 \ldots \forall Yn(R1(X1,Y1)\& \ldots \&Rn(Xn,Yn) \& \text{Condition}) \Rightarrow \exists Z\ R(X,Z))$.

If this formula evaluates to true over a data base D, then we say the rule is valid or true in D. In an extended formalism, rule-atoms may also use well-known predefined arithmetic or other predicate symbols in addition to the relation symbols of a database. The semantics of rules with occurrences of such atoms is essentially also captured by the above formula.

The part on the right of the ":—" sign of a rule r is called the rule body and is denoted by body(r), and the part on the left the rule head, which is denoted by head(r). Each substitution θ that replaces all variables of body(r), head(r), or r uniformly by database domain elements is called an instance of body(r), head(r), or r, respectively. A matching θ-instance of body(r) is one, where for each atom Ri(Xi,Yi) of body(r), the ground atom θ(Ri(Xi,Yi))=Ri(θ(Xi),θ(Yi)) corresponds to (i.e., is, or can be identified with) an existing tuple of the database D, and where also Condition becomes true after having applied the substitution θ to the body variables. A matching θ-instance of the rule is a matching θ instance of the rule body for which θ(R(X))=R(θ(X)) also corresponds to an existing database tuple from D.

The support of a rule is here defined as the number of distinct matching θ-instances of the rule divided by the cardinality |R1× . . . ×Rn| of the Cartesian product of the Ri.

The confidence of a rule is equal to the number of the different matching θ-instances of the rule divided by the number of the different matching θ-instances of the rule body.

A logical rule or TGD, when executed by a logic programming engine, is a constraint together with a constraint satisfaction (or conflict resolution) mechanism: The rule fails if and only if there is a substitution θ that makes the body true, but the head false for a current database (=set of ground atoms). However, if the rule fails for some θ, then θ(head) is added to the database to make the rule true. This is only valid if the head-predicate is a regular relational predicate and not a pre-defined predicate such as an arithmetic comparison predicate. If the atom of a rule head is a comparison atom such as X<Y, then the rule is a mere constraint. In the special case the head predicate is "=" there are two ways of interpreting a rule: as a mere constraint, or as an equality-generating dependency (EGD) that, in case the rule fails with θ, whenever possible (e.g., if at least one of θ(X) and θ(Y) is a null value), unifies θ(X) with θ(Y) or asserts that they are equal.

The above definitions can be naturally generalized to various extensions of the basic TGD formalism, such as rules with negated atoms in rule bodies (in which case an instance of a negated atom matches a database D if it is not contained in D), or to rules with multiple rule heads, and so forth.

In this example, CHAT2RULES comprises various activities (a.k.a, procedures or steps), some of which are: relation understanding (which is also a feature that CHAT2DATA heavily uses in other contexts, too), initial rule generation, empirical or statistical rule testing, rule set evaluation and rule selection, systematic rule refinement and calibration, and outlier handling. These activities are described separately in the following.

Activity of Generating Sample Databases.

When working with huge databases it often impossible to give an LLM a synoptic view of the entire database, e.g by loading it in its entirety into an LLM-context. Training or fine-tuning the LLM with a huge database does not help, as there will be a significant loss of information, and the availability of precise data is blurred. For rule learning, and also for fast rule testing, it is thus advisable to produce smaller sample databases that are subsets of the original database.

Rules in Prolog, Datalog, and similar languages, usually have multiple atoms that are all connected by chains of joins. If a relatively small number of tuples are sampled randomly from a huge database, then it is unlikely that sufficiently many chains of "joining" atoms, i.e., atoms that are connected by a path of pairs of atoms that share some data value are selected. This makes it less likely that rule bodies with more than 3 atoms can match the sample database, and, as a consequence, mostly rules with a very low support, and thus low trustworthiness can be learnt, if at all.

CHAT2RULES uses a sampling strategy that provides more value-connected clusters of atoms (=tuples) which makes it more likely that rules can match. For this let us first define some concepts.

The atom-graph atomgraph(D) of a database is defined as follows. The vertices of atomgraph(D) are simply all atoms in D. There is an (undirected) edge {u,v} between an atom u and an atom v if u and v share some data value. Let r be a positive integer. The r-neighborhood of a node u of atomgraph(D), denoted by N[u,r,D], is the set of all vertices v of atomgraph(D) whose distance from u is at most r. Call a data value u rare, if it occurs in no more than c tuples where c is a predefined constant (e.g. c=15).

Imagine CHAT2RULES wants to generate or test rules having r−1 body database-predicate atoms and one head-atom. It will then randomly select a set W of d rare data values from some atoms in atomgraph(D), where, again, d is a predefined constant (say, d=25). The sample database D[W] for D is then defined as the union of all neighborhoods N[w,r,D], such that w is an element of W. If D'=D[W] for some W as stated above, then we say that D' is a multi-neighborhood sample database (short MNSDB) for D.

Activity of relation understanding. Relation understanding consists in prompting one or more LLMs so to obtain intelligence and a textual description (that can be used by further prompts) of the relations, attributes and some main connections between data tables of a given database. It has been described in much detail in this disclosure, and will be further detailed in the second CHAT2RULES scenario described farther below. However, CHAT2RULES also makes use of its chosen sampling technique, and prompts a suitably sized MNSDB (either in form of atoms or in form of data relations with the appropriate attributes) to the LLM. This helps data understanding, but at the same time (at least within the same prompting session or prompting thread), remains in the LLMs knowledge and may facilitate further tasks such as rule generation and rule testing.

Activity of initial rule generation. This is the activity of first generating rules, some of which may be later dropped or refined. Rules can be initially generated in various ways, by using one or a combination of the following methods.

Non-LLM-based Rule generation. Obviously, non-LLM-based methods such as rule mining and other statistical methods that look at the data may be applied. There is an arsenal of well-known rule-mining, data-dependency, and automatic integrity constraint generation methods that can be used. Many of these existing methods allow a (human or artificial) user to invoke the process with a specification of minimum required confidence and support thresholds. For each rule it generates, the system also outputs the corresponding confidence and support. Examples of such methods or systems are: various inductive logic programming (ILP) methods and ILP systems such as Progol, TILDE, and FOIL; the Apriori Algorithm, Frequent Pattern Growth (FP-Growth), ALEPH, AMIE (Association Rule Mining under Incomplete Evidence), and WARMR. CHAT2RULES (a) provides methods and means for invoking and/or steering or controlling one or more of these methods or software packages and applying them to the given database, (b) determines appropriate minimum confidence and support thresholds and submits these, (c) applies a quick sanity check to the rules obtained and eliminates rules that are immediately recognized as redundant or irrelevant, where the check can be done by one or more special prompts or by other means, and (d) determines an appropriate range or threshold set for the expected minimum and/or maximum number of rules and submits it as input parameters to the chosen method(s) or software package(s). In case this is not possible, it performs tests or experiments with these method(s) or software package(s) by re-starting them with appropriately modified confidence and/or support threshold(s) until they produce rules whose number is in the desired range. Alternatively, it decides that an appropriate subset of the generated rules should be determined in the course of a deeper analysis by other CHAT2RULES activities in subsequent steps. If no rule or constraint is generated at all, a pre-defined exception-handling action is to be invoked.

Generation of attribute-range and syntax constraints. Attribute-range constraints comprise numerical or syntactical constraints on attribute values, such that values that do not fulfill these constraints are considered outliers and possibly wrong data. In this example, these constraints serve to single out outliers, but in more sophisticated embodiments, these outliers are automatically corrected where possible. For example, a correction prompt can be invoked to understand whether a correction is obvious and, in this case, how they ought to be corrected. In the present example, we are not concerned with automatic corrections.

There are various possibilities to create rules in case of supposedly wrong data. Some examples use hard denial constraints that would lead to an inconsistency in case wrong data is detected, for example, the Prolog rule
    fail:—Has-Age(Person,Age), Age>150.

In the present example CHAT2RULES just generates rules that single-out detected outliers by creating (through the rule-heads) facts of the form
    outlier(<type>,<relation>,<tuple-id>,<attribute>,
        <value>,<constraint-violated>)
where the arguments may have the following values:
    <type>: in case of a range violation "range", in case of a syntax violation "syntax";
    <relation>: the name of the relation in which the outlier was found;
    <tuple-id>: the id of the tuple where the outlier resides;
    <attribute>: the name of the attribute whose value constitutes the outlier in the identified tuple;
    <value>: the value of the outlier data item under consideration;
    <constraint-violated>: the constraint which was violated.

For obtaining the outlier-rules the system, after having already gained some data insights based on the previous relation understanding activity by use of data intelligence prompting, CHAT2RULES, in the same prompting session, automatically generates the following prompt:

We would like you to generate range restriction and other syntactic constraints for the above-given TAXTABLE and TAX-EXEMPT. Please carefully cast, for each attribute value reasonable constraints, in case the attribute is numeric, so that data in these columns that do not satisfy these constraints are outliers. Similarly, cast syntactic constraints, if the data (numeric or not) related to some attribute are to be in a special form (for example, with separators, or are of a maximum length). Express the numeric constraints by equations or inequations, and express syntactic constraints in form of regular expressions. Use all your knowledge plus an inspection of the effective data to come to your conclusions. After having done that, please formulate these constraints in form of special Prolog or Datalog-like rules rules of the form outlier (<type>, <relation>, <tuple-id>, <attribute>, <value>, <constraint-violated>: <violation conditions>, where the head arguments may have the following values:
    <type>: in case of a range violation "range", in case of a syntax violation "syntax";
    <relation>: the name of the relation in which the outlier was found;
    <tuple-id>: the id of the tuple where the outlier resides;
    <attribute>: the name of the attribute whose value constitutes the outlier in the identified tuple;
    <value>: the value of the outlier data item under consideration;
    <constraint-violated>: the constraint which was violated.
    As in Prolog, you may use a predefined predicate match (<Value>,<Regex>) in the rule bodies, that checks whether a value <Value>satisfies the regular expression <Regex>, and you may use negation in rule bodies.

This prompt is submitted to GPT4O, and here below is the full answer, which is more than satisfying. Note that (1) the rules can easily be extracted from this answer by CHAT2RULES, and (2) in a production environment, the above prompt would be extended by "answer formatting" and "verbosity suppression" sub-prompts, so that only the rules, but no other text whatsoever would be returned by the LLM.
[Begin of Answer]
To define the range restrictions and syntactic constraints for the TAXTABLE and TAX-EXEMPT relations, we need to examine each attribute and establish reasonable constraints.

We'll formulate these constraints in Datalog-like or Prolog-like rules.
TAXTABLE Relation
Constraints:
tuple-id:
Type: Syntactic
Constraint: Should match the format "t" followed by digits.
Regular Expression: ^t\d+$
SSN:
Type: Syntactic
Constraint: Should match the format of a U.S. Social Security Number:
three digits, a hyphen, two digits, a hyphen, and four digits.
Regular Expression: ^\{3}-\{2}-\{4}$
State:
Type: Syntactic
Constraint: Should be a valid U.S. state abbreviation (2 uppercase letters).
Regular Expression: ^(AL|AK|AZ|AR|CA|CO|CT|DE|FL|GA|HI|ID|IL|IN|IA|KS|KY|LA|ME|MD|MA|MI|MN|MS|MO|MT|NE|NV|NH|NJ|NM|NY|NC|ND|OH|OK|OR|PA|RI|SC|SD|TN|TX|UT|VT|VA|WA|WV|WI|WY)$
ZIP:
Type: Syntactic
Constraint: Should be a 5-digit number.
Regular Expression: ^\d{5}$
Salary:
Type: Range
Constraint: Should be a reasonable annual salary, for example, between $20,000 and $500,000.
Inequation: 20000<=Salary <=500000
TaxRate:
Type: Range
Constraint: Should be a reasonable tax rate, for example, between 0 and 0.5.
Inequation: 0<=TaxRate <=0.5
TAX-EXEMPT Relation
Constraints:
TID:
Type: Syntactic
Constraint: Should match the format "s" followed by digits.
Regular Expression: ^s\d+$
SSN:
Type: Syntactic
Constraint: Should match the format of a U.S. Social Security Number:
three digits, a hyphen, two digits, a hyphen, and four digits.
Regular Expression: ^\{3}-\d{2}-\d{4}$
Tax-Res-Country:
Type: Syntactic
Constraint: Should be a valid country name, assuming no specific format constraints here.

Formulating Constraints in Datalog-like Rules
Here are the constraints formulated as Datalog-like rules:
For TAXTABLE:
prolog
Copy code
outlier(syntax, TAXTABLE, TupleID, tuple-id, Value, "Should match ^t\d+$"):—
  TAXTABLE(TupleID, Value, _, _, _, _),
  not(match(Value, ^t\d+$").
outlier(syntax, TAXTABLE, TupleID, SSN, Value, "Should match ^\\d{3}-\\d{2}-\\d{4}$"):—
  TAXTABLE(TupleID, _, Value, _, _, _),
  not(match(Value, ^~\\d{3}-\\d{2}-\\d{4}$").
outlier(syntax, TAXTABLE, TupleID, State, Value, "Should match valid state abbreviation"):—
  TAXTABLE(TupleID, _, _, Value, _, _),
  not(match(Value,
    "^(AL|AK|AZ|AR|CA|CO|CT|DE|FL|GA|HI|ID|IL|IN|IA|KS|KY|LA|ME|MD|MA|MI|MN|MS|MO|MT|NE|NV|NH|NJ|NM|NY|NC|ND|OH|OK|OR|PA|RI|SC|SD|TN|TX|UT|VT|VA|WA|WV|WI|WY)$")).
outlier(syntax, TAXTABLE, TupleID, ZIP, Value, "Should match ^\\d{5}$"):—
  TAXTABLE(TupleID, _, _, _, Value, _),
  not(match(Value, "^\\d{5}$")).
outlier(range, TAXTABLE, TupleID, Salary, Value, "20000<=Salary <=500000"):—
  TAXTABLE(TupleID, _, _, _, Value, _),
  (Value <20000; Value >500000).
outlier(range, TAXTABLE, TupleID, TaxRate, Value, "0<=TaxRate <=0.5"):—
  TAXTABLE(TupleID, _, _, _, _, Value),
  (Value <0; Value >0.5).
outlier(syntax, TAXTABLE, TupleID, TaxRate, Value, "TaxRate should be a decimal number with up to 2 decimal places"):—
  TAXTABLE(TupleID, _, _, _, _, Value),
  not(match(Value, "^\\d*\\.?\\d{1,2}$")).
For TAX-EXEMPT:
prolog
Copy code
outlier(syntax, TAX-EXEMPT, TID, TID, Value, "Should match ^s\\d+$"):—
  TAX-EXEMPT (TID, Value, _),
  not(match(Value, "^s\\d+$")).
outlier(syntax, TAX-EXEMPT, TID, SSN, Value, "Should match ^\\d{3}-\\d{2}-\\d{4}$"):—
  TAX-EXEMPT(TID, _, Value),
  not(match(Value, "^\\d{3}-\\d{2}-\\d{4}$")).
These rules identify outliers based on both range and syntactic constraints for each attribute in the TAXTABLE and TAX-EXEMPT relations, ensuring data quality and consistency.
[End of Answer]
These rules are already very good and usable. That salaries ought to be in the interval [20000,500000] is commonsense that GPT4O has applied here and it may make sense in some applications, but not in others. In a variant embodiment, the system can be tuned to take only outliers with values that cannot appear at all, or, alternatively, that appear extremely rarely in real-life situations, say, in 0.0001% of real-life situations. This can be checked by prompts that, for example, ask whether a salary of this amount can appear at all, or whether it is larger than the salary of 0.0001% of individuals of the population.

In the following, and also in later sub-sections we will show how they can still be improved by CHAT2RULES.

Generation of resource-based attribute-value validators and/or constraints. For some attributes, real-life constraints on their possible values may go far beyond simple range restrictions or other syntactic constraints, or commonsense bounds. Just to give an example, there are many more rules for SSNs, for example, that no real-life SSN starts with 000 or with 666. What is yet more interesting is that there are Web-applications that check whether an SSN is valid that are not only based on syntax, but also on knowledge about which "batches" of SSNs have been used and which have been reserved for the future.

An advanced embodiment of CHAT2RULES can thus prompt an LLM to find such resources and create pre-defined predicates with programs attached that exploit these external resources when the rules are applied. Provided such an external resource exists, the prompt-answer can then identify a suitable Web-available SSN-validator (for example, https://www.ssnvalidator.com/) and create a new predicate valid (<SSN>) that, when calls with an SSN s executes, say, Python code, for validating s using this validator, and based on this, the LLM would generate a rule such as outlier (webservice, TAXTABLE, TupleID, SSN, Value, "https://www.ssnvalidator.com/"):—
    not valid (<SSN>).

This is just an illustrative example. The validator at the indicated URL does not work perfectly and cannot be used legally. It only can validate SSNs created until 2011 (still, if it says that an SSN is wrong then the SSN is effectively wrong, so it could be helpful at least), and it requires to be interrogated by a human and not by an API.

There are many other situations, where perfect and legally usable external resources can be used for validation, for example, dictionary look-ups price checks, and so on.

Template-based rule generation with help of LLMs. Assume a database such as the one above, or one similar to the one depicted in FIG. 9, is input to CHAT2RULES, and CHAT2RULES, maybe after some relation understanding prompting activities, prompts an LLM to find rules that enrich one of the relations, for example, the Competitors relation from the simplified FIG. 9 database, which has relations PRODUCTS(CompanyID,ProductID), SIMILAR (ProductID1,ProductID2), and COMPETITORS(CompanyID1,CompanyID2), If CHAT2RULES just prompts the LLM with "Please find rules that enrich the COMPETITOR relation with new tuples", it generates the following nice rule:

% Rule to infer new competitors based on similar products new_competitor(Company1,Company2):—
    PRODUCTS(Company1, Product1),
    PRODUCTS(Company2, Product2),
    SIMILAR(Product1, Product2),
    Company1\=Company2.

Given the little knowledge the database conveys (e.g. total absence of geographic information about where the companies operate), this is not bad. After all, this is expected to be just a rule candidate that will undergo further testing by CHAT2RULES before being admitted to the rule-base.

On the other hand, the result is rather poor and is testimony of a kind of "innate laziness" of LLMs to stop after having found one or a couple of satisfactory results unless told otherwise.

It can be observed that LLMs give more and better results when they are prompted and prodded to do so. They give even much better better and less simplistic results, if they get some specific hints of how the results ought to look like, for example, via rule patterns.

In the currently described embodiment, CHAT2RULES prompts an LLM to generate rules for each combination of up to k relational atoms, for a suitable number k (e.g. k=7) plus, possibly some inequality or comparison atoms such as '<','>',≤, or ≥ atoms that the LLM will add itself, where two or more atoms may have the same predicate (i.e., refer to tuples of the same data relation). Enumerating all sets of templates of up to, for example, 7 database-predicate atoms that may appear in a rule body with variables that may or may not been shared between argument positions would lead to a combinatorial explosion of prompts. Moreover, this enumeration task is also too complex for being carried out in a single prompt. Therefore, CHAT2RULES performs a compromise: it computes each bag (i,e, an unordered set where an element may occur more than once) of up to k elements (i.e., relation names, excluding some relations such as ≠ or comparison operators), where each relation name occurs at most three times, because constraints where a relation occurs more than 3 times are unusual. This is combinatorially feasible, and gives the LLM good help. We observed that with such a hint, an LLM can easily figure out which joins to consider and can derive a host of relevant rules. The LLM is prompted with each bag, and asked to construct rules for each bag. For example, for the above simplified PRODUCTS-COMPANIES-COMPETITORS database, the prompt generated by CHAT2RULES for the bag {COMPETITOR(2), SIMILAR(2), PRODUCTS(3)} looks as follows:

Assume relations PRODUCTS(CompanyID,ProductID), SIMILAR(ProductID1,ProductID2), and COMPETITORS(CompanyID1,CompanyID2) as explained before. Generate rules that enrich the COMPETITORS relation and have two competitor atoms, two SIMILAR atoms and three PRODUCTS atoms in their body, and no other database predicate atoms, plus possibly some comparison atoms with comparison predicate ≠, <, >, ≤, and ≥, and some negated atoms. By re-examining most carefully each rule, please suppress the repetition of a rule and also suppress any generated rule that is recognized to be equivalent to an earlier generated rule.

The answer contains the following two rules:

new_competitor (Company1, Company3):—
    PRODUCTS(Company1, ProductA),
    PRODUCTS(Company2, ProductB),
    PRODUCTS(Company3, ProductC),
    SIMILAR(ProductA, ProductB),
    SIMILAR(ProductB, ProductC),
    COMPETITORS(Company1, Company2),
    COMPETITORS(Company2, Company3),
    Company1 \=Company3,
    \+ COMPETITORS(Company1, Company3).

new_competitor (Company1, Company3):—
    PRODUCTS(Company1, ProductA),
    PRODUCTS(Company2, ProductB),
    PRODUCTS(Company3, ProductC),
    SIMILAR(ProductA, ProductC),
    SIMILAR(ProductB, ProductC),
    COMPETITORS(Company1, Company2),
    COMPETITORS(Company2, Company3),
    Company1 \=Company3,
    \+COMPETITORS(Company1, Company3).

Here, "\+" denotes negation, i.e., the logical "not".

These are most interesting Prolog rules that infer new competitors based on transitive competition and product similarity. They are not equivalent because of the different patterns of product similarity. Probably the second rule is slightly better in practice, because it guarantees that the new companies have directly similar products. However both rules are very good and humans would most likely not have caught the subtle difference and would have generated only one of them.

Note also that the answer contains additional rules, each of which is equivalent to one of the two above rules. However, the equivalence is a semantic one that is due to the symmetry of the SIMILAR predicate, which was not taken into account. This can be redressed in (at least) two ways: (a) by instructing the LLM (via extra instruction prompts containing also examples) to handle symmetry, for example to teach it that if a relation R is symmetric, then the arguments of R-atoms should only appear in lexicographic order, and (b) by suitable post-processing, which will be done anyway as part of the activity "rule set evaluation and rule selection" to be described farther below.

There are a multitude of variants. Of course, the number 7 is not at all cast in stone, it is just an example. Any reasonably small fixed constant k can be used instead. Moreover the number can be varied dynamically, for example incremented if not enough rules were found.

The bag {COMPETITOR(2), SIMILAR(2), PRODUCTS(3)} that was used for generating these prompts is not a fully-fledged template, but could be called a pre-template. We refer to such specific pre-templates as "bag-templates". To become more expressive, we allow bag-templates to have a somewhat extended syntax:

(a) CHAT2RULES allow the enforcement of head predicate by adding "head: <predicate-name>" to it. Thus, the fact that, as in the previous prompt, CHAT2RULES is looking for a rule with head COMPETITORS, would be denoted by an element "head:COMPETITORS" in the bag, and the bag would thus be: {head:COMPETITORS, COMPETITOR(2), SIMILAR(2), PRODUCTS(3)}.

(b) CHAT2RULES usually does not require the specification of comparison operators $\neq, <, >, \leq$, and $\geq$. There is thus no limitation on the use of such operators, and it is assumed that the LLM will use them reasonably. However, sometimes, especially with predicates with numerical attributes, it is appropriate to prescribe or limit the use of comparison operators. The extended syntax allows this. For example, "<(2)" in a bag means that "<" must occur exactly twice in the rule body, "<(0)" forbids the occurrence of "<" in rule bodies, and "head:<" requires that the head of a rule be a "<"-atom. The equality operator "=" is normally forbidden in bag-templates and shall by default not appear in bodies of generated rules to avoid combinatorial blow-ups and high redundancy. However, it may appear in rule heads ("head:=") and may be explicitly allowed to appear in rule bodies (e.g., "=(3)").

(c) A head specification in a bag may also contain the additional indication that in certain argument positions new "existential" variables may be placed. For example, "head:COMPETITORS(_,*)" signals that a new competitor atom ought to be generated, whose second attribute value is an "existential" variable, i.e., one that does not appear in the rule body.

With or without the help of these extensions and appropriate prompting, many useful rules may be generated. We show some examples.

Based on the bag-template {head:PRODUCTS(_,*), COMPETITORS(1)}, the following TGD will be automatically generated:

PRODUCTS(X,Z):—COMPETITORS(X,Y).

This expresses the inclusion dependency COMPETITORS[companyID1]⊆PRODUCTS[companyID]. Based on the bag-template {head:SIMILAR,SIMILAR(1)}, the symmetry rule SIMILAR(X,Y):—SIMILAR(Y,X) will be automatically generated.

Based on the bag-template {head:SIMILAR,SIMILAR(2)}, the transitivity rule SIMILAR(X,Z):—SIMILAR(Y,X), SIMILAR(X,Z) will be automatically generated.

Based on the bag-template {head:$\leq$,TAXTABLE(2).$\geq$(2)}, among various rules, the interesting rule
Taxrate1$\leq$Taxrate2:—
TAXTABLE(_, SSN1,State, _,Salary1,TaxRate1),
TAXTABLE(_, SSN2,State, _,Salary2, TaxRate2),
Salary1$\leq$Salary2.

This is an interesting monotonicity constraint, essentially expressing that, in the same state, higher salaries imply higher tax rates. Note that this constraint is not totally correct, see, for example, tuples t1 and t5681 of the relation TAXTABLE for a violation. It will be explained later, how this approximately correct constraint can be automatically improved to a 100% correct one.

Direct rule generation by LLMs of classical data dependencies The classical concepts of functional dependencies, inclusion dependencies, and so on, are well-known to advanced LLMs. CHAT2RULES can directly ask an LLM to recognize such dependencies and output them in a desired format, e.g., as Prolog rules.

Via instruction prompts, CHAT2RULES can teach the LLM how to deal with some more refined dependency classes such as conditional functional dependencies.

This direct prompting for dependencies can be done in addition to the above-described bag-template prompting.

Activity of rule testing. CHAT2RULES tests all or selected rules against one or more databases, and for each such database computes for each tested rule its support and confidence.

For very large databases D, CHAT2RULES may chose to—at least initially—test rules against one or more MNSDBs for D, rather than against D itself.

When a rules' support is greater than zero but its confidence is different from 1, a number of positive application examples ("positive examples") and a number of counterexamples are computed and retained, for example, in form of minimal sets of atoms from the test database that, in case of positive examples make the rule true via some substitution θ or, in case of negative examples, where θ(body) true and θ(head) false for some substitution θ. (The substitution may optionally also be part of the example).

For very large databases D, the testing strategy in the currently described CHAT2RULES example scenario is as follows: After generation of a rule, or in the early phase of rule generation, "light testing" using one or more MNSDBs is performed. In a later phase, when the overall candidate rule set has already been reduced and because of light testing and rule-quality prompting, and when possibly some rules have already been refined, then "heavy testing", i.e., testing against the very large database D is performed.

CHAT2RULES then automatically associates with each rule one SQL queries that compute the support and confidence of the rule w.r.t. D, and that provide examples and counterexamples where appropriate. In some variants of this scenario, these SQL queries are computed from the rule and the database schema by a proper algorithm, while in other variants, the SQL queries and counterexamples can also be obtained via LLM prompting. In yet other scenarios, a mixed approach is taken: the SQL queries are computed in one way and the examples/counterexamples in another way. Activity of Rule Refinement and Rule Candidate Selection.

A general principle for rule testing and refinement of this CHAT2RULES scenario is as follows.

If a rule, after testing, has a support below a given support threshold, then the rule is rejected.
If a rule has a support above a given support threshold, then
if the rule is used as a constraint and its confidence is 1, then retain it as final,
if the rule is used as a constraint and its confidence is <1 but above a "refine"-threshold, the rule is scheduled for refinement, otherwise it is rejected,
if the rule is a TGD that ought to add atoms to the database, then keep it for further testing, possible refinement, and possible acceptance.

For constraints scheduled for refinement, one way of refinement attempted and/or performed by CHAT2RULES is as follows. By inspecting and analyzing the examples and counterexamples that were provided together with the rule testing, CHAT2RULES tries to automatically understand, with help of an LLM, whether some additional properties to be required for the body atoms could be used to improve the confidence, more concretely, if a new positive or negated atom, referred-to as "improvement literal", can be found, whose insertion into the rule body may improve the rule confidence, and then refine the rule by inserting the improvement atom, and, where appropriate, submit it for further testing. Moreover, try to cast an appropriate new rule whose body consists of the old rule body in conjunction with the oppositely signed improvement atom. If such a new rule with an acceptable confidence can be found, then accept it as a candidate rule and submit it for further testing. Take, as an example, the previously generated rule Taxrate1≤Taxrate2:—
TAXTABLE(_, SSN1,State, _,Salary1,TaxRate1),
TAXTABLE(_, SSN2, State, _,Salary2,TaxRate2),
Salary1≤Salary2.

This rule, while having high confidence, does not have confidence 1 because of counterexamples due to tax-exempt individuals whose tax rate is always zero.

When an LLM, after having analyzed the Tax Office database, is automatically prompted by CHAT2RULES the rule, some examples and counterexamples, and is appropriately asked to proceed according to the above-described refinement principle, it refines the rule by splitting it into the following two rules:

Taxrate1≤Taxrate2:—
TAXTABLE(_, SSN1,State, _,Salary1,TaxRate1),
TAXTABLE(_, SSN2,State, _,Salary2,TaxRate2),
Salary1≤Salary2
\+ TAX-EXEMPT(_, SSN2,_).
TAXTABLE(TID,SSN,State, ZIP,Salary,0):—
TAXTABLE(TID, SSN,State,ZIP,Salary, TaxRate),
TAX-EXEMPT (_, SSN,_).

Note that these rules now have both confidence 1.

This was only one example of rule improvement via LLM. Many other rule improvement strategies can be integrated into CHAT2RULES and executed by kelp of one or more LLMs.

Activity of Rule Set Testing and Final Rule Selection.

Once a set of candidate rules has been found, the rules are compared to each other, and rules that are redundant by themselves or recognized to be subsumed by subsumed other rules are eliminated. In case there are too many rules left, the top k rules according to some predefined score that takes into account both support and confidence are finally output.

Activity of Orchestration of Rule Generation and Application.

The entire rule generation process is orchestrated by CHAT2RULES via a mini-controller that invokes the single activities in an appropriate order, applies the final rules, and (in case the database has significantly changed and new rules may arise) repeats the process a number of times.

This concludes the description of the first example scenario of CHAT2RULES.

CHAT2RULES: Second example scenario The second example scenario presented throughout this introduction of CHAT2RULES focuses on how CHAT2RULES works for the task of data verification, specifically generating error detection rules for finding data errors. However, the workflow described can be readily adapted to other database curation tasks. This example demonstrates the automatic generation of rules by CHAT2RULES for detecting data errors in the "TAXTABLE" data relation in Table 2.

Step 1: Relation Understanding As previously introduced, the main system CHAT2DATA may conduct a relation understanding of the input relations before the CHAT2RULES component is triggered to perform a particular database curation task. The results of this process are directly utilized by CHAT2RULES. If these results are not available, CHAT2RULES independently performs the relation understanding process.

Through this Relation Understanding step, CHAT2RULES gains a comprehensive understanding of the input table's structure and content. This includes acquiring the table names, a detailed description of the tables, and a clear definition for each column. For instance, for the table shown in Table 2, CHAT2RULES discerns the following details:

An improved table name: Table of taxpayers' information. This improved table name is clearer than the original name "TAXTABLE".
Table Description: This table stores information of taxpayers, enumerating essential details such as their social security number (SSN), their current US state of tax residence (State) and the ZIP code (ZIP), their salary (Salary), and their tax rate (TaxRate).
Columns:
tuple-id: Serves as a unique identifier for each tuple.
SSN: The Social Security Number (SSN) of each taxpayer.
State: Indicates the state in which the individual resides or is employed.
ZIP: ZIP code associated with the individual's location.
Salary: Annual salary of the individual, typically expressed in dollars.
TaxRate: Applicable tax rate, expressed as a percentage.

Step 2: Generation of Candidate Rules Based on the understanding of the input data, CHAT2RULES advances to the Generation of Candidate Rules. CHAT2RULES presents an LLM with a comprehensive understanding of the input data, which has been previously generated in the Relation Understanding step. Optionally, it may also include sampled tuples from the input relation to facilitate the candidate rule generation process. Various embodiments of CHAT2RULES may utilize different sampling strategies, ranging from simple random sampling to more sophisticated informative sampling techniques. One example sampling method is described as follows:

Graph-based Informative Sampling—CHAT2RULES constructs a graph from the input data, where each vertex represents a tuple from the input data. An edge is established between two vertices (i.e., a pair of tuples) if the tuples exhibit identical or similar values in a specific column. Subsequently, CHAT2RULES performs a random walk of up to l steps (where l is a predefined limit) on this graph to generate a sampled dataset. This approach helps in selecting data points that are potentially more informative for rule generation.

In some embodiments, CHAT2RULES generates multiple sample datasets by using either a consistent sampling strategy or various sampling methods. The candidate rule generation process is then conducted separately for each sampled dataset. The resultant sets of candidate rules are subsequently processed to enhance their utility and relevance. This processing may include aggregating the rule sets together or selecting rules based on their frequency of occurrence across the various candidate rule sets. Such methodologies ensure that the most effective and commonly applicable rules are retained for further use.

In this example, candidate rules are constructed based on: (i) the correlation between columns, and (ii) dependencies across clusters of correlated columns. Traditionally, uncovering these dependencies was a task for human experts or rule learning algorithms. CHAT2RULES innovatively employs an LLM's domain knowledge for this purpose.

Initially, CHAT2RULES uses a Column Correlation Discovery Prompt (C2DP) to instruct the LLM to examine the correlations between various columns in the input table and to form clusters of correlated columns. An example C2DP prompt template is:

The input table has a name of [Table Name]. It is described as follows: [Table Description]. It contains these columns: [Column Names and Descriptions]. Some sample data are: [Sample Data]. Analyze relationships between columns and organize them into logical groups based on their relatedness.

For instance, from Table 2, the LLM may generate clusters such as {Tuple-ID} (a single-column cluster), {State, ZIP}, and {Salary, TaxRate}.

Next, CHAT2RULES employs a Column-Cluster Correlation Discovery Prompt (C3DP) to explore the dependencies between these clusters. An example C3DP template is:

Identify relationships between the following column clusters [Column Clusters] based on their data characteristics. Some sample data are: [Sample Data].

Through a C3DP prompt, CHAT2RULES discovers, for example, that the {State, ZIP} cluster impacts the {Salary, TaxRate} cluster due to regional variations in tax policies and economic conditions.

Note that, although most of these discovered correlations make sense, some results are not entirely accurate. For instance, the cluster {Salary, TaxRate} suggesting that Salary directly affects TaxRate is not fully accurate, as there can be Tax Exemptions. This inaccuracy will be further addressed by CHAT2RULES in subsequent steps.

Next, CHAT2RULES issues Rule Generation Prompts (RGPs) to ask the LLM to generate rules with a particular format, such as Denial Constraint Rules. These rules should account for both intra-cluster and inter-cluster dependencies identified within and among the column clusters. An example RGP prompt template is:

Generate Denial Constraint Rules that account for intra-cluster and inter-cluster dependencies identified among the column clusters: [Column Clusters]. Intra-cluster column correlations are: [Column Correlations]. Inter-cluster correlations are: [Column Cluster Correlations]. Some sample data are: [Sample Data].

For example, the following candidate rules are proposed by the LLM for Table 2:

For any two tuples $t_i$ and $t_j$ ($i \neq j$),
it is not possible that: $t_i.\text{ZIP}=t_j.\text{ZIP}$ and $t_i.\text{State} \neq t_j.\text{State}$ (CR1).
it is not possible that: $t_i.\text{Salary}>t_j.\text{Salary}$ and $t_i.\text{TaxRate}<t_j.\text{TaxRate}$ (CR2).
it is not possible that: $t_i.\text{State}=t_j.\text{State}$ and $t_i.\text{Salary}>t_j.\text{Salary}$ and $t_i.\text{TaxRate}<t_j.\text{TaxRate}$ (CR3).

In some examples where denial rules are directly used for logical reasoning, they are expressed as logical rules in a Prolog-like or Datalog-like formalism. Various examples in the present disclosure may adopt different forms of rules.

These rules are generated by considering dependencies within individual columns (e.g., CR1 and CR2) as well as between clusters of columns (e.g., CR3). However, it is important to note that not all proposed candidate rules are accurate. For example, CR2 overlooks several additional factors that may influence the relationship between a taxpayer's salary and tax rate, such as regional variations. Although CR3 correctly identifies the influence of regional factors, it is still not sufficiently accurate, as will be discussed further below.

The process previously described serves as one exemplary method for generating candidate rules within CHAT2RULES. However, various embodiments of the present disclosure may employ different candidate rule generation techniques, including those rule learning algorithms that are well-documented in the literature.

Manual Generation of Candidate Rules Additionally, CHAT2RULES provides the capability for users to manually specify candidate rules. This feature allows users to contribute rules based on their expertise or hypotheses. CHAT2RULES can then evaluate these rules and refine them if necessary in the next step. In some embodiments, this manual candidate rule generation can serve as a standalone method for generating candidate rules, or replace the automated rule generation process described above.

Some embodiments may incorporate a filtering process to eliminate certain candidate rules before progressing to the subsequent step. For instance, appropriate metrics, such as support and confidence-which are well-defined in existing literature may be employed to detect and discard clearly incorrect rules, if their support or confidence are below some predefined threshold.

Step 3. Rule Evaluation and Rule Refinement
3.1. Collection of Counterexamples:

CHAT2RULES applies each candidate rule to either a sample dataset—selected using the previously discussed sampling methods—or in some other embodiments, to the entire input dataset, to identify counterexamples of the rule, i.e., data that violate the rule. Some embodiments may apply each rule to multiple sample datasets, and all found counterexamples are collected. For instance, the tuple pair (t1,t3) acts as a counterexample for the rule CR2 applied to Table 2, given that t3.Salary>t1.Salary yet t3.TaxRate<t1.TaxRate. Counterexamples of CR3 include (t5681,t1), among others. In these cases, the taxpayer in record t5681 has a TaxRate of 0.0 but a salary higher than some other taxpayers in the same state as t5681, who have a TaxRate greater than 0, such as the tax payer represented by tuple t1. These counterexamples will be further utilized in the Rule Refinement process.

In some simpler embodiments, some metrics are applied to decide if a rule should be directly eliminated without entering the Rule Fixture process, such as discarding a rule if the number of its counterexamples exceeds a predefined threshold.

In some embodiments, in addition to the process described above, an LLM may be used to generate counterexamples for a rule using a Counterexample Generation Prompt (CGP). An example CGP template is:

A candidate error detection rule: [candidate rule] has been generated for detecting errors in an input relation named [Table Name], described as [Table Description], containing columns [Column Names and Descriptions].

If you believe this rule is inaccurate, please generate [k, a predefined number] counterexamples that violate this rule. Note that these counterexamples should be valid records and not data errors themselves.

3.2 Review of Counterexamples:

Following the identification of counterexamples of each candidate rule, CHAT2RULES presents the original candidate rule along with some of its counterexamples to an LLM via Counterexample Review Prompts (CRPs) to solicit further review. This review process evaluates whether all the counterexamples represent data errors or if some of these counterexamples are valid (not data errors) or could be valid under some circumstances, indicating that the candidate rule is inaccurate and requires refinement.

An example CRP template is as follows:

A candidate error detection rule: [candidate rule] has been generated for detecting errors in an input relation named [Table Name], described as [Table Description], containing columns [Column Names and Descriptions].

Some counterexamples detected by applying this rule are: [counterexamples]. These counterexamples violate this rule. If this rule is accurate, then these counterexamples are data errors detected by this rule.

However, due to the possibility that this rule may be inaccurate, these counterexamples might not be actual data errors. Please review the rule and counterexamples. Apply your domain knowledge related to this input relation.

Please identify which counterexamples are actually correct, or could be correct under certain circumstances, and return these counterexamples along with appropriate explanations.

If no such counterexamples exist, return None.

All counterexamples of a candidate rule are presented together with the rule in a CRP sent to the LLM, provided the total length of the prompt does not exceed the LLM's context length. If the context length is exceeded, the counterexamples are split into multiple subsets, ensuring that these examples are included within the context length limitations. Multiple CRPs are issued, each carrying a subset of counterexamples.

A rule that receives responses of 'None' for all CRPs issued for this rule is considered to be a correct rule. Counterexamples returned by CRPs used for checking all counterexamples of a rule are called the rule's valid counterexamples. These valid counterexamples indicate that the rule should be further improved. Rules with a non-empty set of valid counterexamples are stored in an erroneous-rule set and are passed to the Rule Refinement step.

For example, CR2 and CR3 are added to the erroneous-rule set, each associated with its valid counterexamples. For instance, CR3 is associated with valid counterexamples such as (t5681,t1), with an explanation as follows:

This rule:

"it is not possible that: ti.State=tj.State and ti.Salary>tj.Salary and ti.TaxRate<tj.TaxRate"

states that if two taxpayers live in the same state, it is not possible for one to have a higher salary than the other but has a lower tax rate.

However, this is not always true.

The counterexample consisting of the following two tuples:

(tuple-id: t1, SSN: 666-03-8452, State: CA, ZIP: 90001, Salary: 85,000, TaxRate: 0.22)

(tuple-id: t5681, SSN: 666-00-8903, State: CA, ZIP: 94304, Salary: 120,000, TaxRate: 0.0)

can still be valid under certain circumstances.

For instance, the taxpayer corresponding to the second tuple may be qualified for a tax exemption in the state the taxpayer lives in.

3.3 Rule Refinement:

For each erroneous rule in the erroneous-rule set, CHAT2RULES runs the Rule Refinement process to refine the erroneous rule based on its valid counterexamples and the corresponding explanations generated in the previous process.

In this Rule Refinement step, CHAT2RULES also considers other relations linked with the input relation, if such relations are available. These related relations may exist in the same database as the input relation and are linked via key-based connections or by using common attributes. For instance, the data relation "TAX-EXEMPT" (Table 3) is linked with the input relation "TAXTABLE" (Table 2) via the common use of taxpayers' SSN information. Such relations may provide additional information to the input relation and are referred to as associated relations in this section.

CHAT2RULES retrieves relevant information, i.e., relevant tuples, for each counterexample from associated relations. These tuples, retrieved from associated relations for a tuple in the input relation, are called associated tuples.

For example, the tuple with the tuple-id of t6581 has an associated tuple with TID of s3 retrieved from the TAX-EXEMPT relation. This indicates that the taxpayer with the SSN of 666-00-8903 actually pays tax in another country, Switzerland, and thus has a tax exemption in the US. Note that not all tuples in the input relation have associated tuples in other relations. For instance, the tuple with tuple-id of t1 in the TAXTABLE relation has no associated tuple in the TAX-EXEMPT relation.

Then, CHAT2RULES requests the LLM to propose improvements to the erroneous rule. For instance, the following Rule Revision Suggestion Prompt (RRSP) template is used to generate a prompt for refining an erroneous rule (such as CR3):

A candidate error detection rule: [candidate rule] has been generated for detecting errors in an input relation named [Table Name], described as [Table Description], containing columns [Column Names and Descriptions].

Some counterexamples detected by applying this rule violate the rule but are considered valid or could be valid under certain circumstances.

These counterexamples are: [representation of counterexamples and their associated tuples]

Please consider all this information and suggest refinements to the original rule.

The placeholder [representation of counterexamples and their associated tuples] should be replaced by content generated using the following template for each counterexample. These representations should then be compiled together:

Counterexample: [valid counterexample]

Explanation of this valid counterexample: [explanation associated with this valid counterexample]

Additionally, relevant information retrieved from other relations for this counterexample is: [associated tuples]

In this template, the placeholder [associated tuples] should be replaced by concrete representations of the associated tuples of the counterexample. This representation includes the information of the relation the associated tuples are from and the details of the tuples themselves.

For example, the LLM might suggest a revised rule R3* in response to a RRSP for improving R3:

R3*: It is not possible that:
    TAXTABLE.ti.SSN not in TAX-EXEMPT.SSN
    and TAXTABLE.tj.SSN not in TAX-EXEMPT.SSN
    and TAXTABLE.ti.State=TAXTABLE.tj.State
    and TAXTABLE.ti.Salary>TAXTABLE.tj.Salary
    and TAXTABLE.ti.TaxRate<TAXTABLE.tj.TaxRate.

Compared to R3, R3* includes an additional restriction that the original R3 only applies when both taxpayers do not have a tax exemption. This modification makes R3 more accurate. However, R3* may still not be sufficiently accurate, as there are other factors affecting the relationship between salary and tax rate.

Note that a single RRSP issued for improving an erroneous rule can lead to several new rules, as the LLM may make multiple suggestions in response to the same RRSP. These new rules derived from improving an erroneous rule r, is recorded in a improved rule set, denoted as $\mathcal{R}^*(r)$. Note that $\mathcal{R}^*(r)$ does not contain r, but only includes the rules derived from the refinement process of r.

3.4 Iterative Refinement

After an erroneous rule r is improved, new versions of this rule are generated and stored in $\mathcal{R}^*(r)$. These new rules then become new candidate rules for further evaluations and refinements, potentially leading to additional candidate rules. This iterative process of evaluation and refinement continues, with CHAT2RULES tracking the generation of new rules via a tree structure, denoted as T(r). In this tree, the root is r, and all rules generated in the process of refining a rule A are child nodes of A.

For example, after improving r, each rule r* in $\mathcal{R}^*(r)$ is also in T(r) with a link r→r*, indicating that r* has been generated in the refinement process of r. The parent node is r', and the child node is the new rule r*.

A single round of iteration works for all rules currently stored in $\mathcal{R}^*(r)$. CHAT2RULES first executes the Collection of Counterexamples and Review of Counterexamples for each rule in $\mathcal{R}^*(r)$. Rules that have no valid counterexamples after the Review of Counterexamples step are considered correct and are moved from $\mathcal{R}^*(r)$ to the result rule set. Then, the Rule Refinement process is triggered for each remaining rule in $\mathcal{R}^*(r)$. Each rule undergoing the Rule Refinement process is removed from $\mathcal{R}^*(r)$. All new rules generated in this process, if not already contained in T(r), are then added to $\mathcal{R}^*(r)$.

This iterative refinement continues until $\mathcal{R}^*(r)$ becomes empty or other termination criteria are met, such as reaching a fixed number of iterations. Different embodiments may adopt various termination criteria.

Step 4: Rule Explanation and Execution

Following Step 3, CHAT2RULES finalizes and returns the generated correct rules for user's application in other environments. Each rule is accompanied by an explanation generated by an LLM. Additionally, CHAT2RULES is capable of executing these rules. For instance, in data verification scenarios, CHAT2RULES applies the generated rules on the input data to identify potential data errors. Each detected error is linked to the specific rule that identified it, and, optionally, an explanation of the rule and why the error violates the rule in natural language is provided.

The description provided above of CHAT2RULES serves as an illustrative example to facilitate a further understanding of how CHAT2RULES generates and applies rules for various database curation tasks. However, it is important to note that different embodiments of the current disclosure may feature varying designs and implementations of CHAT2RULES. For example, in some embodiments, CHAT2RULES utilizes associated relations in Step 2, the Generation of Candidate Rules step. When using an LLM to generate candidate rules for an input relation, CHAT2RULES also provides the LLM with information about the associated relations. This allows the LLM to have a more comprehensive view of the input relation.

Expanded Definition of Large Language Model (LLM)

A Large Language Model (LLM) in its original definition means a type of artificial intelligence model that is designed to understand and generate human-like text based on vast amounts of training data. LLMs are trained on diverse datasets, enabling them to perform a wide range of language tasks, such as translation, summarization, question answering, and text generation. They leverage deep learning techniques and extensive neural network architectures to process and produce coherent and contextually relevant language outputs. Prominent examples of LLMs include models such as OpenAI's GPT (Generative Pre-trained Transformer) and Google's BERT (Bidirectional Encoder Representations from Transformers). A prompt in the context of LLMs refers to the initial input or query given to the model to guide its text generation process.

In the present description, the phrase "LLM" is generalized to include both the original definition and any programs or models derived from an LLM. This includes:

(a) a smaller model that achieves the same or similar results as an LLM for a particular process, for example, a smaller model derived from the knowledge of an LLM, which is usually created through techniques such as model distillation, or trained using a synthetic dataset produced by an LLM;

(b) a program that is manually generated, or automatically generated based on the knowledge of an LLM to perform a particular task, for example, a Python program generated by an LLM to perform a data extraction task; and (c) any other models or programs derived from an LLM.

This means, any descriptions of processes using LLMs can be extendable to using the above-listed models or programs as alternatives to the original LLM. Various embodiments of the present disclosure may adopt these programs or models derived from LLMs in various processes.

Equipping the Employed LLM with the Necessary Domain Knowledge

Certain processes in CHAT2DATA, such as the automatic rule generation or learning process, rely on the premise that the employed LLMs have the necessary domain knowledge pertinent to the input relation. To confirm this before triggering the data curation tasks, CHAT2RULES issues a prompt asking the employed LLM whether it has necessary domain knowledge. If the employed LLM does not have necessary domain knowledge, the employed LLMs should be properly equipped with the necessary domain knowledge. This can be achieved in various methods comprising: (a) fine-tuning, which adapts the LLM to a specific domain by training on a curated domain-specific dataset, (b) Retrieval Augmented Generation (RAG), which enhances the LLM by retrieving necessary domain-specific knowledge from a knowledge base or other sources. This retrieved knowledge is relevant to the task to be performed by the LLM, and this knowledge is incorporated into the prompts used for this task, (c) long-context based learning, which leverages the LLM's ability to process long contexts by including the necessary domain knowledge directly within the input context, allowing the model to utilize this information effectively, and other methods.

Harnessing Multiple LLMs

In some embodiments that implement the current disclosure, multiple LLMs are harnessed. These LLMs can encompass: 1. Open-source LLMs or proprietary LLMs developed by the organization implementing the current disclosure, deployed within a specific environment accessible by the running instance of CHAT2DATA. 2. Non-open-source LLMs that can be accessed through API calls or interfaces. These LLMs can be utilized directly or subjected to fine-tuning or supervision through prompts prior to their usage.

In certain embodiments, the choice of LLMs for a specific task is pre-configured by a human operator of the system. In other embodiments, the system dynamically determines the appropriate LLM to be used for a particular sub-task during runtime, given a set of available LLMs. For instance, when generating up-to-date data that requires fetching the latest information from the Web, an LLM capable of accessing online sources like Bing Chat might be selected. On the other hand, if a task heavily relies on domain-specific knowledge, such as determining the relationship between competing healthcare companies based on important aspects, an LLM fine-tuned with a dataset of competitor pairs in the healthcare domain would be preferred. Moreover, the system may take into account the volume of prompts sent to LLMs. In scenarios like complex smart interrogations (as described in the "Complex Smart Interrogations" section), local LLMs might be favored over remote ones when there is a relatively large number of prompts. Other factors, including the features, advantages, and weaknesses of different LLMs, can also influence the decision of the LLM selection. For example, when generating a web data extraction program, a coding-savvy LLM could be utilized. These examples illustrate how decisions regarding LLM selection can be made. However, different embodiments may employ diverse approaches in choosing LLMs. The methods described in the sections titled "Knowledge-based Dynamic Decision Making at Runtime" and "Other Implementations of Dynamic Decision Making at Runtime" provide further insight into the realization of such decision-making processes.

In certain embodiments, multiple LLMs can receive the same prompt, and their respective responses are appropriately utilized. For instance, when generating a list of candidate competitors for a company, prompts requesting LLMs to generate potential competitors may be sent to several different LLMs. The system then aggregates the generated results into a list, and the candidates that occur more frequently in the list are deemed more likely to be correct. Additionally, in some embodiments, a scoring method that takes into account the answers provided by different LLMs may be employed. This scoring method allows for a more comprehensive evaluation and comparison of the responses generated by the various LLMs. By considering the input from multiple LLMs, the system can derive a more reliable and accurate outcome.

Various Score Generation and Aggregation Methods

In various embodiments of the current disclosure, confidence scores, also called confidence values, are computed together with computed candidate results (such as candidate competitors) comprising candidates for insertions, deletions, or updates. A confidence score expresses a degree of confidence about a corresponding candidate result, and the candidate result gives rise to an effective result only if a corresponding confidence score is in a pre-determined interval of values. The computation of confidence scores comprises one or a combination or aggregation of two or more of:

(i) using pre-determined scores attached to prompt-types and a method of aggregating scores over the sequence of prompts. For example, in some embodiments, candidates generated by the dig-in prompt may receive a predetermined initial score of 0.8, while those generated by the candidate generation prompt receive a predetermined initial score of 1. This is because candidates generated by dig-in prompts are not considered first choices by the LLM. These initial scores are then aggregated with other scores to form the final confidence scores.

(ii) obtaining scores by a statistical validation of a used database enrichment or curation method. For example, in some embodiments, before CHAT2DATA applies a data enrichment method to the entire input table, the method is first applied to a small portion of the table, such as a few focal entities. The generated data are then verified against a golden standard. This evaluation results in scores that reflect the confidence in the applied enrichment method.

(iii) obtaining scores by prompting, whereby a prompt or a part of a prompt asks for the explicit indication of a confidence score of a result. For example, prompts used in Mini-CHAT2DATA may additionally ask the LLM to specify its confidence in its response.

(iv) using a heuristics or rule of thumb for obtaining or aggregating scores. For example, in some embodiments, if any criterion-based score of a candidate is 0, then its aggregated score is also 0.

(v) aggregating scores using specific mathematical formulas, such as calculating the average.

(vi) aggregating scores according to logical formalisms comprising Multivalued Datalog (MV-Datalog), other types of fuzzy Logic or fuzzy logic programming, Markov Logic, Probabilistic Soft Logic, and Problog.

Other Specifications of Input Tasks

Generation of Input Data Relations

In the embodiment described in the section titled "An Example of CHAT2DATA", the input relation consists of a binary relation with two columns, wherein the column values are the actual values instead of identifiers or keys. In more complex implementations, the input relation comprises more than two columns. Also, in some cases, it becomes necessary to execute certain operations to retrieve the actual values for specific columns from the database. For instance, consider a Companies table with the columns {CompanyName, SICCode, Product}. Additionally, consider an 'Industry' table, with the SICCode (see https://en.wikipedia.org/wiki/Standard_Industrial_Classification) as the primary key, along with an 'IndustryName' column. In this scenario, assume that the input relation conveyed to CHAT2DATA is CompanyName, IndustryName, Product. To generate this input relation, some appropriate operations, such as a join operation between the 'Companies' and 'Industry' tables based on the SICCode, must be executed.

In certain embodiments, users might be provided with supplementary commands, enabling them to stipulate additional constraints for generating the input relation. For instance, in some embodiments, the user may define M criteria for selecting records that constitute the input relation, utilizing an extra command like @InputCriteria({Criterion; |i∈[1, M]}). For example, @InputCriteria({SIC-Code=6022}) narrows down the input relation to companies operating within the industry associated with the SIC code 6022.

In certain embodiments, CHAT2DATA identifies such these scenarios where necessary operations need to be performed to get the input data relation. It then asks the database administrator to execute the necessary operations. In alternate embodiments, where CHAT2DATA has complete access to all related data within the input database, CHAT2DATA autonomously carries out the appropriate operations to generate the input relation. In yet more complicated embodiments, a view or a staging table is established to accommodate the results of such database operations.

Although the above examples are described in the context of a relational database, for different types of databases, different operations are adopted to generate the input relation. For example, an operation of $lookup may be performed in a NoSQL database for such cases.

Task Specifications for Non-Binary Input Relations

In the embodiment described in the section titled "An Example of CHAT2DATA", the enrichment task is specified as @enrich(R,A,*B), which directs the system to find k: new B values for each A. In some other embodiments, the task may be specified as @enrich(PRODUCTS,*A,*B), which would tell CHAT2DATA that it should try to find new tuples <x,y>, where a is a (possibly new) A value, and y a the corresponding B value of x. Together with the @enrich command, a constant k: is fixed (for example, k=10) which limits the amount of new tuples to be added for each A-value: at most k tuples are to be added. Of course, for each A-value a of an existing tuple the goal is to find the best k appropriate B-values b such that (a, b) is a fitting new tuple to be inserted into the database (or the best k' tuples, in case only k'<k appropriate B-values can be found).

In more complex embodiments, instead of a fixed k: , a function may be used.

Also, in more complex embodiments, the enrichment task can be applied to non-binary relations represented by a relation R with a schema $(A_1, \ldots, A_n)$ having n attributes (corresponding to the n columns of R). These embodiments introduce a generalized format for the two types of commands (i.e. requests) mentioned earlier, as detailed further below. $\mathcal{A}$ and $\mathcal{B}$ denote two different subsets of columns within R. Notably, special cases of these commands (i.e., requests), where both $\mathcal{A}$ and $\mathcal{B}$ consist of only one column, are equivalent to the previously discussed commands.

Let VA be range over the tuples of the projection $\pi_A R$ of R to the attributes $\mathcal{A}$ and let $V_B$ range over the tuples of the projection $\pi_B R$ of R to the attributes $\mathcal{B}$. The generalized representation of enrichment commands are:

@enrich(R, $\mathcal{A}$ ,*$\mathcal{B}$ ): This command directs the system to find, for a given constant k, up to k new VB for each existing VA in R. For instance, consider the data relation PRODUCTS with columns {CompanyName, CompanyFounder, Industry, Country, Product, ReleaseDate}. Using the command @enrich (PRODUCTS, {CompanyName, Industry, Country}, *{Product, ReleaseDate}), the system is instructed to find k new tuples containing a product and its corresponding release date for each existing triple of values (N, I, C) in the input data relation, where N, I, and C represent values of CompanyName, Industry, and Country, respectively.

@enrich (R, *$\mathcal{A}$ , *$\mathcal{B}$ ): This command directs the system to find k new tuples of ($V_A$, $V_B$). Continuing with the aforementioned PRODUCTS data relation, the command @enrich (PRODUCTS, *{CompanyName, Country}, *{Industry, Product}) instructs the system to find k new tuples (VA, VB), where VA consists of a company name N and a country C in which this company has business, and VB consists of an industry to which the company's business in the country C belongs, and a product which the company sells for operating this business.

Correspondingly, in various embodiments, CHAT2DATA offers commands for executing various other types of database improvements. For example, these commands may include: @verify which allows users to specify a database verification task, @update which enables users to define a database update task, @replaceNull which allows users to define a null-value replacement task. The input parameters for these commands bear similarities to those of the previously discussed @enrich command.

In various embodiments, database curation tasks can be specified in different ways and with different contents. For example, if the input database to be curated is relational and each substructure on which a database curation task is to be performed is a single relation, each database curation request comprises at least one of the following:

(i) a request type specifying whether the database curation request is a database enrichment request, a database initialization request, a database verification request, a database update request, or a null-value replacement request, (ii) a name of a relation of the database, on which the requested task is to be carried-out, or which, in case of a database initialization request, is to be created from scratch, and, in case of an enrichment request, an update request, a null-value replacement request, or a verification request, the designation of a set of target attributes of the relation to be curated, and other attributes of the relation being fixed attributes, where (a) in case of an enrichment request, the target attributes are enriched with new values or new combinations of values, giving rise to new tuples that extend the projections of existing tuples over the fixed attributes, and (b) in case of an update request, only attribute-values in target attribute columns are updated, and (c) in case of a null-value replacement request, only null-values occurring in target attribute columns are replaced by concrete values, and (d) in case of a verification request, all attributes are fixed, and no attribute is a target attribute, and correctness of the entire tuple is checked, (iii) in case of a database initialization request, sufficient metadata for defining the structure and intended semantics of a relation to be created from scratch, the metadata comprising one or more of:

(i) a designation and/or a description of the set of attributes of a relation to be created from scratch, and (ii) a description of the intended semantics of the relation to be created from scratch.

Figure 11:
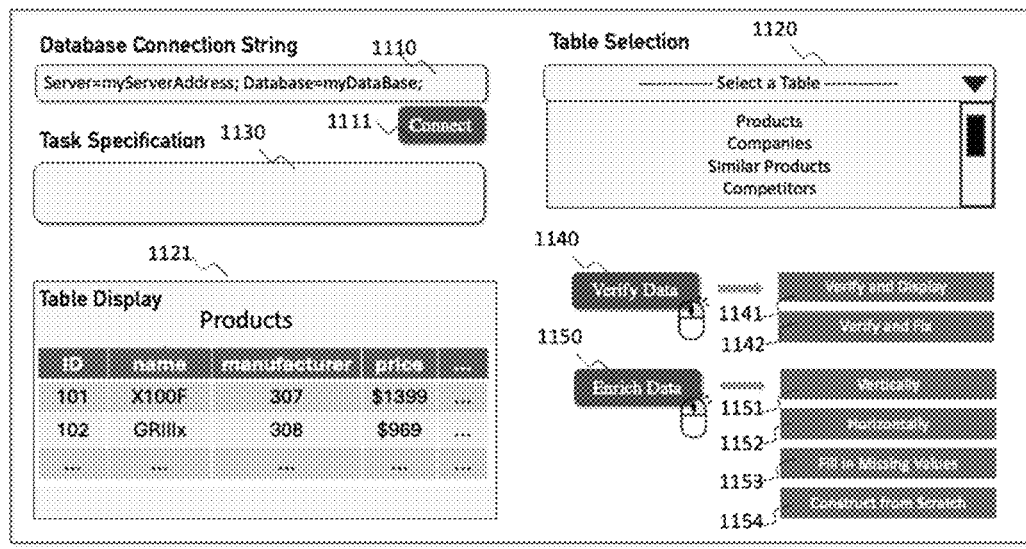
FIG. 11 depicts an example user interface that allows a user to specify and trigger database curation tasks according to an example of the instant disclosure.

Also, in various embodiments, task requirements can be expressed in different forms not necessarily restricted to the commands described above. This is entirely dependent on the preferred programming language and the specific implementation environment. For instance, these tasks can be specified via a user interface. FIG. 11 displays an example of a user interface for a user to specify the database curation task. With this interface, a user can specify how to connect with the input database, such as specifying the connection string in the input field 1110, and clicking on the Connect button 1111. The connected database is loaded by the CHAT2DATA system, and then the names of tables contained in this database are displayed in the Table Selection dropdown box 1120. The user can select the table for which a database curation task should be performed. This selected table, such as the Products table, is displayed in the Table Display 1121 area. Users can also specify additional requirements using natural language in the Task Specification box 1130. The user can trigger a particular type of database curation task by clicking on buttons provided on the user interface. For instance, clicking directly on the 'Verify Data' button 1140 or the 'Enrich Data' button 1150 initiates a comprehensive data verification or enrichment process, respectively. Additionally, users can right-click on these buttons to view further options. For example, right-clicking on the 'Verify Data' button 1140 might show options like 'Verify and Display' 1141, which means the system will display the detected errors to the user, or 'Verify and Fix' 1142, which means the system will suggest possible fixes for the detected errors. Right-clicking on the 'Enrich Data' button 1150 might reveal options such as 'Vertically' 1151, which means the system will add more rows to the input table, 'Horizontally' 1152, which means the system will suggest new columns and their values, and 'Filling Missing Values' 1153, which means the system will fill in empty cells in the input table. In case a user wants to construct a database or a table from scratch, the user can specify a description of this target database or table in the Task Specification box 1130, and click on the 'Enrich Data' button's associated option 'Construct from Scratch' 1154. This example illustrates one possible design, but various embodiments may adopt different user interface designs. For instance, in some other embodiments, each specific task type could have a separate button.

In various embodiments, users may be allowed to specify different types of additional requirements in addition to the basic task specification. For example, such requirements may include:
(1) a specification of the preferred format of data in each or some column(s),
(2) whether or not the generated results, such as the verification result of some data or the suggested new data, should be associated with an explanation,
(3) whether the verification or enrichment results should be directly applied to the original database or saved elsewhere,
(4) whether the database curation process should be optimized for speed, quality, cost-efficiency, or a balanced trade-off among these considerations,
(5) some detailed preferences about the result quality, such as a focus on precision or recall, or a trade-off between the two, and
(6) any other possible requirements.

In addition to these requirements, users may be allowed to specify certain knowledge, such as their understanding of how to accomplish a specific database curation task, or their feedback on any produced result. The CHAT2DATA system can properly integrate this user-specified knowledge or feedback with its workflow.

In some embodiments, the task input further comprises one or more additional input elements, each additional input element being one of the following:
  an additional data structure, such as additional data useful for the database curation tasks to be performed,
  a text, such as relevant domain knowledge specified by a human in natural language or described in some document,
  an executable computer program with an application programming interface that can be used by the controller or other components of CHAT2DATA,
where these zero or more additional input elements are considered part of the input and provide additional information to the controller or other components of CHAT2DATA. The information provided by these additional input elements can be used for computations and/or conveyed to one or more LLMs via prompting.

Other Methods of Generating Prompts

In the example described in the section titles "An Example of CHAT2DATA", all prompts are generated using pre-defined templates.

In some other embodiment, prompt types and their variants are standardized, and parameterized by input and output parameters whose types are either standard data types or customized data types, where the concrete values stem from a set of values comprising: (i) the database, (ii) previous LLM responses, and (iii) intermediate calculations of the controller. Moreover, each actually issued prompt carries various annotations to be stored for use in further algorithmic steps. For example, the prompt in Ex1 will carry (among other annotations) an annotation specifying that the expected answer is a sequence of the form, which, for example, may look as follows:
  "x is a" string=NLD(CP.C)"." <cr> "y is a" ?string-NLD(CP.N)"." <cr>"?string=NLD(CP) "y."

This annotation, which is formulated in a kind of attribute grammar, specifies that the first line of the expected answer contains "x is a" followed by a string intended to be adopted as the value of NLD(CP.C), that is, as the natural language description of the attribute C of the relation CP, and so on.

In certain embodiments, Natural Language Processing (NLP) techniques, including Natural Language Generation (NLG), can be utilized to generate or modify prompts to accomplish specific sub-tasks. One approach involves employing a Language Model (LM), such as a Large Language Model (LLM), for this purpose. The system can provide the LLM with a "prompt-generation" prompt, which outlines the task and requests the LLM to generate a prompt that guides another LLM (which may be different from the initial LLM) to complete the task. For instance, to generate the prompt shown in Ex4, the system can employ the following "prompt-generation" prompt: "Assume that you are an experienced prompt engineer, generate a prompt that instructs GPT-4 to identify potential competitors to Food-Cheri."

In some embodiments, the sequence of prompts used by CHAT2DATA further comprises one or more Chain-of-Thought prompts providing helpful instructions to the one or more LLMs about how to compute candidate results. These Chain-of-Thought prompts may be obtained via knowledge-based methods, such as accessing the relevant knowledge on how to accomplish a task from a knowledge base. In other embodiments, these Chain-of-Thought prompts may be generated by one or more LLMs using "instruction-generating prompts," which ask the LLMs for instructions on how to achieve a desired result.

Variations of CHAT2DATA for Item Set Expansion and Attribute Search

Item set expansion (a.k.a. set expansion) is the problem of expanding a set of given seed items with similar items. CHAT2DATA can be used for item expansion, for example, by putting the seed items into a new unary data relation, named, say "LIST", having a single attribute, say "Item", and then issuing a database enrichment command enrich (LIST, *Item). Given this command CHAT2DATA will enrich LISt with new items similar to the seed items. In other examples, a database is not necessary and a variant of CHAT2DATA just accepts the seed items in input (e.g. typed in by a user) and the system just treats them internally like a database. Clearly, all this also works for compound items represented as k-tuples, but in this case LIST would be a k-ary relation.

Another interesting variant or extension of database enrichment is the enrichment of a database by new structural entities. For example, a data relation of a relational database may not just be enriched "vertically" by by new data values or records (tuples) but also "horizontally" by new attributes. One way to achieve that via CHAT2DATA is to encode a relation R with schema R(K, A1, . . . , An), where K is a (possibly compound) key and A1, . . . , An are other attributes, as a ternary relation R@ with schema R@(K, Attribute, Value) in the obvious way, and then issue the request expand (R@,*A,*V) to CHAT2DATA. There are many other ways to do this. Some examples are variants of CHAT2DATA with a specialized control flow geared to automatically find new attributes to a given relation R and incorporating these attributes as well as corresponding data into R. Where data for new attributes cannot be found, null values could be used instead. Examples of other variants just add new attributes and fill the respective new columns with nulls, and in a secondary step, a user may issue a null-value replacement command and transform the nulls into concrete data values where possible.

Extended Architecture Design

Figure 7:
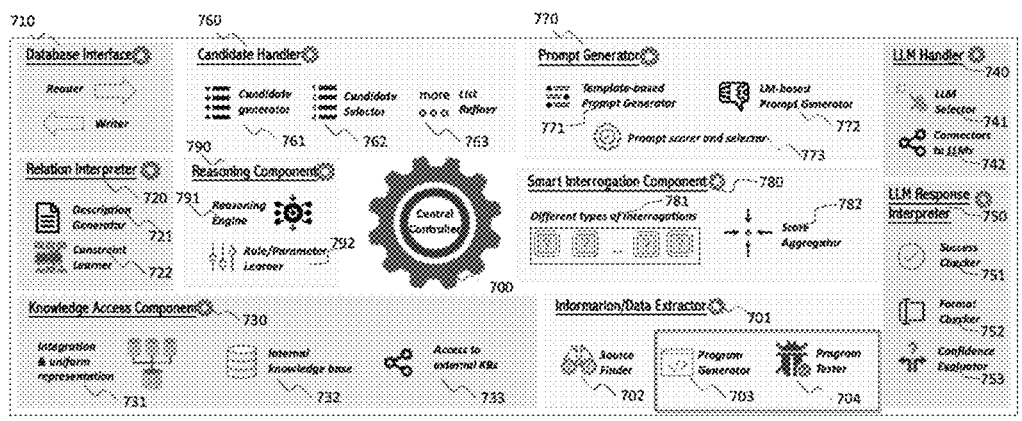
FIG. 7 delineates an exemplary architecture that can be utilized by various embodiments of the current disclosure.

Based on the extensions and alternative implementations outlined in the preceding sections, this section presents a possible extended architecture devised to accommodate the majority of the aforementioned extensions and alternatives. FIG. 7 illustrates this extended architecture. The system architecture comprises the following components:

1. General Database Interface 710, which provides connections and read/write interactions with various databases.
2. Relation Interpreter 720 which generates interpretations of one or more relations of a database schema. It comprises the Description Generator 721, generating relation descriptions of one or more relations of a database schema, and the Constraint Learner 722, learning constraints such as Conditional functional dependencies or inclusion dependencies the database adheres to.
3. Knowledge Access Component 730, which facilitates access to and integration 731 of knowledge in the internal knowledge base 732 of CHAT2DATA, and knowledge from external knowledge sources 733, while providing a uniform representation of this knowledge.
4. LLM Handler 740, which handles various interactions with LLMs. It comprises the LLM Selector 741 that can flexibly select appropriate LLMs for specific tasks, along with a utility module, Connectors to LLMs 742, which can transmit prompts to LLMs and receive responses.
5. LLM Response Interpreter 750, which interprets and evaluates the responses from LLMs across various aspects. It comprises a Success Checker 751 that assesses LLM answers for validity, a Format Checker 752 that verifies answer format compliance, using regular expressions or other tools, and a Confidence Evaluator 753 that evaluates LLM's confidence. The Confidence Evaluator can be implemented by using an LLM or another machine learning models to assess the confidence reflected in the responses of LLMs.
6. Candidate Handler 760, which handles the generation, ranking, selection and other operations for candidate data items. It comprises a Candidate Generator 761 for creating and maintaining list of new "candidate" data items, a Candidate Selector 762 that ranks and chooses the top candidates, and a List Refiner 763 that employs list refinement processes to update the candidate list.
7. Prompt Generator 770, which generates prompts required by different processes of CHAT2DATA. It comprises a Template-based Prompt Generator 771 that creates prompts of various type using pre-defined templates, and a LM-based Prompt Generator 772 that leverages a language model (LM) for flexible prompt generation tasks, such as generating "quasi-paraphrases" of some prompt, or crafting optimal prompts based on specific needs, and a Prompt Scorer and Selector 773 that scores and selects a proper prompt to use according to a given context. The Prompt Scorer and Selector can be implemented by employing an LLM to review and score the quality of each candidate prompt, based on which the prompt to be issued is selected.
8. Smart Interrogations Component 780, which comprises various interrogation sub-components 781 for executing different types of LLM interrogations, such as criteria-based, evidence-based, and more; and a Score Aggregator 782 that aggregates scores generated by different interrogation processes.
9. Reasoning Component 790, which provides a comprehensive toolkit for reasoning processes in CHAT2DATA. It comprises a Reasoning Engine 791 responsible for conducting basic knowledge-based reasoning tasks, detecting inconsistencies, and reasoning with uncertain facts, and a Rule/Parameter Learner 792 that automatically generates rules or learning values for parameters used in rules.
10. Program Generator 703 and Program Tester 704, for automatically generating and testing programs used in CHAT2DATA.
11. Information/Data Extractor 701, provides functionalities for extracting information or data from various sources. It comprises a Source Finder 702 to locate relevant sources containing the desired information or data. Additionally, it employs a Program Generator 703 to automatically create wrappers for information or data extraction, and a Program Tester 704 to verify the correctness of these wrappers.
12. Controller 700, which orchestrates the other main components and decides step-to-step transitions.

The components listed above serve as an illustrative example of a possible architecture of CHAT2DATA. It is important to emphasize that this disclosure is not limited to the specific arrangement of components described herein. Alternative embodiments may implement distinct architectures to achieve similar or enhanced functionality. For example:

Subset Configurations: Certain embodiments may utilize only a subset of the components listed above, depending on specific requirements or constraints.

Alternative Architectures: Other embodiments might incorporate different components, or adopt different component designs, or rearrange the interaction between components.

In some simpler embodiments, all functionalities of these components are provided by the controller, without explicit implementation of these components, except for the controller itself.

In some other embodiments, without explicitly implementing the components listed above except for the controller, various functionalities required by the CHAT2DATA system are implemented as modules, which are self-contained units of code. The sequence of prompts to the LLMs is performed as part of a sequence of modules, each module executed or triggered by the controller. These modules belong to module classes comprising LLM interaction modules, basic functional modules, and complementary modules, where
(i) the LLM interaction modules are of module-types comprising:
  (a) LLM-issuing modules, which are modules that compose and issue LLM prompts,
  (b) LLM-Answer understanding modules, which analyze answers to LLM prompts and extract and retain useful data or information from the answers,
  (c) mixed LLM interaction modules, which comprise a sequence of LLM prompts and answer analysis steps,
  (d) auxiliary LLM interaction modules, which are triggered by basic functional or complementary modules and use LLM interaction for a sub-ordinate task to be executed by a basic functional or complementary module,
(ii) the basic functional modules are of module-types comprising:
  (a) knowledge access modules,
  (b) mathematical calculation modules,
  (c) database access modules, comprising database connection, reading, writing, updating, and query execution modules,
  (d) data sampling modules,
  (e) searching modules responsible for searching for relevant documents or information,
  (f) navigation modules responsible for navigating or crawling data or information sources, and
  (g) document or Web page parsing and segmentation modules,
(iii) the complementary modules performing:
  providing a solution in addition to an LLM-based solution for a sub-task, whereby an overall result quality of the sub-task is enhanced by integrating the LLM-based solution and the additional solution.
  Replacing an LLM-based solution for a sub-task, when the LLM-based solution fails on the sub-task or exhibits clear uncertainty in the LLM's response, or when the controller determines according to one or more criteria that a complementary module can achieve a better performance than the LLM-based solution for the sub-task, the one or more criteria belonging to a group comprising: efficiency of the solution, estimated quality of the result, and cost-efficiency,
  and where one or more complementary modules are of one or more types in a module-type set comprising:
  (a) data-extraction, wrapper generation, and execution modules;
  (b) rule-based reasoning modules,
  (c) machine learning modules based on machine-learning models of smaller size than LLMs,
  (d) graph analysis modules, and
  (e) item set expansion modules;
  These modules are dynamically invoked, where the type and actions of each module may depend on computations of preceding modules and the sequence of prompts is the sequence of all prompts generated in temporal order by the execution of the modules.

More Details on the Complementary Programs

Previously, in the section 'Other Implementations of Candidate Data Generation' an example of using complementary approaches is provided (since these approached are implemented as complementary programs, they are called complementary programs hereafter) in addition to the LLM-based candidate data generation process to enhance the recall of this process. Also, in the section 'Data/Information Extraction from External Sources,' examples of Web Data Extraction programs that can be automatically generated and used to extract data are provided. These programs offer faster speed and lower cost compared to using LLMs for each extraction task. These were just illustrations of the concept of Complementary Programs. In fact, each LLM-based process in CHAT2DATA can potentially be combined with or replaced by complementary programs. This section delves into more details about these complementary programs.

Complementary Programs Serve Two Purposes:
1. Providing a solution in addition to an LLM-based solution for a sub-task. The overall result quality of this sub-task is enhanced by integrating the LLM-based solution and this additional solution.
2. Replacing an LLM-based solution for a sub-task, when the LLM-based solution fails on the sub-task or exhibits clear uncertainty in the LLM's response, or when the controller finds that according to some criterion/criteria, the complementary module can achieve better performance than the LLM-based solution to this sub-task. These criteria may be one or more of a criteria set comprising:
  (a) efficiency of the solution,
  (b) estimated quality of the result,
  (c) cost-efficiency, Note that these complementary programs are optional in CHAT2DATA, and some embodiments may not implement such programs.

Figure 10:
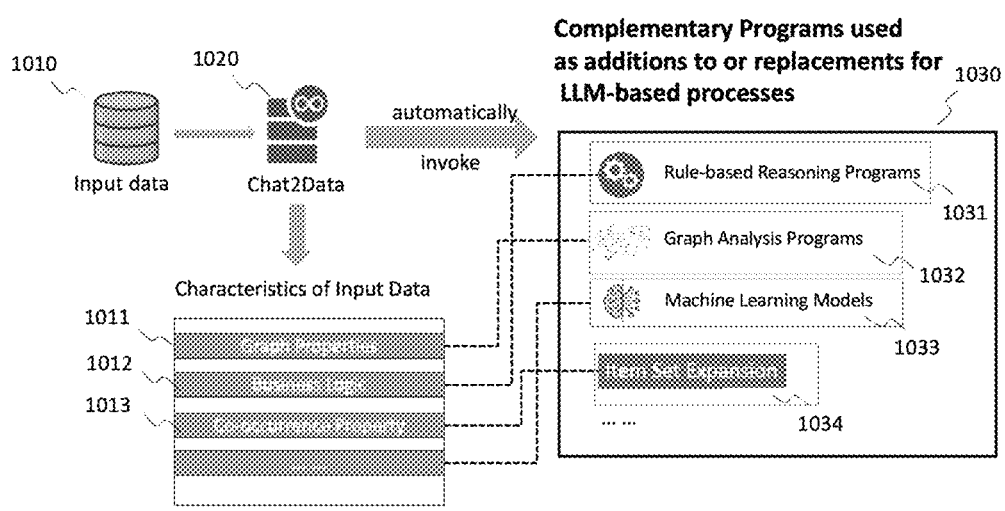
FIG. 10 provides an example of complementary programs used as additions to or replacements for LLM-based processes in CHAT2DATA according to an example of the instant disclosure.

As displayed in FIG. 10, CHAT2DATA 1020 contains a set of pre-defined categories of complementary programs 1030, including the previously mentioned Rule-based Reasoning programs 1031, Item Set Expansion programs 1034, and others such as Graph Analysis programs 1032, Machine Learning Models 1033 with size much smaller than LLMs, any other programs written in a suitable programming language, and more. This set can also be extended by the system developer or administrator of CHAT2DATA. Each program category in this set is associated with a group of scenarios in which the program of this category is appropriate to be triggered. For example, Graph Analysis programs 1032 are suitable for input data that can be represented as a graph and exhibit certain graph properties 1011. Rule-based reasoning programs can be triggered if CHAT2DATA discovers that the underlying business logic 1012 of the input data can be expressed as rules. Item Set Expansion programs 1034 are triggered if CHAT2DATA detects that different items in the input data possess a co-occurrence property 1013, indicating they are likely to co-occur in various contexts such as HTML lists.

The Controller 700 determines the appropriate usage of different complementary programs for various sub-processes in a database curation task. Various embodiments may implement different methods for such determination processes. In some embodiments, the knowledge stored in the knowledge base 732 of the CHAT2DATA system may regulate which key steps are eligible for using complementary programs, such as the Candidate Data Generation step. At runtime, the Controller 700 dynamically determines whether complementary programs should be triggered for these key steps. For example, the Controller 700 may trigger complementary programs as an addition to a Candidate Data Generation process that does not produce enough candidates, thereby expanding the candidate list. The Controller 700 may also trigger complementary programs when the Prompt Interpreter 760 identifies that an answer returned by an LLM expresses strong uncertainty or when an LLM fails to accomplish a task. Furthermore, the Controller 700 may replace a cost-intensive LLM-based process with a complementary program if the user specifies a preference for a cost-efficient process that minimizes the number of prompts. Various embodiments may adopt different strategies for determining when to trigger complementary programs and implement these strategies using various methods, such as those discussed in the section 'Knowledge-Driven Dynamic Decision Making at Runtime.'

Once the Controller 700 decides to trigger the complementary program, it needs to decide which particular type of complementary program should be triggered. To decide whether or not a particular type of complementary program should be triggered, CHAT2DATA issues a Data Characteristics Checking Prompt (DCCP) to determine whether the input data exhibit a particular property, such as:

Given the input data [Data Description], and some sample data [Sample Data], please determine whether this data exhibits the characteristic of [Some Particular Data Characteristic]. Answer "yes" if all tuples in this data exhibit such characteristic, "partially" if only some tuples do, and "no" otherwise.

For instance, given input data in the form of a binary relation consisting of pairs of companies being competitors of each other, the LLM-based verification of whether two companies are competitors can be further combined with a proper complementary program. For example, a transitivity rule-based program that utilizes the transitivity property of a graph to detect new links between nodes can be triggered if CHAT2DATA detects that the input data possess the transitivity property. In some embodiments, this DCCP-based process of analyzing the characteristics of the input data may be replaced or combined with data profiling techniques.

The results of the complementary programs are further combined with the LLM-based process, and if necessary, further processed. For example, in the process of generating new candidate data, the data generated by a complementary program is combined with the candidate data generated by an LLM-based process, with necessary de-duplication. In the process of verifying the correctness of some data, if the complementary program suggests a different result from the LLM-based process, the CHAT2DATA system may further prompt another LLM to review both the LLM-based process and the result of the complementary program to determine a final result. Various embodiments may adopt different solutions in this integration and resolution process.

The set of pre-defined categories of complementary programs 1030 can contain real programs ready for use or merely descriptions of what the programs in each category should be. In the latter case, CHAT2DATA can generate the corresponding program. For instance, in the section "Extended Architecture Design," the Program Generator 703 was introduced to automatically create wrappers for data extraction, and the Program Tester 704 was introduced to verify wrappers using existing data. In some other embodiments, these components can also be used to generate complementary programs used for other steps, but not just data extraction. The program generation and testing processes can be implemented using existing techniques, such as model distillation or training a model using a synthetic dataset generated by an LLM. The Program Tester 704 can provide feedback to the Program Generator 703 to improve the generated program until it passes the tests.

A Concrete Example of the Extended Architecture Design

This subsection, as a further illustration of the previous one, provides a concrete example of a system with the extended architecture design introduced earlier. This example system is referred to as CHAT2DATA* in this section.

Figure 8:
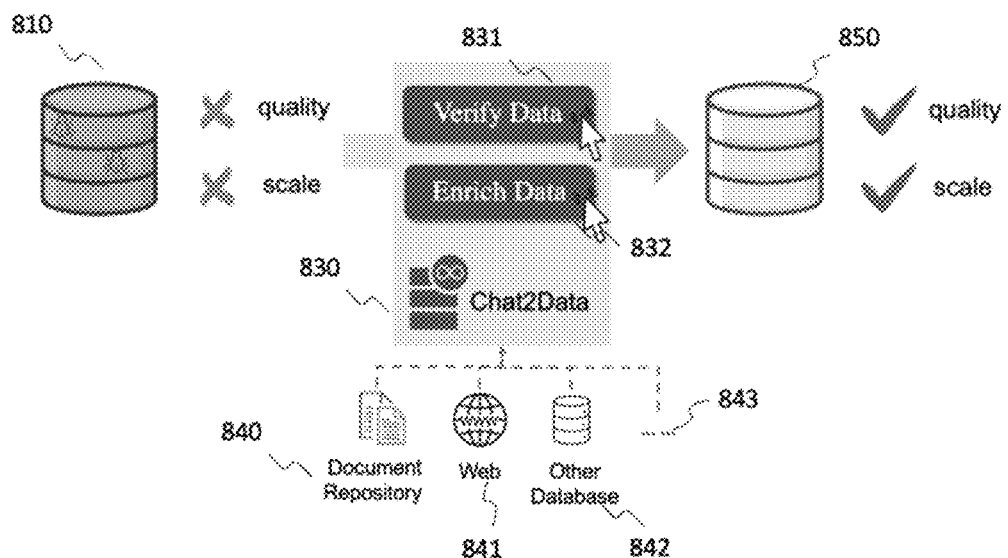
FIG. 8 provides a brief overview of the CHAT2DATA system according to an example of the instant disclosure.

An example overview of CHAT2DATA* is shown in FIG. 8. CHAT2DATA* 830 seamlessly integrates with diverse types of information sources, including the Web 841, users' internal document repositories 840, and databases 842, to automate a comprehensive suite of database curation functions for an input database 810 that may be dirty or insufficient. CHAT2DATA* provides users with buttons for triggering different database curation tasks, such as the Verify Data button 831 and the Enrich Data button 832, to produce a database 850 of better quality and sufficient scale.

Integration with the Web or internal document repositories is provided by the Information/Data Extractor 701, while integration with databases is facilitated by the General Database Interface 710.

The controller 700 of CHAT2DATA* determines the workflow and the appropriate utilization of various components based on the characteristics of the database curation tasks to be performed. Such determination is made based on the specific type of the database curation task, as well as the data characteristics of the relation being curated, which are generated by the Relation Interpreter 720.

An example categorization of data types based on their characteristics includes:
1. Simple Data: These are straightforward facts that can be directly collected or observed, such as the price of a product or a person's birthday. The generation of such data typically does not require a complex analysis process since they normally exist somewhere, such as mentioned in a document or recorded by some device, among other possible sources.
2. Complicated Data: These data are derived from intricate analysis processes and verifying or enriching them also necessitates performing a similar analysis. Examples of complicated data include relationships between companies (e.g., competitor relationships), associations between contract clauses, product similarities, and interactions between drugs.
3. Time-Sensitive Data: This category includes data whose relevance or accuracy is highly dependent on the timeliness of its processing and usage. Examples might include product prices, stock market data, real-time traffic conditions, or live social media updates.

Such categorization and the corresponding solution workflow are pre-defined in the knowledge base 732 of CHAT2DATA*, and can be accessed via the Knowledge Access Component 730. Please note, this categorization is just one example method, and various embodiments may adopt different methods to categorize data based on their specific needs and operational contexts.

As an example, consider the database depicted in FIG. 9, organized as follows:
1. Base Tables (the Products table 910 and the Companies table 920): These tables are composed of entity-focused tuples, each representing a single entity such as a product or a company, with attributes stored in columns. For instance, the price column in the Products table 910 stores the official prices of products, while the HQ column in the Companies table 920 stores the primary headquarters location of companies.
2. Junction Tables: These tables represent relationships among entities. For example: ■ The Similar Products table 930 details pairs of similar products. ■ The Competitors table 940 represents the competitor relationship between companies.

CHAT2DATA* can work on various database curation tasks that a user of CHAT2DATA* may want to perform for all these tables.

CHAT2DATA utilizes an LLM to handle foreign keys contained in the input relations. The LLMs are employed for a set of foreign key handling tasks comprising: (a) Identifying key-based relationships between tables, such as determining that a table's primary key is present in another table as a foreign key. (b) Decomposing a relation, such as a sampled dataset, into smaller, interrelated subsets using foreign key references. (c) Resolving foreign keys to retrieve the corresponding tuples they reference. In this example, before applying a database curation task to a table, the CHAT2DATA system converts each foreign key in the table into the actual record it references. This conversion process may be executed recursively if the retrieved record in another table contains additional foreign keys. Alternatively, in variants of this example or in other examples, relations with foreign keys are not effectively joined with the corresponding primary key relations, but an instruction prompt to the relevant LLM(s) about how to deal with such situations is issued. For example, such an instruction prompt may explain verbally (i.e., by a text—the words "verbal" and "textual" are used as synonyms in this description) and by examples that each tuple of a relation R with foreign keys can be treated in subsequent steps as if it were extended by matching tuples from those relations where the foreign keys are primary keys.

Verification and Enrichment of Data in the Products Table:

Before triggering any database curation tasks on the Products table, CHAT2DATA* first uses the Relation Interpreter 720 to generate an understanding of the table, identifying it as a table about product information. Specifically, the Relation Interpreter 720 identifies that this table contains both Simple Data and Time-Sensitive Data.

Data Verification of Data in the Products table: The Controller 700 reads the corresponding knowledge about how to perform the verification task for such data (i.e., a table that contains Simple Data and Time-Sensitive Data) from the Knowledge Base 732 of CHAT2DATA* via the Knowledge Access Component 730. The Controller 700 then orchestrates different components to perform the verification and enrichment tasks as follows.

First, since the Products table contains Simple Data, and according to the knowledge stored in CHAT2DATA*'s knowledge base, rule-based data error detection is suitable for finding errors in such data. The Controller 700 triggers the Rule/Parameter Learner 792 to generate data error detection rules. Then the Reasoning Component 790 executes these rules for identifying data errors in this table, including errors such as duplicates and errors that violate business logic.

Also, since some data in the Products table are about facts that can be verified through reliable sources, for example, the manufacturer of a product can be verified on the official web page of the manufacturer. Since an LLM may have seen such reliable sources, the Controller 700 triggers the Smart Interrogations Component 780, to apply evidence-based interrogations (a particular type of Smart Interrogations), to ask the LLM to explicitly list provenance to validate or invalidate facts in the Products table. Prompts used in this process can be generated by the Prompt Generator 770. This involves first using the Template-based Prompt Generator 771 and/or the LLM-based Prompt Generator 772 to create candidate prompts. The Prompt Scorer and Selector 773 then selects the most suitable prompts from these candidates. In cases where LLMs fail to list such provenance, the Controller 700 triggers the Source Finder 702 to find reliable sources that mention provenance validating or invalidating facts mentioned in the Products table.

Additionally, since the table contains Time-Sensitive Data, such as the official product prices stored in the price column, CHAT2DATA* triggers the Information/Data Extractor 701 to retrieve the latest prices from product producers' official websites and compare them with the prices in the table, to detect outdated data. This process involves using the Source Finder 702 to locate URLs of producers' official websites, and employing the Program Generator 703 and Program Tester 704 to create and verify wrappers for extracting the latest product prices.

Data Enrichment of Data in the Products table: According to the knowledge defined in the knowledge base of CHAT2DATA*, the Controller 700 calls the Information/Data Extractor 701 to extract new products found on the official websites of companies listed in the Companies table 920, and optionally from other data sources. These extracted data are maintained by the Candidate Handler 760, for example, ranked and selected by the Candidate Selector 762, based on the reliability of the data source from which a candidate data item is extracted. To ensure a high recall of such data, the List Refiner 763 is triggered. This is achieved by applying a complementary program automatically generated and verified by the Program Generator 703 and the Program Tester 704, such as an Item Set Expansion program, to discover additional data from the Web.

The Controller 700 then calls the Reasoning Component 790 to perform a rule-based entity resolution process, generating necessary entity resolution rules for identifying identical data records. The Program Generator 703 and Program Tester 704 are also used to generate classifier models for entity resolution use. These rules and models are used to de-duplicate extracted data records. This process also involves comparing the extracted data with existing tuples in the Products table to ensure that only new products are inserted. The new products are then added to the Products table.

During this process, the Information/Data Extractor 701 also suggests new columns (e.g., new product attributes) based on the extracted data.

The verification and enrichment of data in the Companies table are similar to those of the Products table.

Verification and Enrichment of Data in the Competitors Table:

CHAT2DATA* first uses the Relation Interpreter 720 to analyze this table, identifying it as a table about company competitors. Additionally, the Relation Interpreter 720 determines that the data contained in this table is Complicated Data, because identifying competitor relationships between companies requires an intricate analysis process.

Data Verification of Data in the Competitors table 940: Based on the knowledge retrieved by the Knowledge Access Component 730 from the Knowledge Base 732 of CHAT2DATA+, the Controller 700 orchestrates the necessary components to verify each tuple in the Competitors table 940 as follows. For each pair of company competitors (represented as their IDs) listed in the Competitors table, the Controller 700 calls the Smart Interrogations Component 780 to perform the smart interrogation process (as explained in the section 'An Example of CHAT2DATA') to check whether the two companies are competitors. During this process, the employed LLM may lack the necessary information to accomplish a sub-process. In such cases, the Controller 700 triggers the Information/Data Extractor component 701 to locate relevant information sources containing the necessary information using the Source Finder 702 and then extracts the required information from these sources. For instance, in the criterion-based scoring process for determining whether two companies, A and B, are competitors, the LLM may not know the Geographic Presence of Company B. Therefore, the Controller 700 triggers the Information/Data Extractor component 701 to find or infer the Geographic Presence of the company B from the Web and uses this information to assist the LLM in continuing the criterion-based scoring process.

Data Enrichment of Data in the Competitors table 940: Based on the knowledge retrieved by the Knowledge Access Component 730 from the Knowledge Base 732 of CHAT2DATA*, the Controller 700 orchestrates the necessary components to find more competitors for each company listed in the Companies table 920 and uses newly found pairs of company competitors to enrich the Competitors table 940. For each company A, to identify more of its competitors, the Controller 700 calls the Constraint Learner 722 to learn constraints that the correct data must satisfy. For example, new competitors of A should also be companies, not other types of entities. The Controller 700 then triggers the Candidate Handler 760 to find and maintain a list of candidate competitors of A. This process starts with using the Candidate Generator 761 to generate candidate competitors of A. For each candidate, the Controller 700 calls the Smart Interrogations Component 780 to perform the smart interrogation process, generating various scores for each candidate, such as scores regarding different criteria. These scores are then aggregated by the Score Aggregator 782. The scored candidates are ranked and selected by the Candidate Selector 762. If the selected results are insufficient, such as fewer than a predefined number, the Controller 700 further triggers the List Refiner 763 to explore more candidates. In this process, the Controller 700 triggers several processes in parallel, including using innovative prompts, such as List Dig-In Prompts generated by the Prompt Generator 770, or employing a proper complementary program, such as an Item Set Expansion program. These further discovered candidates are maintained by the Candidate Handler 760, and are subsequently checked and selected.

The verification and enrichment of data in the Similar Products table 930 are similar to those of the Competitors table 940.

Although not explicitly mentioned above, for each LLM-based process, the Controller 700 utilizes the LLM Handler 740 to select the most suitable LLM using the LLM Selector 741, and to interact with the LLM using Connectors to LLMs 742, including sending prompts generated by the Prompt Generator 770 and receiving responses. The Controller 700 also employs the LLM Response Interpreter 750 to evaluate the LLM's answers from various aspects. This includes checking the correctness using the Success Checker 751, verifying the format using the Format Checker 752, and evaluating the uncertainty using the Confidence Evaluator 753.

Note that the example CHAT2DATA* described in this section is intended to further illustrate how various components are orchestrated by a controller to perform various tasks. This should not limit the scope of the disclosure, as different embodiments may adopt different architecture designs and different ways of orchestrating components to work for various database curation tasks.

Implementing CHAT2DATA for Various Tasks

While the primary discourse and explanations surrounding the present disclosure have predominantly centered on database-related tasks, the CHAT2DATA methodology delineated in the current disclosure boasts a broad applicability. It can be extended to any variety of tasks that utilize some LLM(s) to yield specific outcomes.

Next, we introduce an example implementation of the CHAT2DATA approach that is specifically designed to handle a variety of tasks dependent on LLM, extending beyond just those related to databases. This embodiment highlights the features of CHAT2DATA: 1) leveraging the LLM's understanding of a problem to deconstruct the problem, while also examining the LLM's own responses, and 2) utilizing various types of prompts to interrogate the LLM, thereby enhancing the outcome.

In this embodiment, akin to the one outlined in the section 'An Example of CHAT2DATA,' a controller orchestrates the primary steps of CHAT2DATA according to a predetermined workflow. To illustrate this, we consider the following problem:

Problem Scenario Assume a user who begins with a prompt outlining some specific requirements: "Draft a paragraph of less than 150 words aimed at illustrating the significance of utilizing data extracted from the Web to make better investment decisions."

Without using CHAT2DATA, directly sending this prompt to an LLM, such as GPT-4 (accessed on 8th July 2023) returns the following:

[Version 0]

GPT-4: Harnessing the vast troves of data available on the Web can transform investment decision-making, elevating it from guesswork to a refined, data-driven process. This expansive digital universe is a rich source of real-time information, encompassing consumer sentiment, market trends, and intricate financial data. By leveraging advanced analytics on such data, investors can unearth valuable insights, predict market movements, and identify promising investment opportunities with higher accuracy. Additionally, it allows for more robust risk management by exposing potential market volatility and investment threats. Hence, using web-extracted data, investors can make more informed, timely, and strategic decisions, enhancing their portfolio performance and ensuring a competitive edge in today's dynamic investment landscape.

While the overall response seems commendable, it could do with concrete examples to better illustrate the practical application of Web data in investments. It also uses phrases like "advanced analytics," "predict market movements," and "promising investment opportunities" with a lack of detail, leading to ambiguity. Furthermore, it overemphasizes the benefits of using Web data without discussing potential challenges or limitations tied to data interpretation and analysis. Thus, the user may find themselves in a position where they need to prompt the LLM multiple times until the LLM produces the desired content. This procedure can often be time-consuming and frustrating. Let's now demonstrate how CHAT2DATA can automatically generate a more satisfactory result. Although the LLM used in this example is GPT3.5, accessed on 8th July 2023, the methodologies discussed in this section are not exclusive to any specific LLM. They can be applied with other LLMs as well.

Step-1: Task Understanding Similar to the "Tuple-based relation understanding" stage described in the "An Example of CHAT2DATA" section, the initial step is to facilitate the LLM's comprehension of the task at hand. An example prompt for this purpose is: Assume that a user specifies a task: "I'm tasked with drafting a paragraph of less than 150 words aimed at illustrating the significance of utilizing data extracted from the Web to make better investment decisions." Can you use a short phrase to describe this task? Only output the phrase.

GPT3.5: Crafting a concise explanation on the importance of web-derived data in investment decisions.

Subsequently, CHAT2DATA initiates the Smart Interrogations phase. In this specific example, a criteria-based interrogation process is employed. Initially, it queries the LLM about the most vital criteria for determining the result quality of this task. Then, it prompts the LLM to scrutinize and improve its own response concerning each criterion.

Step-2: Criteria Detection An example Criteria Detection Prompt is: What are the three most critical criteria that determines the quality of "a concise explanation on the importance of web-derived data in investment decisions"? Just list the criteria as phrases without explanations. In this prompt, the phrase "a concise explanation on the importance of web-derived data in investment decisions" is derived from the previous answer of the LLM.

GPT3.5: Three most critical criteria are:
1. Clarity and specificity of the explanation.
2. Accurate representation of the benefits of web-derived data.
3. Convincing argument on its role in the decision-making process, supported by relevant examples.

Step-3: Candidate Answer Generation CHAT2DATA then asks the LLM to generate an initial answer using a prompt like: Help the user finish the task according to the previous analyses.

[Version 1]

GPT3.5: Utilizing data extracted from the web is of paramount importance in making informed investment decisions. The availability of vast and diverse information on the internet enables investors to gain a comprehensive understanding of market trends, company performance, and industry analysis. This data-driven approach provides several key advantages. Firstly, it allows investors to access real-time and up-to-date information, enabling them to react promptly to market changes. Additionally, web-derived data offers insights into consumer behavior, competitor analysis, and emerging technologies, providing a holistic view of investment opportunities. By leveraging web data, investors can make more accurate predictions, mitigate risks, and identify lucrative investment prospects. For instance, analyzing web data can help identify emerging startups, gauge consumer sentiment, and assess the impact of social media trends on stock performance. In conclusion, harnessing data from the web empowers investors with valuable knowledge, enhances decision-making, and ultimately increases the likelihood of achieving favorable investment outcomes.

Step-4: Criterion-based Improvements Next, CHAT2DATA sequentially dispatches three Criterion-based Improvement Prompts (CIP)—CIP1, CIP2, and CIP3—each prompting the LLM to review and enhance its response.

CIP1: Regarding the criterion of "Clarity and specificity of the explanation", can the previous answer be further improved?

CIP2: Regarding the criterion of "Accurate representation of the benefits of web-derived data", can the previous answer be further improved?

CIP3: Regarding the criterion of "Convincing argument on its role in the decision-making process, supported by relevant examples", can the previous answer be further improved?

The intermediate responses to these prompts are not provided in this explanation. The outcome following these prompts is as follows:

[Version 2]

GPT3.5: The convincing argument on the role of web-derived data in the decision-making process becomes even more compelling when supported by relevant examples. By illustrating concrete instances where web-derived data has made a significant impact, the argument gains strength and credibility. For instance, consider the case of an investor leveraging web data to analyze consumer sentiment towards a particular product. By tracking online reviews, social media conversations, and sentiment analysis, the investor can gauge public perception accurately. This valuable insight guides investment decisions, whether to invest in the company manufacturing the product or to consider alternatives. Another example is the use of web data to identify emerging trends. By analyzing online search patterns, news articles, and social media discussions, investors can identify industries or technologies poised for rapid growth. This foresight allows them to capitalize on early investment opportunities and maximize returns. Additionally, web-derived data plays a crucial role in risk assessment.

By monitoring financial news, regulatory filings, and market reports, investors can identify potential risks and adjust their portfolios accordingly. These examples demonstrate the tangible benefits of web-derived data in informing investment decisions, mitigating risks, and uncovering profitable opportunities. By presenting such relevant examples, the argument for incorporating web-derived data into the decision-making process becomes not only convincing but also highly compelling.

Step-5: Result refinement The final step involves additional refinement of the generated result from several perspectives, as outlined below.

Step-5.1: Information Enrichment: Similar to the "Dig-in prompts" described in the section of "An Example of CHAT2DATA", CHAT2DATA queries the LLM to identify if any enumerations (like a list of examples) exist in the generated response. If yes, CHAT2DATA requests the LLM to expand upon these enumerations, thereby making the generated result more comprehensive and detailed. An example List Refinement prompt for this purpose is: Are there enumerations or lists in your previous answer? If so, try to improve each such enumeration or list by finding better matches to be inserted into it; if better matching elements are found for an enumeration or list, insert them and eliminate the same number of worst-matching elements from the enumeration or list.

Alternatively to "the same number of worst-matching elements" in the above prompt, in certain embodiments, numeric criteria may be specified such as for example "k worst-matching elements, where k is equal to the length of the enumeration or list minus 10".

In other embodiments, there may be different length limitations to be enforced, for example on the global length of the text. Furthermore, in some embodiments such length limitations are not enforced immediately but by a subsequent prompt such as for example: "shorten the above answer to obtain a text of 150 words by eliminating the least relevant material or by shortening enumerations in a balanced way eliminating their least matching elements".

Step-5.2: Removal of redundant content: An additional improvement to the generated result involves eliminating redundant content. An example prompt for this purpose is: 'Does the previous answer contain any redundant content? If it does, please replace those redundancies with more informative content.

Finally, the LLM returns the following answer:
[Final Version]
GPT3.5: The argument on the role of web-derived data in the decision-making process gains strength and credibility when supported by relevant examples. For instance, consider an investor who analyzes consumer sentiment towards a product using web data. By tracking online reviews, social media conversations, and sentiment analysis, the investor accurately gauges public perception. This valuable insight guides investment decisions, whether it's investing in the company manufacturing the product or considering alternatives. Furthermore, web data is instrumental in identifying emerging trends. Analyzing online search patterns, news articles, and social media discussions helps investors spot industries or technologies poised for rapid growth. This foresight enables them to capitalize on early investment opportunities and maximize returns. Additionally, web-derived data plays a crucial role in risk assessment. By monitoring financial news, regulatory filings, and market reports, investors can identify potential risks and adjust their portfolios accordingly. These examples demonstrate the tangible benefits of web-derived data in informing investment decisions, mitigating risks, and uncovering profitable opportunities. By presenting relevant examples, the argument for incorporating web-derived data into the decision-making process becomes compelling, highlighting its practical applications and tangible advantages.

Compared to Version 0, the final version produced by CHAT2DATA offers a more in-depth perspective by incorporating specific examples that illustrate the practical use of web-derived data in investment decisions. It provides clear descriptions of the processes involved. Moreover, it also implies the need for skilled analysis, such as sentiment analysis, to reap these benefits.

The above example with its described variations illustrates the potential application of CHAT2DATA across a multitude of tasks, not necessarily confined to database-related tasks. It should be recognized that when implementing an embodiment of CHAT2DATA for any given task, the earlier disclosed content in the section of "Extensions, Refinements, Variations, and Alternatives" retain their relevance and applicability. In fact, even though the examples and disclosures provided in the previous sections regard database improvement tasks, these descriptions offer sufficient detail and practical examples for generalizations to broader tasks. These insights equip anyone with domain expertise to utilize the fundamental methodology within the implementation of CHAT2DATA across a broad spectrum of tasks, transcending the boundaries of the specific context discussed.

As an addition, we now proceed to illustrate how to achieve automatic dynamic decision-making during runtime, diverging from the predefined workflow used in the example described above. The forthcoming discussions will focus on two types of CHAT2DATA embodiments: CHAT2DATA for a singular problem type and CHAT2DATA for multiple problem types.

CHAT2DATA for a singular problem type: When an embodiment of CHAT2DATA is designed for a specific type of problem, such as crafting content for a provided topic, there are several feasible paths towards realizing dynamic decision-making. These include the utilization of a dedicated knowledge base, specifically prepared for this type of problem, or the employment of a pre-trained model or a fine-tuned LLM, as previously discussed in the sections titled "Knowledge Driven Dynamic Decision Making at Runtime" and "Other Implementations of Dynamic Decision Making at Runtime," respectively. A hybrid approach that integrates these methods may also be employed. The purposed knowledge base could house a taxonomy of varied categories, such as a categorization of different relationship types in the context of database-related problems, or a taxonomy of diverse document types in relation to document-oriented problems. Each category in this setup is paired with an initial execution plan. Additionally, the knowledge base would incorporate step-by-step transition guidance. A machine learning model or an LLM specifically designed for dynamic decision-making can be either pre-trained or fine-tuned, enabling it to acquire the required knowledge to effectively handle the particular problem type in question. For comprehensive insights, refer to the sections "Knowledge Driven Dynamic Decision Making at Runtime" and "Other Implementations of Dynamic Decision Making at Runtime", as they extensively detail these methods and will not be reiterated here.

CHAT2DATA for multiple problem types: Some embodiments of CHAT2DATA may be implemented for broader applicability, with the ability to tackle a spectrum of problem types, rather than being tailored for a specific problem. Certain embodiments may leverage a general-purpose LLM to direct dynamic decision-making during runtime using the LLM's understanding of the specific task. (Refer to the section of "Other Implementations of Dynamic Decision Making at Runtime".) Alternatively, some embodiment could comprise a list of CHAT2DATA sub-instances, with each sub-instance designed to address a distinct problem type. An integral part of this architecture is a task router, whose function is to ascertain the appropriate CHAT2DATA instance for a given task. There are multiple existing methods available for the implementation of this task router. One viable method includes constructing the task router as a multi-category classifier, which receives the task's specifics from the user and generates, via prompting one or more LLMs, or by other methods, an outcome either categorizing the task within the existing set of supported problem types that can be handled by the current CHAT2DATA implementation, or by assigning a special label such as 'UNKNOWN TASK CATEGORY' to signify a task outside the realm of support. Certain embodiments may allow the user to explicitly define the problem type, thereby enabling the task router to directly allocate the task to the appropriate CHAT2DATA sub-instance.

In certain embodiments, for each task category that can be handled, a task name or identifier and a description in natural language of the task is given, for example in form of a task category knowledge base TCKB that can be updated, enriched, and improved over time. In addition, with each task category, the TCKB may contain other information helpful to recognize whether a prompt expresses a task in this category, for example keywords related to the category.

The controller (or an incorporated or external task router) can then use one or more LLMS or various NLP-based methods or tools to determine, where possible, a task category among those available, that contains a task which is expressed by a prompt to be answered. In some embodiments this can be done by providing to an LLM via one or more "task finding" prompts: (i) the name and natural language description of all available task categories, that is, those that are described in the TCKB of the embodiment, (ii) the prompt to be answered in form of a text such as "Consider the following question or assignment: '<prompt>', and (iii) a question such as "Which category of the above task categories best matches the above question. In further embodiments, where the TCKB contains additional natural language items (such as, e.g., keywords), these are also be included into the one or more task finding prompts. Given that there may be a large number of potential categories, these categories and their descriptions altogether may exceed the size limitation on prompts. Therefore, to reduce the size of prompts, in more sophisticated embodiments, the TCKB may organize the different task categories into a multilevel hierarchy, say, in form of a forest, whose roots are rather abstract categories, and where each inner node may have multiple children, each representing a more refined category that refines the parent category, and where the leaf nodes represent the target categories (i.e., those which are desired possible outputs). To find the most appropriate category at a leaf node, the controller (or router) then exploits the hierarchy tree to do tree-search via multiple (but no more than O(log n) prompts, where n is the number of the target categories. Clearly this method will use more, but much smaller prompts. In fact, with this hierarchical method, the number of categories that need to be mentioned by any task-finding prompt is bounded by the the branching number b of the hierarchy tree, i.e., by the maximum number of children of any node of the tree. Consequently, for such embodiments, it is advisable to introduce sufficiently many abstract categories as inner nodes, so to achieve a reasonably small branching factor b.

In addition, in certain embodiments, for each task category, the TCKB may further contain code (e.g. Python code making calls to one or more LLM APIs) to solve tasks that fall in this category. As soon as the final (target) task category is identified, the corresponding code is executed and the task is solved.

Other embodiments, when given a task T, first check, whether the task is already described in the TCKB, if not, use a generic method, and, if this is successful, produce (with help of one or more LLMs) (a) a category description DTT for the category TT of T, and (b) code for solving problems of category TT. The new DTT with corresponding code is then stored in the TCKB. From that moment on, when a task of type TT is input to such an embodiment, the task can be handled. Such embodiments, in a sense, bootstrap their own TCKB either fully or partially, in the latter case starting, e.g. with an initial hand-generated TCKB.

What is claimed is:

1. A method to be executed by a computing device, the method comprising:
   (i) accessing and/or modifying a database by at least one processor, the database to be automatically curated, the database being accessible to, and modifiable by, a controller, the database containing zero or more structured datasets and zero or more metadata items, where the database in its initial state, is referred to as an input database,
   (ii) accessing zero or more additional external data or information sources by the at least one processor, and from which specific data or information useful to a database curation task can be obtained by at least one of:
      (a) performing database access,
      (b) retrieving information for retrieval augmented generation, and
      (c) automatically extracting structured data,
   (iii) using one or more pre-trained large language models (LLMs) accessed via application programming interfaces (API) or other connections, issuing prompts and retrieving answers to prompts and executing one or more database curation requests by the at least one processor, each request specifying a database curation task to be performed on at least a sub-structure of the database, the database curation tasks comprising:
      (a) a database enrichment task to compute new data records comprising tuples or other associations of data items and insert the records into the sub-structure of the database,
      (b) a database verification task to verify, with help of the one or more LLMs, data contained in the sub-structure, and, when incorrect data is identified, return the incorrect data as output for further processing or correction,
      (c) a database update task to automatically recognize and update erroneous or outdated data within the sub-structure of the database, and
      (d) a null-value or a missing value replacement task to replace null-values contained in the sub-structure of the database by concrete data values,
   wherein zero or more constraints are accessible to the controller, each constraint being either a database constraint expressing a property to be fulfilled and maintained by the dataset, or a process constraint that restricts the control flow to be generated by the controller,
   where the input database, the task description, and the zero or more constraints are jointly referred-to as input, and where the requested database curation tasks are automatically performed by the controller by a computation that uses the one or more LLMs and that performs a sequence of prompts to the LLMs such that each prompt of the sequence is generated by the controller from at least one of (a) the input, (b) forms of and answers to previously issued prompts from the sequence, (c) intermediate calculations of the controller.

2. The method of claim 1 where the database curation tasks to be executed upon corresponding data curation requests further comprise constructing the entire database from scratch, or constructing specific data relations, tables, sub-structures, or parts of the database from scratch, where for each database initialization task, one of:
   (a) a database initialization task is requested in form of a separate database initialization request,
   (b) a database initialization task is requested in form of an explicitly available special version of a database enrichment task, (c) a database initialization task is requested by issuing a database enrichment task for an empty database or an empty data relation, table, sub-structure, or database part.

3. The method of claim 2, where the database is of a type from a set of database types comprising:
   (i) Relational databases, which organize and store data in a tabular format with predefined schemas,
   (ii) Non-relational databases,
   (iii) File-Based Databases, which utilize files for storing and organizing structured data, providing data persistence and query capabilities, and
   (iv) Vector databases to efficiently store and search vector data, comprising embeddings from text, images, or other types of data, allowing for high-dimensional similarity searches;
   and where each additional external data or information source is of a type from a set of source types comprising:
   (a) a local or remote document repository,
   (b) a device that collects or produces data,
   (c) a database system,
   (d) an API endpoint providing access to real-time or static data,
   (e) a crowdsourcing platform, and
   (f) any other source capable of supplying relevant data,
   where a document repository comprises one system or a combination or an integration of systems from a group of systems comprising:
   (a) the World Wide Web,
   (b) an intranet or a federation of intranets,
   (c) a document management system,
   (d) a set of documents stored in a file system,
   (e) an electronically searchable document or library catalog with links to online documents or to electronically stored documents,
   (f) a full-text database,
   (g) a database that stores text fields and that can retrieve texts via a suitable query language,
   (h) a searchable content management system,
   (i) a social network, where user posts are regarded as documents,
   (j) an image repository retrievable by an image search facility retrieving images from documents, and
   (k) a log management system of Web search queries.

4. The method of claim 2, where the sequence of prompts comprises data intelligence prompts, whereby intelligence about a nature of the data and relationships in the database is obtained from database-information retrieved or otherwise obtained by the controller by one or more of:
   (a) accessing the input database and retrieving data,
   (b) accessing a data dictionary of the input database and retrieving meta-information or structural information from the data dictionary,
   (c) accessing at least one document containing information about the input database, and
   (d) conducting an interactive information-gathering dialog with a database administrator or user,
   where the database information comprises content information and/or structural information and/or other metadata about the input database, and where the database information, in case of a relational input database, comprises at least one of:
   (i) one or more names of input relations belonging to the input database,
   (ii) textual descriptions of one or more input relations,
   (iii) names of one or more columns or attribute of one or more input relations,
   (iv) textual descriptions of one or more columns or attributes of one or more input relations,
   (v) for one or more input relations, related types according to a predefined list of database relation types or according to a classification scheme of database relations associating data relations with relation types,
   (vi) for at least one attribute, a related attribute-type,
   (vii) for at least one attribute, an associated range constraint,
   (viii) at least one primary and/or candidate key for at least one input relation,
   (ix) at least one foreign key constraint,
   (x) at least one dependency from a set of dependency-types comprising data dependencies comprising:
      (a) functional dependencies,
      (b) conditional functional or other equality generating dependencies (EGDs), and
      (c) multi-valued or join dependencies, and/or other tuple-generating dependencies (TGDs),
   and where the data intelligence prompts comprise prompts from one or more prompt types comprising:
   (i) prompts generated by the controller containing sample data from the sub-structure or relation of the database to instruct one or more LLMs about the nature of the data and the relationships contained in the sub-structure,
   (ii) prompts generated by the controller use one or more metadata items from the database to instruct one or more LLMs about the nature of the data and the relationships contained in the database, and
   (iii) prompts that ask for one or more natural-language descriptions of database and/or database schema elements, the elements, in case the database is relational, comprising data relations and attributes, the one or more descriptions to be used within subsequently generated prompts.

5. The method of claim 2 where the controller makes adaptive use of previous prompt-answers to determine one or more prompts to be issued, and where neither the sequence of LLM-prompts issued by the controller nor the number of prompts issued by the controller is solely determined by the input.

6. The method of claim 2 where one or more issued prompts, are obtained from parameterized prompts by replacing parameters in the parameterized prompts by concrete values, where at least one concrete value is obtained from a source from a set of sources comprising:
   (i) the database,
   (ii) previous LLM responses, and
   (iii) intermediate calculations of the controller.

7. The method of claim 2, where confidence scores, also called confidence values, are computed together with computed candidate results comprising candidates for insertions, deletions, or updates, where a confidence score expresses a degree of confidence about a corresponding candidate result, and where the candidate result gives rise to an effective result only if a corresponding confidence score is in a pre-determined interval of values, and where a computation of confidence scores comprises one or a combination or aggregation of two or more of:
   (i) using pre-determined scores attached to prompt-types and a method of aggregating scores over the sequence of prompts,
   (ii) obtaining scores by a statistical validation of a used database enrichment or curation method, and (iii) obtaining scores by prompting, whereby a prompt or a part of a prompt asks for the explicit indication of a confidence score of a result,
(iv) using a heuristics or rule of thumb for obtaining or aggregating scores,
(v) aggregating scores using specific mathematical formulas,
(vi) aggregating scores according to logical formalisms comprising Multivalued Datalog (MV-Datalog), other types of fuzzy Logic or fuzzy logic programming, Markov Logic, Probabilistic Soft Logic, and Problog.

8. The method of claim 2 where the database is relational and where each substructure on which a database curation task is to be performed is a single relation, and where each database curation request comprises at least one of:
   (i) a request type specifying whether the database curation request is a database enrichment request, a database initialization request, a database verification request, a database update request, or a null-value replacement request,
   (ii) a name of a relation of the database, on which the requested task is to be carried-out, or which, in case of a database initialization request, is to be created from scratch, and, in case of an enrichment request, an update request, a null-value replacement request, or a verification request, the designation of a set of target attributes of the relation to be curated, and other attributes of the relation being fixed attributes, where
      (a) in case of an enrichment request, the target attributes are enriched with new values or new combinations of values, giving rise to new tuples that extend the projections of existing tuples over the fixed attributes, and
      (b) in case of an update request, only attribute-values in target attribute columns are updated, and
      (c) in case of a null-value replacement request, only null-values occurring in target attribute columns are replaced by concrete values, and
      (d) in case of a verification request, all attributes are fixed, and no attribute is a target attribute, and correctness of the entire tuple is checked,
   (iii) in case of a database initialization request, sufficient metadata for defining the structure and intended semantics of a relation to be created from scratch, the metadata comprising one or more of:
      (i) a designation and/or a description of the set of attributes of a relation to be created from scratch, and
      (ii) a description of the intended semantics of the relation to be created from scratch.

9. The method of claim 2, where, for a database curation request different from a database initialization request, one or more of:
   (i) in case of a relational database, a task requested by the database curation request is carried out via a loop over each tuple of a relation to be curated according to the request, whereby the request is carried out separately for each such tuple,
   (ii) in case of a relational database, a task corresponding to a database curation request is carried out via a loop over each distinct fixed tuple-part relative to the request, where each fixed tuple-part relative to the request is a projection of a tuple from the relation associated with the request over its fixed attributes, whereby the request is carried out separately for each fixed tuple-part relative to the request, and
   (iii) a loop over elements of the sub-structure corresponding to the request is performed, and a task corresponding to the request is carried out for each element separately.

10. The method of claim 2, where, for each database enrichment or other database curation request, the sequence of prompts generated by the controller comprises:
    (i) data intelligence prompts, whereby intelligence about a nature of the data and relationships contained in the database is at least one of obtained and conveyed to the one or more LLMs, and
    (ii) candidate generation prompts, whereby initial result candidates comprising enrichment, update, null replacement, or deletion candidates are generated, and
    (iii) a sequence of prompts jointly referred-to as smart interrogation, whereby (a) candidate solutions generated by candidate generation prompts are checked for validity, and solutions deemed invalid or having a confidence score below a particular value are eliminated from a set of candidates, and/or (b) already computed results serve as a basis for computing further results,
    and where the controller performs a selection whereby the controller decides which result candidates are selected as final results and are incorporated into the database.

11. The method of claim 10 where at least one of:
    (i) one or more data intelligence prompts generated by the controller use sample data from the sub-structure of the database to instruct one or more LLMs about the nature of the data and the relationships contained in the sub-structure,
    (ii) one or more data intelligence prompts generated by the controller use one or more metadata items from the database to instruct one or more LLMs about the nature of the data and the relationships contained in the database, and
    (iii) one or more data intelligence prompts ask for one or more natural-language descriptions of database schema elements (in the relational case, data relations and/or attributes), the one or more descriptions to be used within subsequently generated prompts.

12. The method of claim 10, where, in case of enrichment, update, or null replacement requests, candidate solutions are organized and maintained in a candidate list ordered in a best-fit to worst-fit fashion ordered according to one of a relevance and fitting criterion, and where the sequence of prompts generated by the controller further comprises one or more list refinements prompts or dig-in prompts, which ask for one or more new solutions according to a process of determining whether the one or more new solutions:
    (i) are more relevant or better fits than a best solution in the candidate list, and are inserted before the best solution in the candidate list, or
    (ii) are, with respect to the relevance or fitting criterion, situated between two consecutive elements of the candidate list, and are inserted between the two consecutive elements;
    where the process of determining whether the one or more new solutions is repeated until no new solution fulfilling (i) or (ii) is found or until a loop abortion criterion is satisfied.

13. The method of claim 10 where the sequence of prompts generated by the controller further comprises one or more Chain-of-Thought prompts providing helpful instructions to the one or more LLMs about how to compute candidate results.

14. The method of claim 13 where one or more Chain-of-Thought prompts are obtained via knowledge-based methods.

15. The method of claim 13 where one or more Chain-of-Thought prompts are not prompts issued directly by the controller, but are answers generated by one or more LLMs to instruction generating prompts that ask for instructions about how to obtain a desired result.

16. The method of claim 10, where, in case the sub-structure of the database corresponding to a database enrichment request or to a null-value replacement request is nonempty, prompts with sample data from the sub-structure are issued as part of the data intelligence prompts.

17. The method of claim 2 further comprising one or more additional input elements, each additional input element being one of:
   (a) an additional data structure,
   (b) a text, and
   (c) an executable computer program with an application programming interface that can be used by the controller,
   where zero or more additional input elements are considered part of the input, and provide additional information to the controller, which the controller can use for computations.

18. The method of claim 2 where the sequence of prompts comprises prompts or compound prompts that are from categories comprising:
   (i) Data Intelligence Prompts comprising:
      (a) Tuple-based Relation Understanding Prompts, which apply to relational databases and use sample tuples from the database to gather information about and/or natural-language descriptions of database relations of the input database and their attributes,
      (b) Metadata-Based Relation Understanding Prompts, which use available data dictionaries and other metadata to gather information about and/or natural-language descriptions of database relations of the input database and associated attributes, and of relational constraints, and
      (c) Data Item Classification Prompts, which query the one or more LLMs about the common features or commonalities of some given data items, and classify the data items either according to a given system-internal or external ontology, or ask the LLM to which class these set of items (or each entity) belong;
   (ii) Problem Deconstruction Prompts, comprising:
      (a) Criteria Detection Prompts, which ask an LLM about main criteria to be used for deciding whether two or more items are in a given relationship, and, optionally, about a weight of each main criterion on a specified scale,
      (b) Relevant Aspect Discovery Prompts, which are associated to main prompts and ask for relevant internal or external aspects for answering a main prompt, and
      (c) Prompt Generation Prompts which ask the one or more LLMs what they should be asked in order to best answer a question or solve a problem;
   (iii) LLM Instruction Prompts comprising:
      (a) Instruction-by-Example Prompts, which are prompts that take sample tuples obtained from the database either directly or through queries, where appropriate, formulate them in natural language using natural language relation names previously issued Data Intelligence prompts, and teach the LLM the instances of the relationship,
      (b) Automatically generated Chain-of-Thought prompts either directly generated by the controller or obtained as response to an LLM prompt issued by the controller, the response providing explanations to the one or more LLMs on how to solve a problem by providing natural-language explanations and/or examples of how to solve concrete example problem-instances, and
      (c) Food-for-Thought prompts which ask the one or more LLMs a question pertinent to solving a current problem for inducing the one or more LLMs to produce better answers and/or problem solutions;
   (iv) Result Generating Prompts, which ask for results comprising responses to the one or more database curation requests request, either in intermediate steps to be improved, or as a final step, comprising:
      (a) Boolean answer generation used for checking correctness of tuples from the input relation,
      (b) List finding prompts that generate lists of items or of data tuples that constitute answers to a database enrichment request or a database update request, or a null-value replacement request, and
      (c) Explanation-Generating Prompts which, for a prompt-answer or a part thereof, generate an explanation of why the answer or part thereof is correct, and/or of the data provenance of the answer or part thereof;
   (v) Result Improvement Prompts, comprising:
      (a) List Ordering Prompts, which ask an LLM to order a previously computed list of results in a best-to-worst fit order,
      (b) Comparison Query Prompts that ask which of two computed results is a better fit to a database curation request or with regard to explicitly stated criteria,
      (c) List refinement comprising Dig-in Prompts, which ask to improve an already computed result list by asking to find new items that (1) are better fits than the best-fitting item in the result list, and/or (2) fit between two consecutive items of the result list, and
      (d) Answer Deconstruction Prompts, which ask for a simplification and/or improved formatting and/or a standardized formatting of an earlier prompt-answer and/or the recognition of certain data values in an earlier prompt-answer;
   (vi) External Source Finding and Utilization Prompts, comprising:
      (a) Source Finding Prompts, which ask for external sources comprising web pages or web services, from where useful data and/or answers to database curation requests can be retrieved,
      (b) Source Access Understanding prompts that ask for instructions of how to retrieve useful data or request answers from a given external source, whereby the answer to a Source Access Understanding prompt has the role of a Food-for-Thought prompt for a Data Access Program Generation Prompt,
      (c) Data Access Program Generation Prompts which ask an LLM with program generating capability to synthesize a program that accesses a web source, interacts properly with the web source, and generates desired data or results,
      (d) Data Access Program Result Analysis Prompts analyze and transform data obtained through an external source, (e) Data Access Program Testing and Correction Prompts which test data access programs previously generated by the one or more LLMs via Data Access Program Generation Prompts, and in case one or more errors are found in a data access program, automatically correct the program, and
(f) Evidence and Explanation Generating Prompts (EE-PPs), which provide concrete evidence or explanations for already computed answers or candidate results; and
(vii) LLM Certainty Assessment Prompts, which return a certainty value in the interval [0,1] that expresses the degree of certainty about the LLM's answer to a prompt comprising:
(a) Criteria-Weighted Certainty Prompts, which compute and provide a certainty factor from the aggregation degrees of fulfillment of various weighted criteria, and
(b) Confidence Assessment Prompts, which ask an LLM directly to assess the degree of confidence the LLM has about an own answer.

19. The method of claim 18 where at least five different categories of prompts are used.

20. The method of claim 2, where the controller accesses a knowledge base that can be extended and adapted, the knowledge base containing (a) a rule base and (b) a base of parameterized prompts, and where the control flow and the prompts to be issued are dynamically determined with help of the rule base.

21. The method of claim 2, further comprising using a rule-based knowledge base and a reasoning engine, and where the controller generates result candidates and results to database curation requests both by automated reasoning using rules from the knowledge base and by LLM prompting, and where each result candidate generated via reasoning is double-checked by the controller using one or more prompts to the one or more LLMs.

22. The method of claim 2, further comprising using a rule-based knowledge base and a reasoning engine, where decision-making processes by the controller are supported by automated reasoning tasks performed by the reasoning engine, whereby the reasoning engine evaluates rules over a set of logical atoms belonging to one or more groups of atoms, the one or more groups comprising:
(i) facts stored in the knowledge base,
(ii) atoms corresponding to data or data-records in the database, and
(iii) atoms corresponding to data obtained from prompt-answers,
and generates new logical atoms or facts to be used by the controller for decision making.

23. The method of claim 2, further comprising at least one of:
(i) distilling logical atoms and/or predicate-template instantiations from text and data, applied to text or data from one or more sources comprising:
(a) prompt-answers,
(b) prompts,
(c) the database, imported data, and
(ii) performing inconsistency detection, whereby data or information available and/or arising during the execution of one or more data curation tasks is checked for inconsistency, the performing inconsistency detection belonging to a group of methods comprising:
(a) performing logical reasoning where logical rules and constraints are evaluated over facts and/or predicate instantiations and/or other data whereby new facts are generated and inconsistencies can be detected by help of one or more of:
a logic programming engine,
a theorem prover, and
inherent reasoning capabilities of an LLM,
(b) performing conflict resolution that resolves inconsistencies by deleting, overriding, or amalgamating facts based on one or more of of a group of methods comprising:
applying explicit general or application-specific conflict resolution rules or strategies, comprising strategies that give preference to a fact or predicate instantiation that was generated at a later step compared to a conflicting fact generated at an earlier step, provided that a later-generated fact or predicate instantiation is not associated with a lower plausibility score than a earlier-generated conflicting fact or predicate instantiation,
performing "ad hoc" conflict resolution in case an inconsistency has been detected, by issuing one or more LLM prompts which present conflicting items to an LLM and by asking the LLM to resolve a conflict or to suggest a conflict resolution,
performing conflict resolution by prompting an LLM for a general conflict-resolution strategy as preparation for potentially arising inconsistencies, which is subsequently applied in case an inconsistency arises.

24. The method of claim 2, where database integrity constraints are maintained when solving a database enrichment, database update, database initialization, or null-value replacement tasks.

25. The method of claim 2, where, when solving a database enrichment, database update, database initialization, or null-value replacement task, database integrity constraints are enforced, and/or maintained, where the data dependencies are from a set of dependency types comprising:
(i) functional dependencies,
(ii) conditional functional dependencies,
(iii) multi-valued dependencies,
(iv) join dependencies,
(v) inclusion dependencies,
(vi) geographical constraints, and
(vii) attribute-value constraints from a set of different types of constraints comprising range constraint, length constraint, data format constraint, enumerated constraint, and regular expression constraint, range-restriction and other syntactic constraints,
and where rules for generating new atoms or rule-based constraints are executed whenever such rules or constraints apply, and where automated conflict resolution is carried out in case conflicts arise.

26. The method of claim 2, further comprising:
(i) providing connections and read/write interactions with various databases with a Database Interface,
(ii) generating interpretations of one or more relations of a database schema, by using a Relation Interpreter, which comprises (a) generating relation descriptions of one or more relations of a database schema by using a Description Generator, and (b) learning constraints the database adheres to by using a Constraint Learner,
(iii) facilitating access to and integration of knowledge in an internal knowledge base, and knowledge from external knowledge sources, while providing a uniform representation of this knowledge, by using a Knowledge Access Component,
(iv) handling interactions with LLMs by using an LLM Handler, which comprises (a) flexibly selecting appropriate LLMs for specific tasks, by using an LLM Selector, and (b) transmitting prompts to LLMs and receiving responses, by using a "Connectors to LLMs" utility module,
(v) interpreting and evaluating responses from LLMs, using an LLM Response Interpreter, which comprises (a) assessing LLM answers for validity using a Success Checker, (b) verifying answer format compliance using a Format Checker, and (c) evaluating LLM's confidence using a Confidence Evaluator,
(vi) handling the generation, ranking, selection and other operations for candidate data items, using a Candidate Handler, which comprises (a) creating and maintaining a list of new candidate data items by using a Candidate Generator, (b) ranking and choosing the top candidates by using a Candidate Selector, and (c) employing list refinement processes to update the candidate list by using a List Refiner,
(vii) creating prompts of various types by using a Prompt Generator, the creating comprising (a) generating prompts based on pre-defined templates by using a Template-based Prompt Generator, (b) leveraging a language model for flexible prompt generation tasks or crafting optimal prompts based on specific needs, by using a Language Model-based Prompt Generator, and (c) by using a Prompt Scorer and Selector, according to a given context, scoring candidate prompts and selecting a prompt to be issued,
(viii) executing different types of LLM interrogations using a Smart Interrogations Component, which comprises various interrogation sub-components, and aggregating scores generated by different interrogation processes using a Score Aggregator,
(ix) conducting basic knowledge-based reasoning tasks using a Reasoning Component, comprising a Reasoning Engine, detecting inconsistencies, and reasoning with uncertain facts, and automatically generating and/or learning rules or learning values for parameters used in rules using a Rule/Parameter Learner,
(x) generating programs using a Program Generator, and verifying programs using a using a Program Tester, and
(xi) extracting information or data from various sources using an Information/Data Extractor, which comprises (a) locating relevant sources with desired data using a Source Finder, (b) automatically creating wrappers for data extraction using a Program Generator, and (c) verifying wrappers using a Program Tester.

27. The method of claim 2 further comprising a user interface which provides one or more functionalities from a group of interaction functionalities comprising:
(i) connecting to a database,
(ii) selecting for a database or more database parts to be visualized and/or curated,
(iii) visualizing parts of a database or of data tables or relations, according to some visualization method in a group of visualization methods comprising, in case of a relational database, visualizing a data relation jointly with action buttons, the action buttons serving scopes comprising the triggering of a particular type of data curation task,
(iv) triggering of a particular type of data curation task by one or more of a set of triggering-actions-comprising clicking on one or more buttons from a set of buttons, the set of action buttons being from a group of button sets comprising a button set comprising a 'Verify Data' button and an 'Enrich Data' button, whose clicking initiates a comprehensive data verification or enrichment process, respectively, and where for each button, zero or more options are actionable by right-clicking the button and selecting or specifying options, or via another type of interaction, and
(v) textually interacting with the controller for various types of communications comprising providing textual descriptions of database parts.

28. The method of claim 2, where the sequence of prompts to the LLMs is performed as part of a sequence of modules, each module executed or triggered by the controller, the modules belonging to module classes comprising LLM interaction modules, basic functional modules, and complementary modules, where
(i) the LLM interaction modules are of module-types comprising:
(a) LLM-issuing modules, which are modules that compose and issue LLM prompts,
(b) LLM-Answer understanding modules, which analyze answers to LLM prompts and extract and retain useful data or information from the answers,
(c) mixed LLM interaction modules, which comprise a sequence of LLM prompts and answer analysis steps,
(d) auxiliary LLM interaction modules, which are triggered by basic functional or complementary modules and use LLM interaction for a sub-ordinate task to be executed by a basic functional or complementary module,
(ii) the basic functional modules are of module-types comprising:
(a) knowledge access modules,
(b) mathematical calculation modules,
(c) database access modules, comprising database connection, reading, writing, updating, and query execution modules,
(d) data sampling modules,
(e) searching modules responsible for searching for relevant documents or information,
(f) navigation modules responsible for navigating or crawling data or information sources, and
(g) document or Web page parsing and segmentation modules,
(iii) the complementary modules performing:
providing a solution in addition to an LLM-based solution for a sub-task, whereby an overall result quality of the sub-task is enhanced by integrating the LLM-based solution and the additional solution,
Replacing an LLM-based solution for a sub-task, when the LLM-based solution fails on the sub-task or exhibits clear uncertainty in the LLM's response, or when the controller determines according to one or more criteria that a complementary module can achieve a better performance than the LLM-based solution for the sub-task, the one or more criteria belonging to a group comprising: efficiency of the solution, estimated quality of the result, and cost-efficiency,
and where one or more complementary modules are of one or more types in a module-type set comprising:
(a) data-extraction, wrapper generation, and execution modules;
(b) rule-based reasoning modules, (c) machine learning modules based on machine-learning models of smaller size than LLMs, (d) graph analysis modules, and (e) item set expansion modules;

the modules are dynamically invoked, where the type and actions of each module may depend on computations of preceding modules and the sequence of prompts is the sequence of all prompts generated in temporal order by the execution of the modules.

29. A system comprising:

at least one processor to execute instructions to:

(i) access and/or modify a database to be automatically curated, the database being accessible to, and modifiable by, a controller, the database containing zero or more structured datasets and zero or more metadata items, where the database in its initial state, is referred to as an input database, (ii) access zero or more additional external data or information sources and from which specific data or information useful to a data curation task can be obtained by at least one of:

(a) performing database access, (b) retrieving information for retrieval augmented generation, and (c) automatically extracting structured data, (iii) use one or more pre-trained large language models (LLMs) accessed via application programming interfaces (API) or other connections, issue prompts and retrieve answers to prompts and execute one or more database curation requests, each request specifying a database curation task to be performed on at least a sub-structure of the database, the database curation tasks comprising:

(a) a database enrichment task to compute new data records comprising tuples or other associations of data items and insert the records into the sub-structure of the database, (b) a database verification task to verify, with help of the one or more LLMs, data contained in the sub-structure, and, when incorrect data is identified, return the incorrect data as output for further processing or correction, (c) a database update task to automatically recognize and update erroneous or outdated data within the sub-structure of the database, and (d) a null-value or a missing value replacement task to replace null-values contained in the sub-structure of the database by concrete data values, wherein zero or more constraints are accessible to the controller, each constraint being either a database constraint expressing a property to be fulfilled and maintained by the dataset, or a process constraint that restricts the control flow to be generated by the controller, where the input database, the task description, and the zero or more constraints are jointly referred to as input, and where the requested database curation tasks are automatically performed by the controller by a computation that uses the one or more LLMs and that performs a sequence of prompts to the LLMs such that each prompt of this sequence is generated by the controller from at least one of (a) the input, (b) forms of and answers to previously issued prompts from the sequence, (c) intermediate calculations of the controller.

30. A non-transitory computer-readable storage medium, having instructions stored thereon that, when executed by a computing device cause the computing device to perform operations, comprising:

(i) accessing and/or modifying a database to be automatically curated, the database being accessible to, and modifiable by, a controller, the database containing zero or more structured datasets and zero or more metadata items, where the database in its initial state, is referred to as an input database, (ii) accessing zero or more additional external data or information sources and from which specific data or information useful to a data curation task can be obtained by at least one of:

(a) performing database access, (b) retrieving information for retrieval augmented generation, and (c) automatically extracting structured data, (iii) using one or more pre-trained large language models (LLMs) accessed via application programming interfaces (API) or other connections, issuing prompts and retrieving answers to prompts and executing one or more database curation requests, each request specifying a database curation task to be performed on at least a sub-structure of the database, the database curation tasks comprising:

(a) a database enrichment task to compute new data records comprising tuples or other associations of data items and insert the records into the sub-structure of the database, (b) a database verification task to verify, with help of the one or more LLMs, data contained in the sub-structure, and, when incorrect data is identified, return the incorrect data as output for further processing or correction, (c) a database update task to automatically recognize and update erroneous or outdated data within the sub-structure of the database, and (d) a null-value or a missing value replacement task to replace null-values contained in the sub-structure of the database by concrete data values, wherein zero or more constraints are accessible to the controller, each constraint being either a database constraint expressing a property to be fulfilled and maintained by the dataset, or a process constraint that restricts the control flow to be generated by the controller, where the input database, the task description, and the zero or more constraints are jointly referred to as input, and where the requested database curation tasks are automatically performed by the controller by a computation that uses the one or more LLMs and that performs a sequence of prompts to the LLMs such that each prompt of the sequence is generated by the controller from at least one of (a) the input, (b) forms of and answers to previously issued prompts from the sequence, (c) intermediate calculations of the controller.

* * * * *